(12) United States Patent
Nomura et al.

(10) Patent No.: US 7,715,690 B1
(45) Date of Patent: May 11, 2010

(54) APPARATUS, METHOD AND MEDIUM FOR INFORMATION PROCESSING

(75) Inventors: Yasuo Nomura, Kanagawa (JP); Tatsuo Eguchi, Kanagawa (JP); Yasuhiko Terashita, Kanagawa (JP); Yasushi Miyajima, Kanagawa (JP); Yoshikazu Watanabe, Kanagawa (JP); Nobuaki Yamaguchi, Tokyo (JP); Kumiko Sasaki, Kanagawa (JP); Makoto Niijima, Tokyo (JP); Ai Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/556,949

(22) Filed: Apr. 21, 2000

(30) Foreign Application Priority Data

| Apr. 23, 1999 | (JP) | ............... P11-117266 |
| Apr. 23, 1999 | (JP) | ............... P11-117267 |
| Apr. 23, 1999 | (JP) | ............... P11-117269 |

(51) Int. Cl.
| *H04N 7/00* | (2006.01) |
| *H04N 5/93* | (2006.01) |
| *G11B 27/00* | (2006.01) |
| *H04N 5/44* | (2006.01) |
| *H04N 5/45* | (2006.01) |
| *H04N 5/445* | (2006.01) |

(52) U.S. Cl. ............... 386/95; 386/52; 386/56; 386/79; 348/564; 348/565; 348/566; 348/567; 348/568; 348/569

(58) Field of Classification Search ............ 386/45, 386/46, 52, 83, 95, 125, 126, 56, 79; 348/333.01, 348/333.02, 333.04, 333.05, 333.11, 333.12, 348/563, 700, 564–569; 725/37, 88, 100; 369/30.08

See application file for complete search history.

(56) References Cited

U.S. PATENT DOCUMENTS

| 5,111,299 | A | * | 5/1992 | Aoki et al. ............. 348/333.02 |
| 5,272,574 | A | | 12/1993 | Park et al. |
| 5,442,744 | A | | 8/1995 | Piech et al. |
| 5,648,824 | A | * | 7/1997 | Dunn et al. ............. 348/563 |
| 5,664,087 | A | | 9/1997 | Tani et al. |
| 5,801,685 | A | | 9/1998 | Miller et al. |

(Continued)

FOREIGN PATENT DOCUMENTS

EP 0 493 250 7/1992

(Continued)

OTHER PUBLICATIONS

U.S. Appl. No. 09/771,557, filed Jan. 30, 2001, pending.

(Continued)

*Primary Examiner*—Thai Tran
*Assistant Examiner*—Daquan Zhao
(74) *Attorney, Agent, or Firm*—Oblon, Spivak, McClelland, Maier & Neustadt, L.L.P.

(57) ABSTRACT

This invention relates to an information processing apparatus for recording a first picture supplied and for reproducing a second picture recorded, the apparatus comprising: recording means for recording the first picture; reproducing means for reproducing the second picture; and display controlling means for providing display control in such a manner as to display a first screen through which to input orders for operating the recording means, and a second screen through which to input orders for operating the reproducing means.

20 Claims, 45 Drawing Sheets

U.S. PATENT DOCUMENTS

| | | | |
|---|---|---|---|
| 5,852,474 A * | 12/1998 | Nakagaki et al. | 348/564 |
| 5,861,912 A | 1/1999 | Nanba | |
| 5,898,434 A * | 4/1999 | Small et al. | 715/810 |
| 6,038,366 A * | 3/2000 | Ohno et al. | 386/46 |
| 6,118,450 A * | 9/2000 | Proehl et al. | 369/30.08 |
| 6,411,771 B1 * | 6/2002 | Aotake | 386/52 |
| 6,487,362 B1 * | 11/2002 | Yuen et al. | 386/83 |

FOREIGN PATENT DOCUMENTS

| | | |
|---|---|---|
| EP | 0 706 282 | 4/1996 |
| EP | 0 804 040 | 10/1997 |
| EP | 0 890 910 | 1/1999 |

OTHER PUBLICATIONS

U.S. Appl. No. 09/773,911, filed Feb. 2, 2001, pending.
U.S. Appl. No. 09/773,918, filed Feb. 2, 2001, pending.
U.S. Appl. No. 09/556,750, filed Apr. 21, 2000, pending.
U.S. Appl. No. 09/557,172, filed Apr. 21, 2000, pending.
U.S. Appl. No. 09/720,129, filed May 18, 2001, pending.
U.S. Appl. No. 09/720,537, filed Dec. 21, 2000, pending.

* cited by examiner

FIG. 11A

MAXIMUM RECORDABLE TIME →30 MIN.→1 HR.→1 HR. 30 MIN.→2 HR.→2 HR. 30 MIN.→3 HR.

FIG. 11B

MAXIMUM RECORDABLE TIME →1 HR.→1 HR. 30 MIN.→2 HR.→2 HR. 30 MIN.→3 HR.

FIG. 11C

MAXIMUM RECORDABLE TIME →2 HR.→2 HR. 30 MIN.→3 HR.

FIG.13

| RECORDING END TIME SETTING | ☒ |

SET RECORDING DURATION

○ TERMINATE RECORDING SINCE STARTING:
   [30 MIN. ▼] LATER

○ TERMINATE RECORDING AT:
   (ENDING AT:) [12 ⇕] : [34 ⇕]

⦿ SPECIFY MAXIMUM RECORDABLE TIME
   (ENDING AT:) [23:22 ON FEB 24]

| OK | CANCEL | HELP |

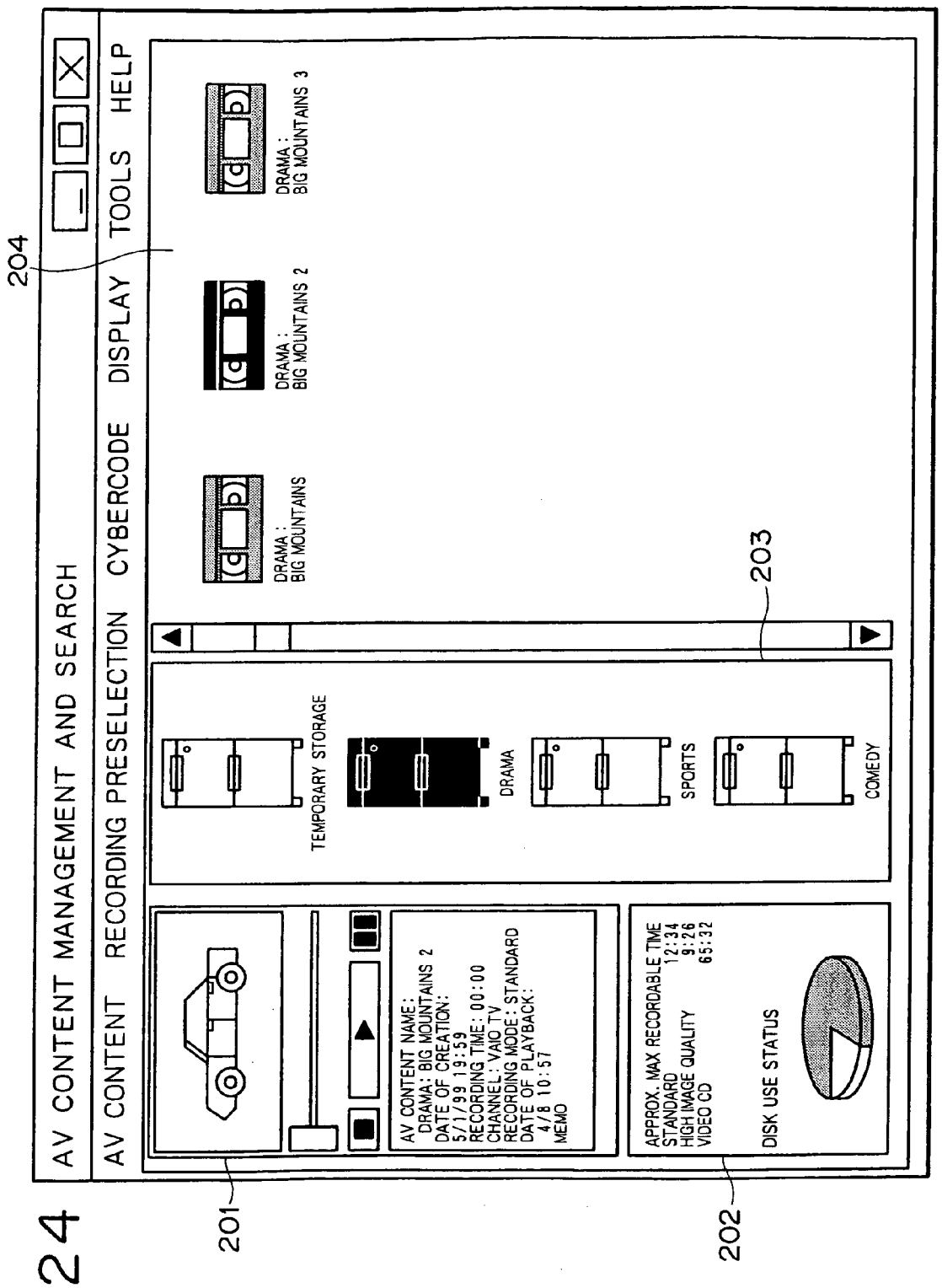

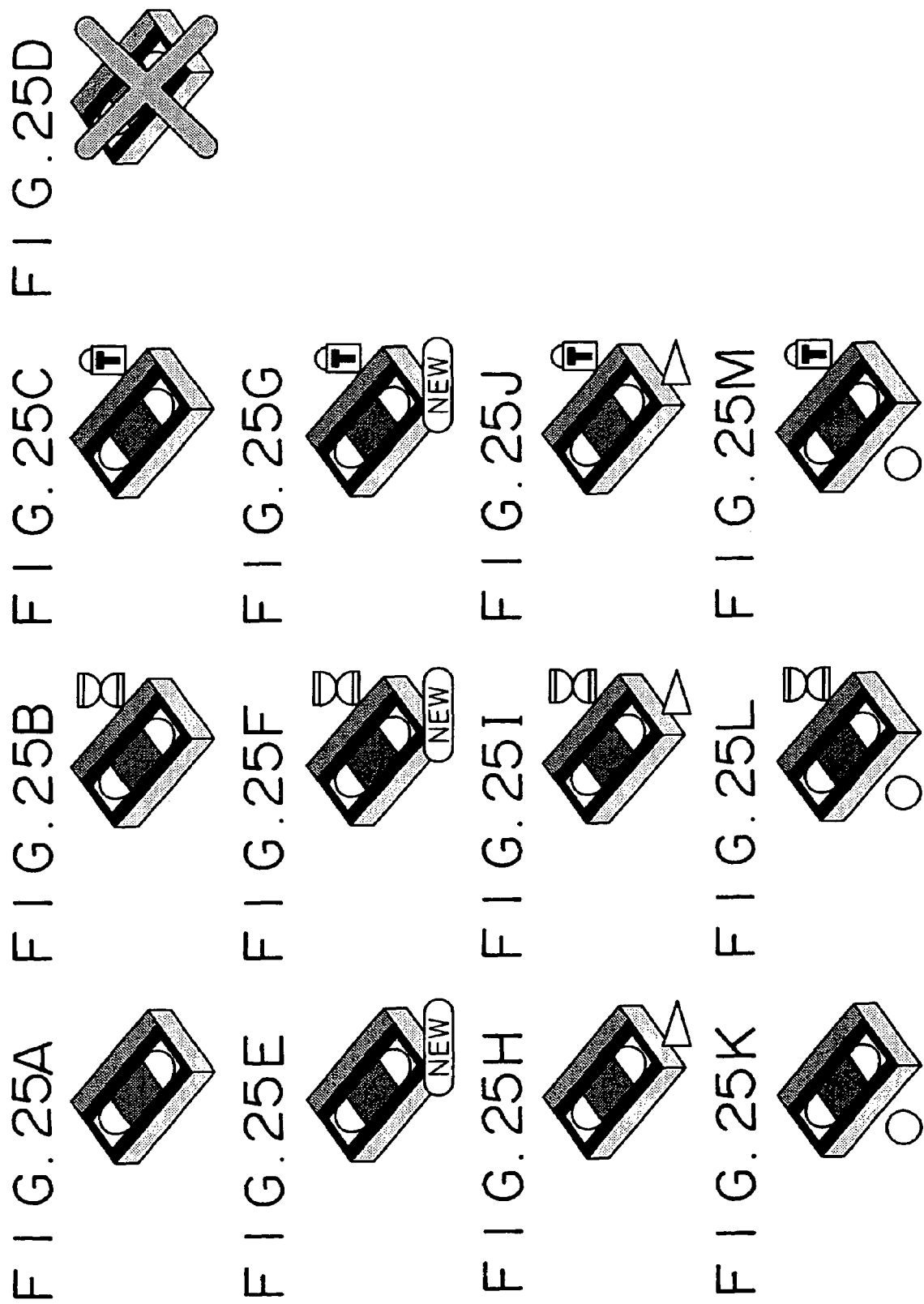

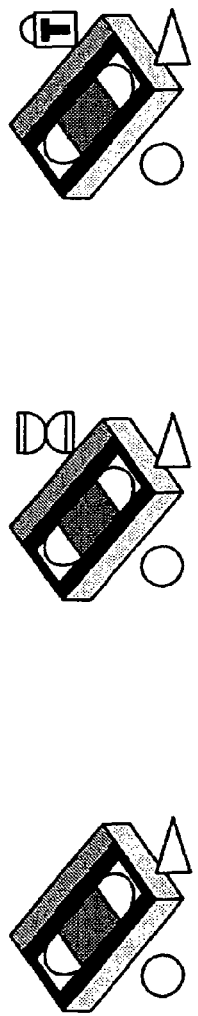
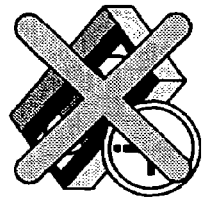
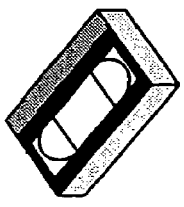
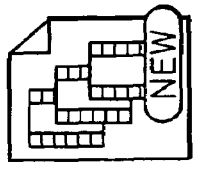
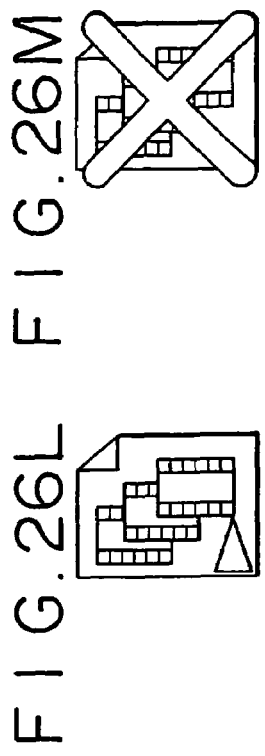
FIG. 26A  FIG. 26B  FIG. 26C
FIG. 26D  FIG. 26E  FIG. 26F
FIG. 26G  FIG. 26H  FIG. 26I
FIG. 26J  FIG. 26K  FIG. 26L  FIG. 26M F I G. 32
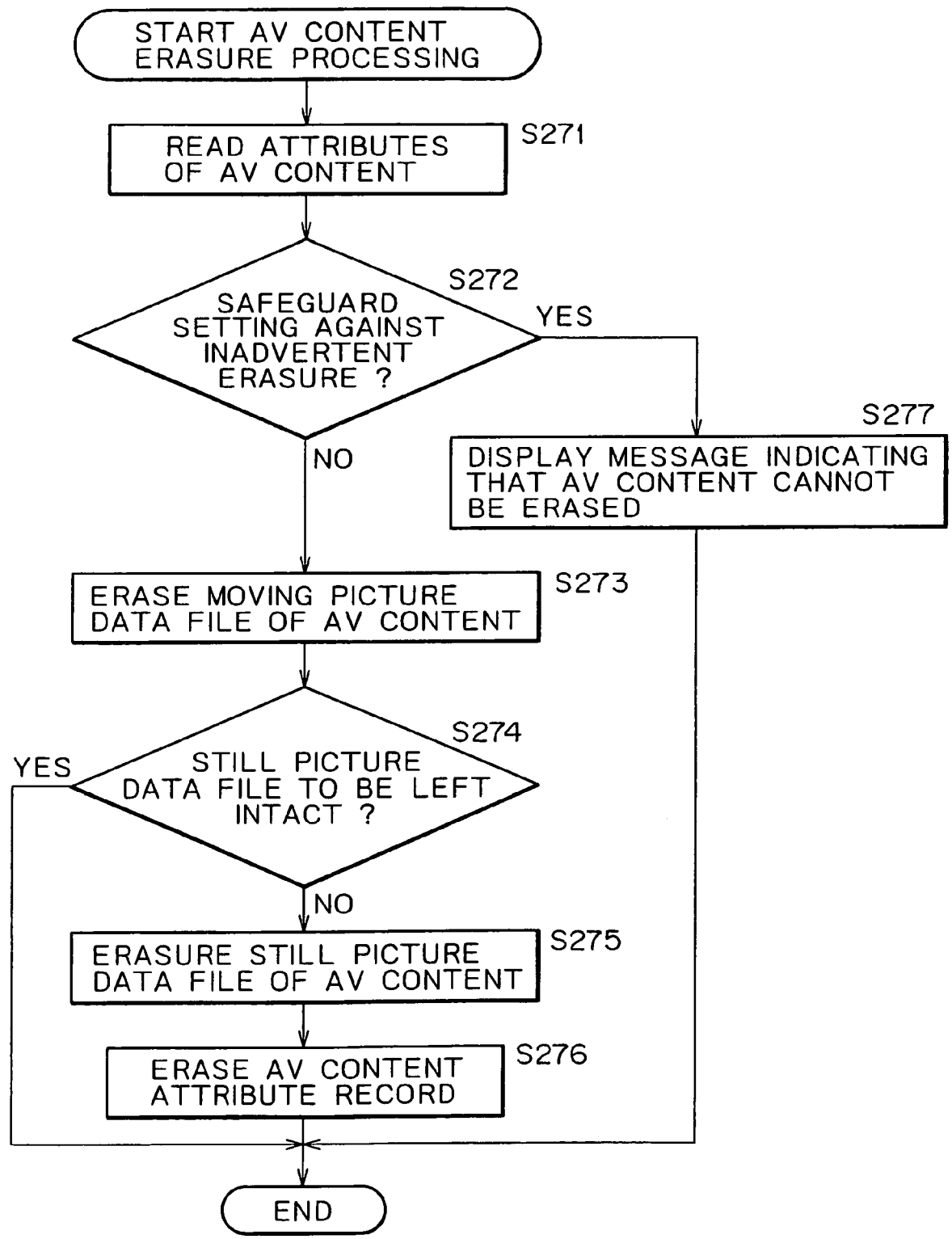

F I G. 45A
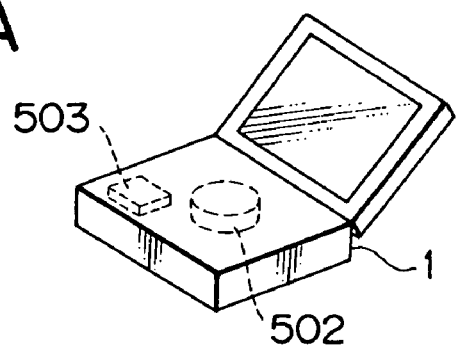
F I G. 45B
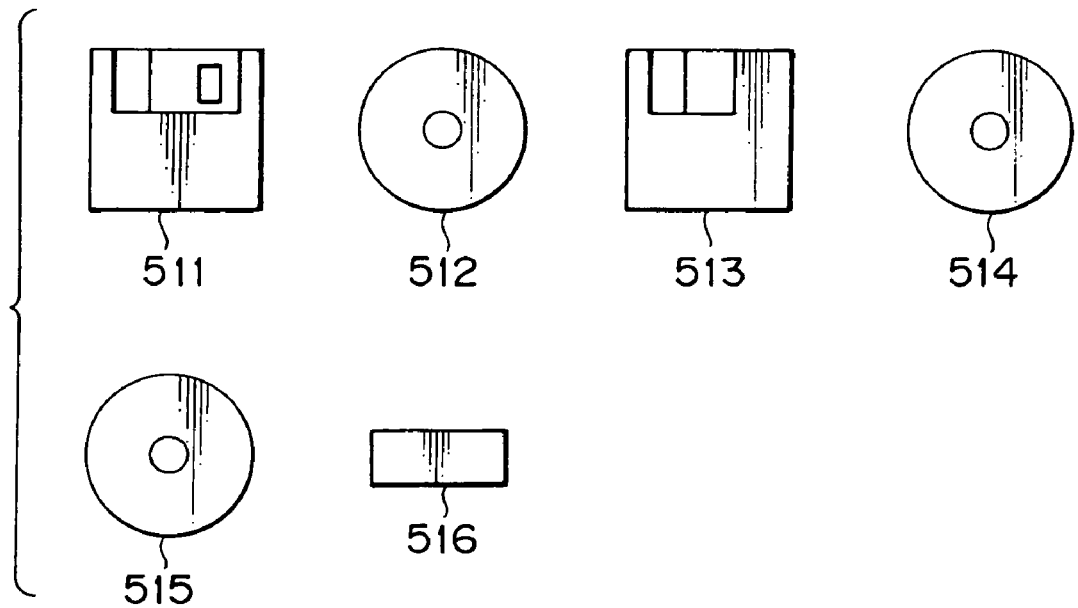
F I G. 45C
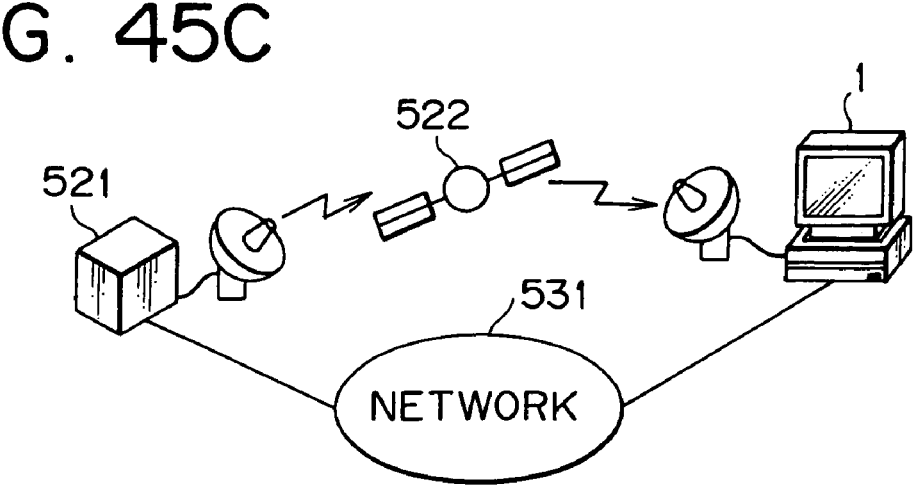

APPARATUS, METHOD AND MEDIUM FOR INFORMATION PROCESSING

BACKGROUND OF THE INVENTION

The present invention relates to an apparatus, a method and a medium for information processing. More particularly, the invention relates to an apparatus and a method for information processing involving the recording of pictures, as well as to a medium for accommodating that method.

Coming progressively into general use today are techniques for having video and audio signals from a TV broadcasting station received by a tuner-equipped personal computer and for converting the received video and audio signals into suitable digital data which are recorded on a recording medium such as a hard disk and reproduced as needed.

A major problem with the conventional techniques for causing personal computers to record pictures is that it takes time to verify the contents of recorded pictures and that it is impossible to know the quantity of pictures that may still be recorded. Also it is hard to understand the user interface when a user operates it to record and/or reproduce images and hard to comprehend, in case that a moving picture is recorded, the relationship among still pictures which consist of the moving picture on the time series basis.

SUMMARY OF THE INVENTION

The present invention has been made in view of the above circumstances and provides an apparatus, a method and a medium for verifying in a quick and reliable manner the contents of recorded pictures and the quantity of pictures that may still be recorded and for allowing the user to operate the apparatus upon recording and/or reproducing pictures easily without hesitation and to comprehend, in case that a moving picture is recorded, the relationship among still pictures which consist of the moving picture on the time series basis.

According to a first aspect of the present invention, there is provided an information processing apparatus for recording a first picture supplied and for reproducing a second picture recorded, the apparatus comprising: recording means for recording the first picture; reproducing means for reproducing the second picture; and display controlling means for providing display control in such a manner as to display a first screen through which to input orders for operating the recording means, and a second screen through which to input orders for operating the reproducing means.

According to a second aspect of the present invention, there is provided an information processing method for use with an information processing apparatus for recording a first picture supplied and for reproducing a second picture recorded, the method comprising the steps of: recording the first picture; reproducing the second picture; and providing display control in such a manner as to display a first screen through which to input orders for operating the recording step, and a second screen through which to input orders for operating the reproducing step.

According to a third aspect of the present invention, there is provided a medium for causing an information processing apparatus for recording a first picture supplied and for reproducing a second picture recorded to execute a program comprising the steps of: recording the first picture; reproducing the second picture; and providing display control in such a manner as to display a first screen through which to input orders for operating the recording step, and a second screen through which to input orders for operating the reproducing step.

Through the use of the information processing apparatus, the information processing method and the medium, a first picture is recorded and a second picture is reproduced. Further according to the invention, display control is provided in such a manner as to display a first screen through which to input recording orders and a second screen through which to input reproducing orders.

According to a fourth aspect of the present invention, there is provided an information processing apparatus for dealing with moving pictures, comprising: storing means for storing still pictures corresponding to scene switchovers of the moving pictures, and time stamps of the scene switchovers; and display controlling means for providing display control in such a manner as to display, given a reference position on a screen, the still pictures in positions at distances from the reference position, the distances reflecting differences between a time stamp corresponding to the reference position on the one hand and the time stamps of the scene switchovers on the other hand.

According to a fifth aspect of the present invention, an information processing method for use with an information processing apparatus for dealing with moving pictures, the method comprising the steps of: storing still pictures corresponding to scene switchovers of the moving pictures, and time stamps of the scene switchovers; and providing display control in such a manner as to display, given a reference position on a screen, the still pictures in positions at distances from the reference position, the distances reflecting differences between a time stamp corresponding to the reference position on the one hand and the time stamps of the scene switchovers on the other hand.

According to a sixth aspect of the present invention, there is provided a medium for causing an information processing apparatus for dealing with moving pictures to execute a program comprising the steps of: storing still pictures corresponding to scene switchovers of the moving pictures, and time stamps of the scene switchovers; and providing display control in such a manner as to display, given a reference position on a screen, the still pictures in positions at distances from the reference position, the distances reflecting differences between a time stamp corresponding to the reference position on the one hand and the time stamps of the scene switchovers on the other hand.

Through the use of the information processing apparatus, the information processing method and the medium, still pictures corresponding to scene switchovers of moving pictures are stored along with time stamps of the switchovers. Further according to the invention, display control is provided in such a manner as to display, given a reference position on a screen, the still pictures in positions at distances from the reference position, the distances reflecting differences between a time stamp corresponding to the reference position on the one hand and the time stamps of the scene switchovers on the other hand.

According to a seventh aspect of the present invention, there is provided an information processing apparatus comprising: recording means for recording a first moving picture; and display controlling means for providing display control in such a manner as to display a first, a second and a third display area, the first display area displaying information outlining the first moving picture recorded by the recording means, the second display area displaying information about the first moving picture selected in the first display area, the third display area displaying a quantity of a second moving picture which may be recorded by the recording means.

According to a eighth aspect of the invention, there is provided an information processing method for use with an information processing apparatus, the method comprising the steps of: recording a first moving picture; and providing display control in such a manner as to display a first, a second and a third display area, the first display area displaying information outlining the first moving picture recorded in the recording step, the second display area displaying information about the first moving picture selected in the first display area, the third display area displaying a quantity of a second moving picture which may be recorded in the recording step.

According to a ninth aspect of the present invention, there is provided a medium for causing an information processing apparatus to execute a program comprising the steps of: recording a first moving picture; and providing display control in such a manner as to display a first, a second and a third display area, the first display area displaying information outlining the first moving picture recorded in the recording step, the second display area displaying information about the first moving picture selected in the first display area, the third display area displaying a quantity of a second moving picture which may be recorded in the recording step.

Through the use of the information processing apparatus, the information processing method and the medium, a first moving picture is recorded. Further according to the invention, display control is provided in such a manner as to display a first, a second and a third display area. The first display area displays information outlining the first moving picture recorded. The second display area displays information about the first moving picture selected in the first display area. The third display area displays a quantity of a second moving picture which may still be recorded.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 11A, 11B and 11C are explanatory views showing how recording time is changed by clicking on the recording time change button;

FIG. 13 is another explanatory view of the recording time setting window;

FIG. 24 is an explanatory view of another screen displayed by the AV content management and search program;

FIGS. 25A through 25M are explanatory views of icons;

FIGS. 26A through 26M are explanatory views of other icons;

FIG. 32 is a flowchart of steps for erasing an AV content;

FIGS. 45A, 45B and 45C are explanatory views of storage media.

DETAILED DESCRIPTION OF THE PREFERRED EMBODIMENTS

Figure 1:
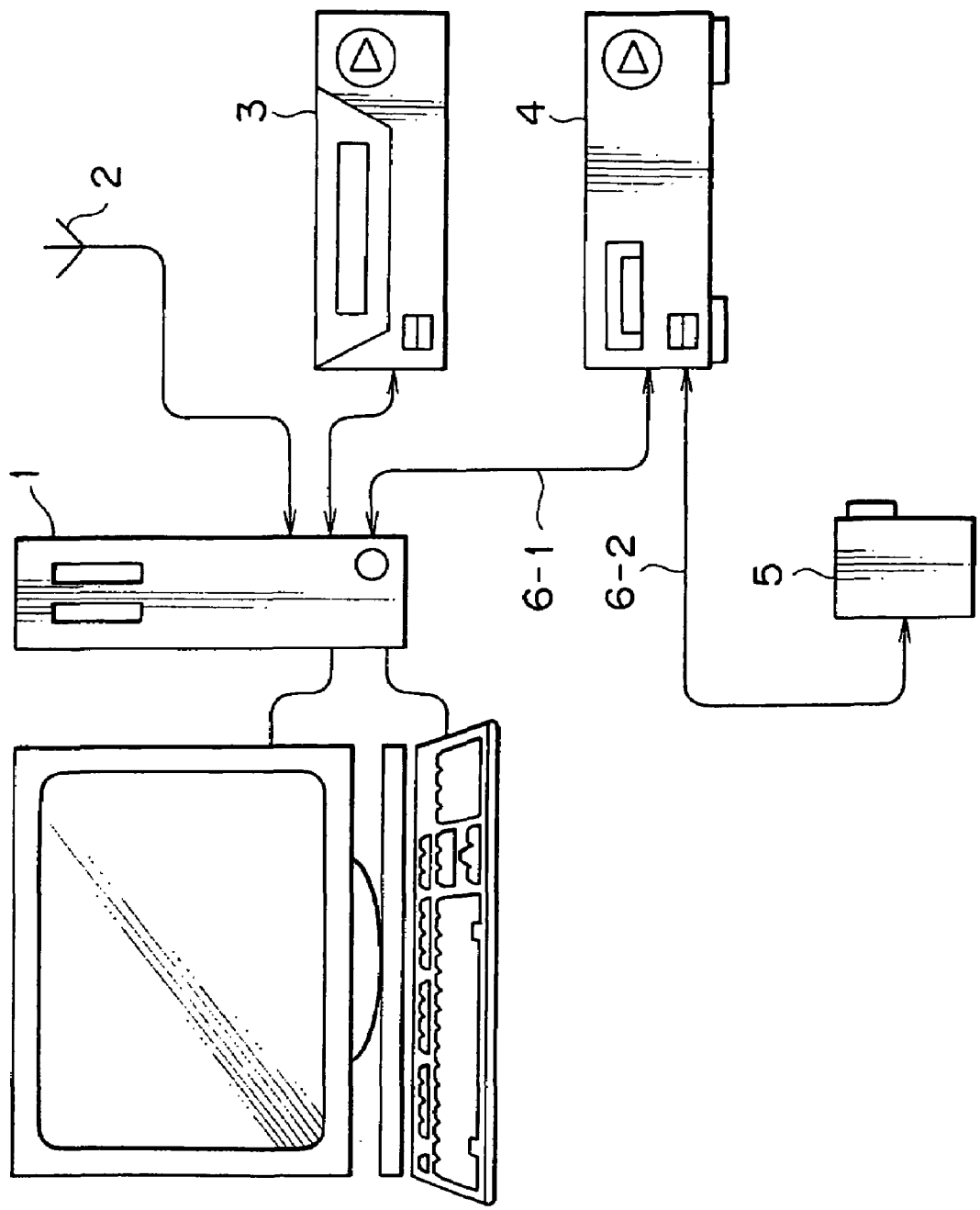
FIG. 1 is a schematic view of an image recording and playback system embodying the invention.

FIG. 1 is a schematic view of an image recording and playback system embodying the invention. A personal computer 1 accepts signals from an antenna 2 that receives radio waves from TV broadcasting stations, and records as well as reproduces images and voice (i.e., program images and voice) based on the signals. The personal computer 1 also accepts analog signals from a VCR (video cassette recorder) 3, or digital data sent from a DVCR (digital video cassette recorder) 4 or from a DVCR 5 equipped with an image pickup function over networks 6-1 and 6-2 in compliance with IEEE (Institute of Electrical and Electronic Engineers) 1394 or like standards. The personal computer 1 then records and reproduces the images and voice represented by the received analog signals or digital data.

The personal computer 1 supplies the VCR 3 with analog signals (e.g., those based on the NTSC (National Television System Committee) system) denoting recorded voice and images, or feeds the DVCR 4 with digital data representing stored voice and pictures.

In addition, based on image data about a label on which is printed a two-dimensional code (to be described later), the label image data being sent from the DVCR 5 over the networks 6-1 and 6-2, the personal computer 1 searches for a file associated with voice and images recorded on a video tape cassette to which the label is attached (the file contains data indicating the contents of voice and images recorded on the video tape cassette in question). Given the image data about the label bearing the printed two-dimensional code from the DVCR 5, the personal computer 1 checks to see if desired voice and images are recorded on the video tape cassette to which is attached the label in question.

Furthermore, the personal computer 1 is capable of editing recorded voice and images.

Figure 2:
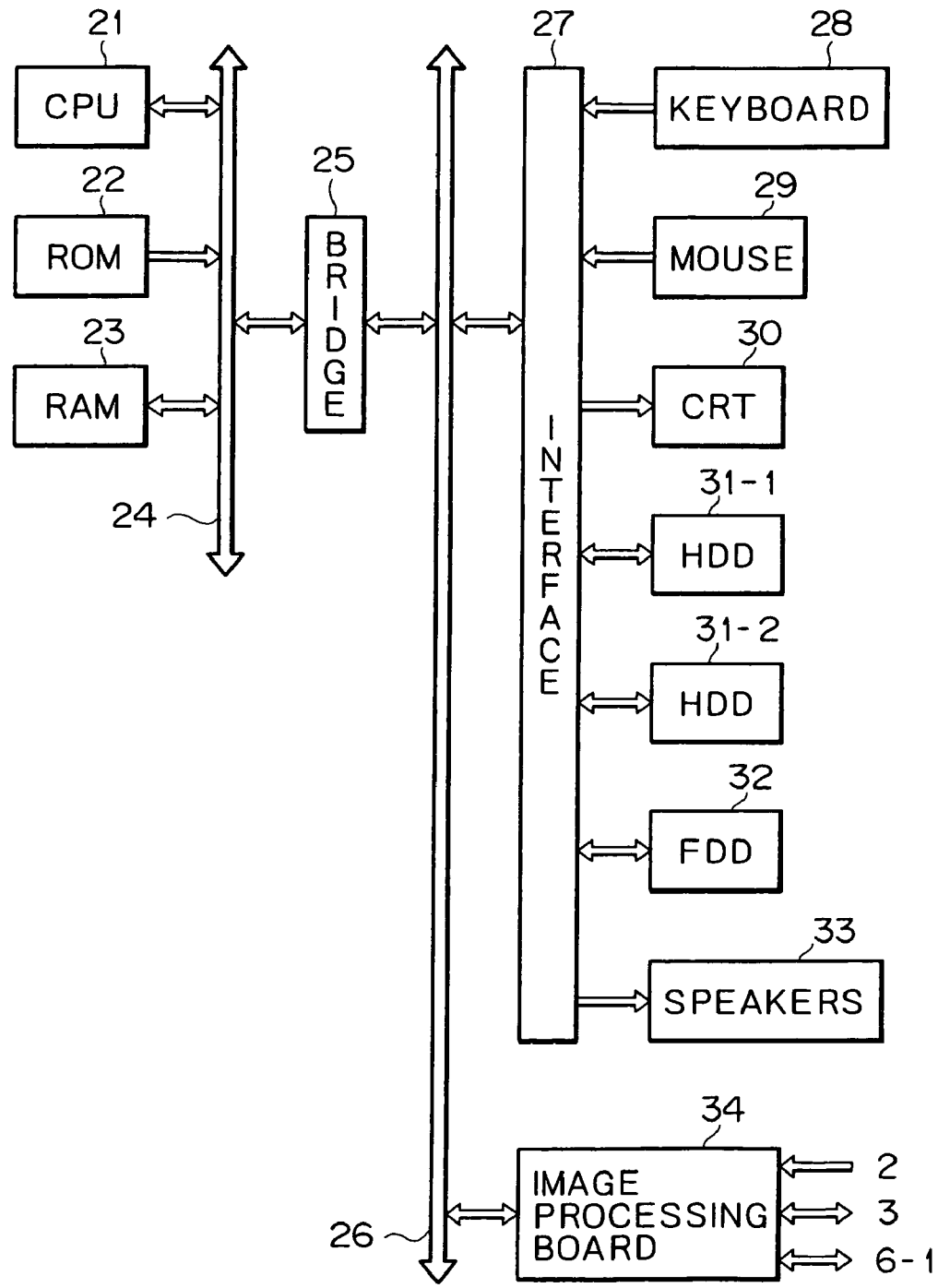
FIG. 2 is a block diagram of the personal computer.

FIG. 2 is a block diagram of the personal computer 1. A CPU (central processing unit) 21 executes an OS (operating system) and various application programs. A ROM (read-only memory) 22 generally stores programs for use by the CPU 21 and basically fixed data included in operation parameters. A RAM (random-access memory) 23 accommodates programs being executed by the CPU 21 and variable parameters used during the program execution. These components are interconnected by a host bus 24 made of a CPU bus or a memory bus.

The host bus 24 is connected via a bridge 25 to an external bus 26 such as a PCI (Peripheral Component Interconnect/Interface) bus.

A keyboard 28 is operated by a user to enter various commands into the CPU 21. A mouse 29 is operated also by the user to point to and select regions on a screen of a CRT (cathode ray tube) 30. The CRT 30 displays various kinds of information in text or in image. Hard disk drives (HDD) 31-1 and 31-2 as well as a floppy disk drive (FDD) 32 drive hard disks and a floppy disk respectively under control of the CPU 21 in recording or reproducing programs and information. Speakers 33 play back selected voice. These components ranging from the keyboard 28 to the speakers 33 are connected to an interface 27 which in turn is connected to the CPU 21 through the external bus 26, bridge 25, and host bus 24. In the description that follows, the HDDs 31-1 and 31-2 may simply be referred to as the HDD 31 where there is no specific need to distinguish the two drives.

Under control of the CPU 21, an image processing board 34 generates desired video or audio data based on signals from the antenna 2, on analog video or audio data from the VCR 3, or on digital video or audio data sent from the DVCR 4 or DVCR 5 over the network 6-1. The generated data are output to the HDD 31-1 or 31-2 through the external bus 26 and interface 27.

The image processing board 34 accepts video or audio data retrieved from the HDD 31-1 or 31-2 via the external bus 26 and interface 27, generates analog signals representing the accepted video or audio data, and supplies the generated signals to the VCR 3. The image processing board 34 also generates digital data denoting the accepted video or audio data and sends the generated digital data to the DVCR 4 over the network 6-1.

The image processing board 34 is connected to the CPU 21 via the external bus 26, bridge 25 and host bus 24.

Figure 3:
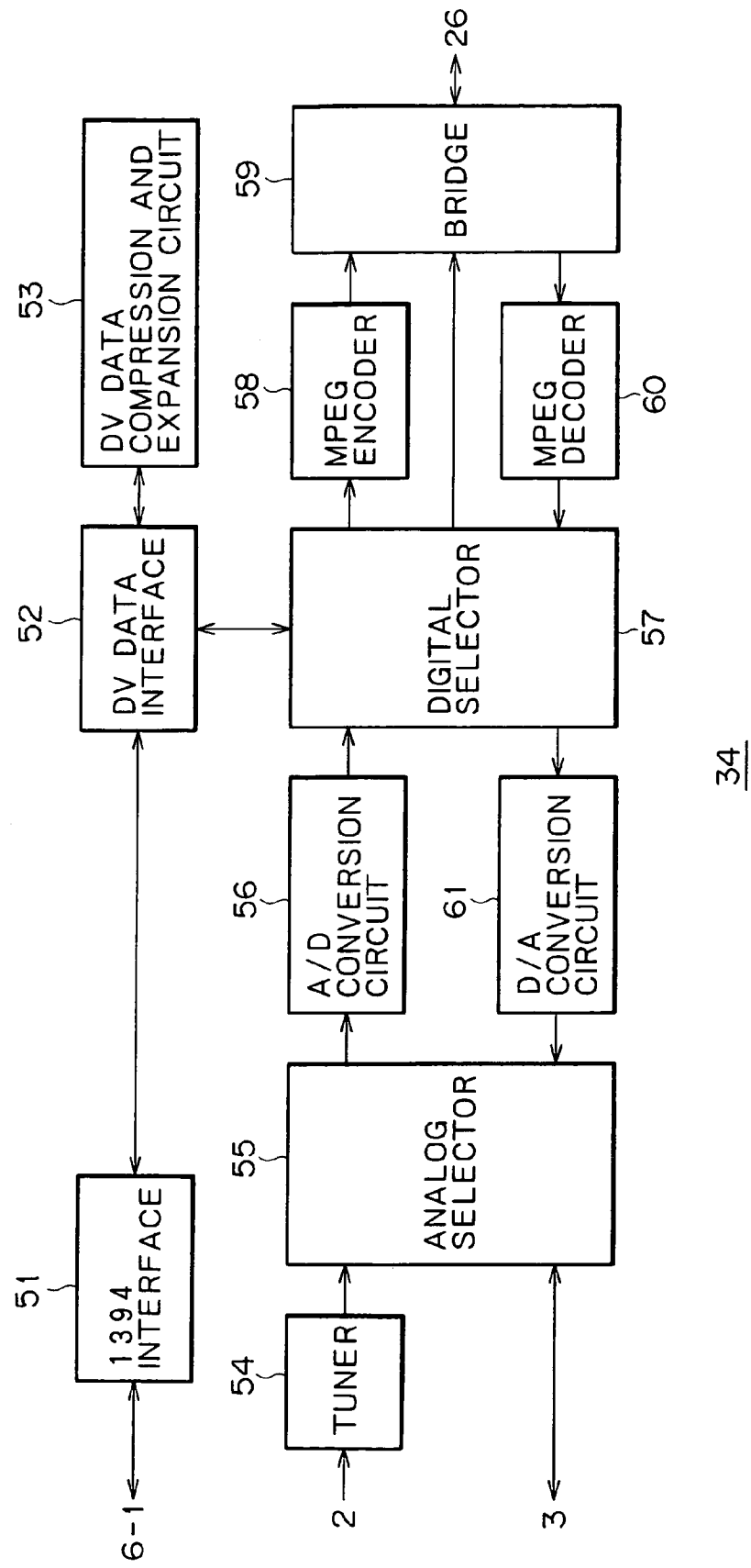
FIG. 3 is a block diagram of the image processing board.

How the image processing board 34 is constituted will now be described. FIG. 3 is a block diagram of the image processing board 34. A 1394 interface 51 structured as per IEEE 1394 is connected to the network 6-1, receives digital video or audio data in DVCR format from the DVCR 4 or 5 in accordance with a protocol based on IEEE 1394, and feeds the received data to a DV (digital video) data interface 52.

Given digital video or audio data in DVCR format from the DV data interface 52, the 1394 interface 51 forwards the received data to the DVCR 4 according to the IEEE 1394 protocol.

The DV data interface 52 supplies a DV data compression and expansion circuit 53 with digital video or audio data in DVCR format from the 1394 interface 51, or with digital video or audio data (uncompressed digital data such as 4:1:1 data) from a digital selector 57; feeds the 1394 interface 51 with digital video or audio data in DVCR format from the DV data compression and expansion circuit 53; and supplies the digital selector 57 with digital video or audio data (uncompressed) which have been supplied from the digital selector 57 from the DV data compression and expansion circuit 53.

The DV data compression and expansion circuit 53 expands digital video or audio data in DVCR format from the DV data interface 52 into uncompressed digital video or audio data, and outputs the uncompressed data to the DV data interface 52. The DV data compression and expansion circuit 53 also compresses uncompressed digital video or audio data from the DV data interface 52 into digital video or audio data in DVCR format, and outputs the compressed data to the DV data interface 52.

A tuner 54 accepts RF (radio frequency) signals from the antenna 2 and feeds an analog selector 55 with analog video and audio signals on selected channels. The analog selector 55 selects some of the analog video or audio signals from the tuner 54, VCR 3, or from a D/A (digital/analog) conversion circuit 61; and outputs the selected signals to an A/D (analog/digital) conversion circuit 56 or to the VCR 3.

The A/D conversion circuit 56 converts analog video and audio signals from the analog selector 55 into digital data (e.g., image data such as 4:1:1 data) and outputs the digital data to the digital selector 57. The digital selector 57 accepts digital audio and video data from the DV data interface 52, A/D conversion circuit 56, or from an MPEG (Moving Picture Experts Group) decoder 60, selects some of the accepted digital data, and outputs the selected data to the DV data interface 52, to an MPEG encoder 58 or to the D/A conversion circuit 61. The selected data are also output to a bridge 59 which receives scene switchover position information.

The MPEG encoder 58 compresses digital video and audio data from the digital selector 57 into digital data in MPEG format and outputs the compressed data to the bridge 59. The MPEG encoder 58 also converts scene switchover images into still pictures and outputs the converted pictures to the bridge 59.

The bridge 59 supplies the CRT 30 with digital video and audio data (uncompressed) fed from the digital selector 57 via the PCI bus 26 and interface 27 of the personal computer 1 that houses the image processing board 34. The bridge 59 also feeds the HDD 31-1 or 31-2 or the CPU 21 with digital video or audio data in MPEG format fed from the MPEG encoder 58 through the PCI bus 26 of the personal computer 1 accommodating the image processing board 34. Furthermore, the bridge 59 receives digital video or audio data in MPEG format from the HDD 31-1 or 31-2 of the personal computer 1 through the PCI bus 26, and outputs the received data to the MPEG decoder 60.

The MPEG decoder 60 expands digital video or audio data in MPEG format from the bridge 59 into uncompressed digital video or audio data, and outputs the uncompressed data to the digital selector 57.

The D/A conversion circuit 61 converts digital video and audio data from the digital selector 57 into analog signals, and outputs the resulting signals to the analog selector 55.

The processes to be carried out by the MPEG encoder 58 or MPEG decoder 60 may be taken over by suitable programs that may be executed by the CPU 21.

Figure 4:
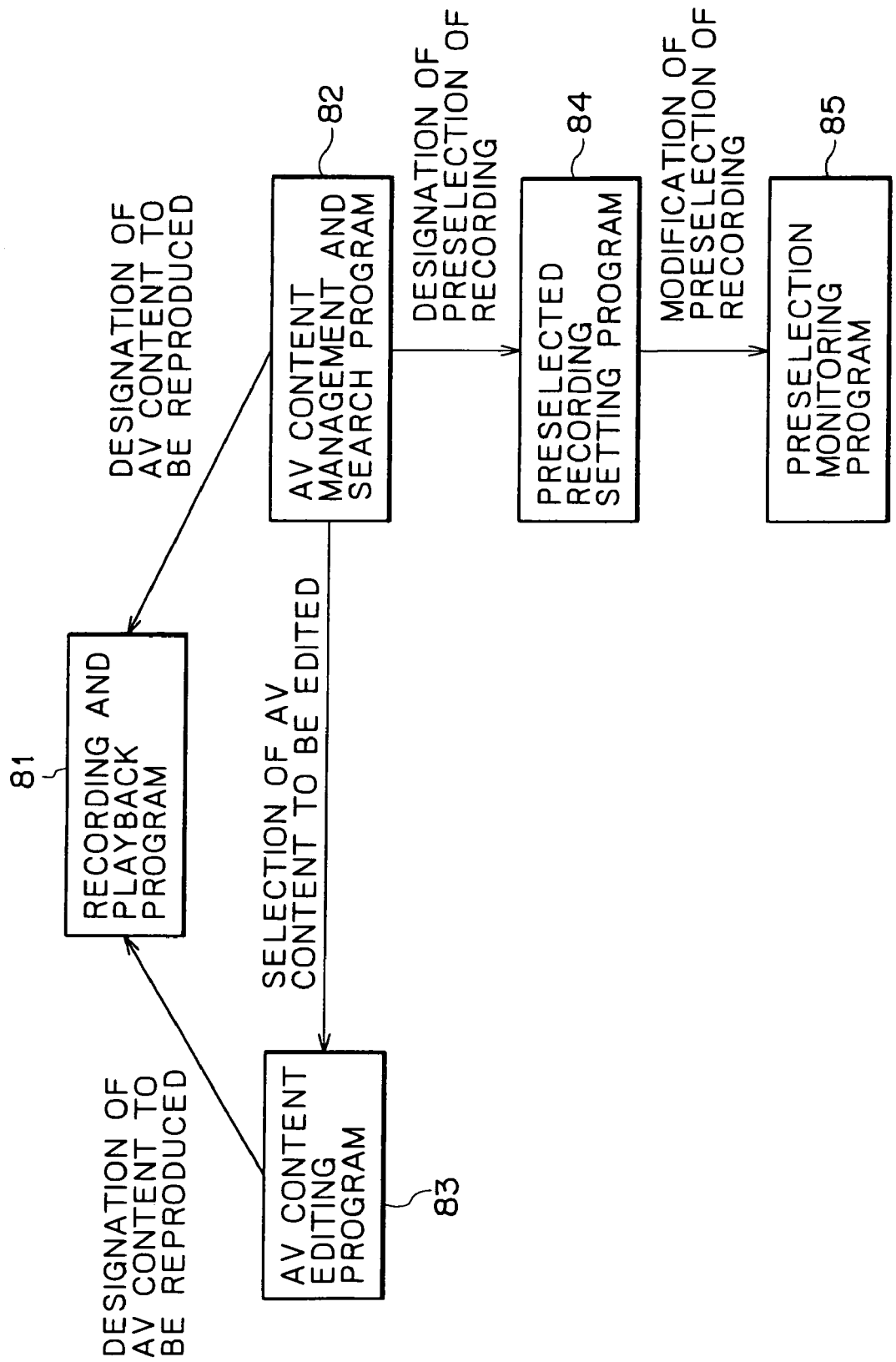
FIG. 4 is an explanatory view of application programs carried out by the personal computer.

FIG. 4 is an explanatory view of application programs arranged to be carried out by the personal computer 1. A recording and playback program 81 causes the image processing board 34 to select analog video and audio signals on channels received by the tuner 54, analog video and audio signals from the VCR 3, or digital video and audio data fed from the DVCR 4 over the network 6-1. The program 81 then causes the image processing board 34 to convert the selected analog signals or digital data into digital video or audio data in MPEG format, and records the converted data to the HDD 31-1 and/or 31-2 as AV (audio visual) contents composed of at least one file in a suitable format.

The recording and playback program 81 causes the image processing board 34 to expand AV contents of at least one file in a suitable format retrieved from the HDD 31-1 and/or 31-2 so as to generate uncompressed digital video or audio data. The program 81 further causes the CRT 30 to display images and the speakers 33 to play back sound using the generated uncompressed digital data.

An AV content management and search program 82 permits display of specific information such as AV contents held on the HDD 31-1 and/or 31-2 and of dates on which recordings were made. In addition, the AV content management and search program 82 orders the recording and playback program 81 to reproduce AV contents, permits selection of desired AV contents to be edited, supplies the selected contents to an AV content editing program 83, and tells a preselected recording setting program 84 to set recording preselection.

Based on the AV contents held on the HDD 31-1 and/or 31-2, the AV content editing program 83 edits desired images and voice of the selected AV contents (i.e., putting together images and voice included in the AV contents) in order to create AV contents in a format suitable for video or audio reproduction.

The AV contents above are devoid of digital video or audio data, as will be described later. Instead, the AV contents are constituted by information for designating the selected contents and by information for specifying the images and voice to be used. The AV contents of that structure may be reproduced by the recording and playback program 81.

Based on the preselection settings, the preselected recording setting program 84 creates AV contents for executing preselected recording. The created AV contents correspond to the established settings (recording time and the recording mode that determines image quality), and the program 84 causes storage areas to be reserved beforehand on the HDD 31-1 and/or 31-2 to accommodate the contents in question.

A preselection monitoring program 85 remains active (i.e., resides in working memory) when the personal computer 1 is in operation (i.e., OS in operation), and carries out preselected recording as per the AV contents created by the preselected recording setting program 84 for preselected recording execution and in accordance with the time fed from an RTC (real time clock), not shown. Where necessary, the preselection monitoring program 85 changes settings of the AV contents for preselected recording execution.

Figure 5:
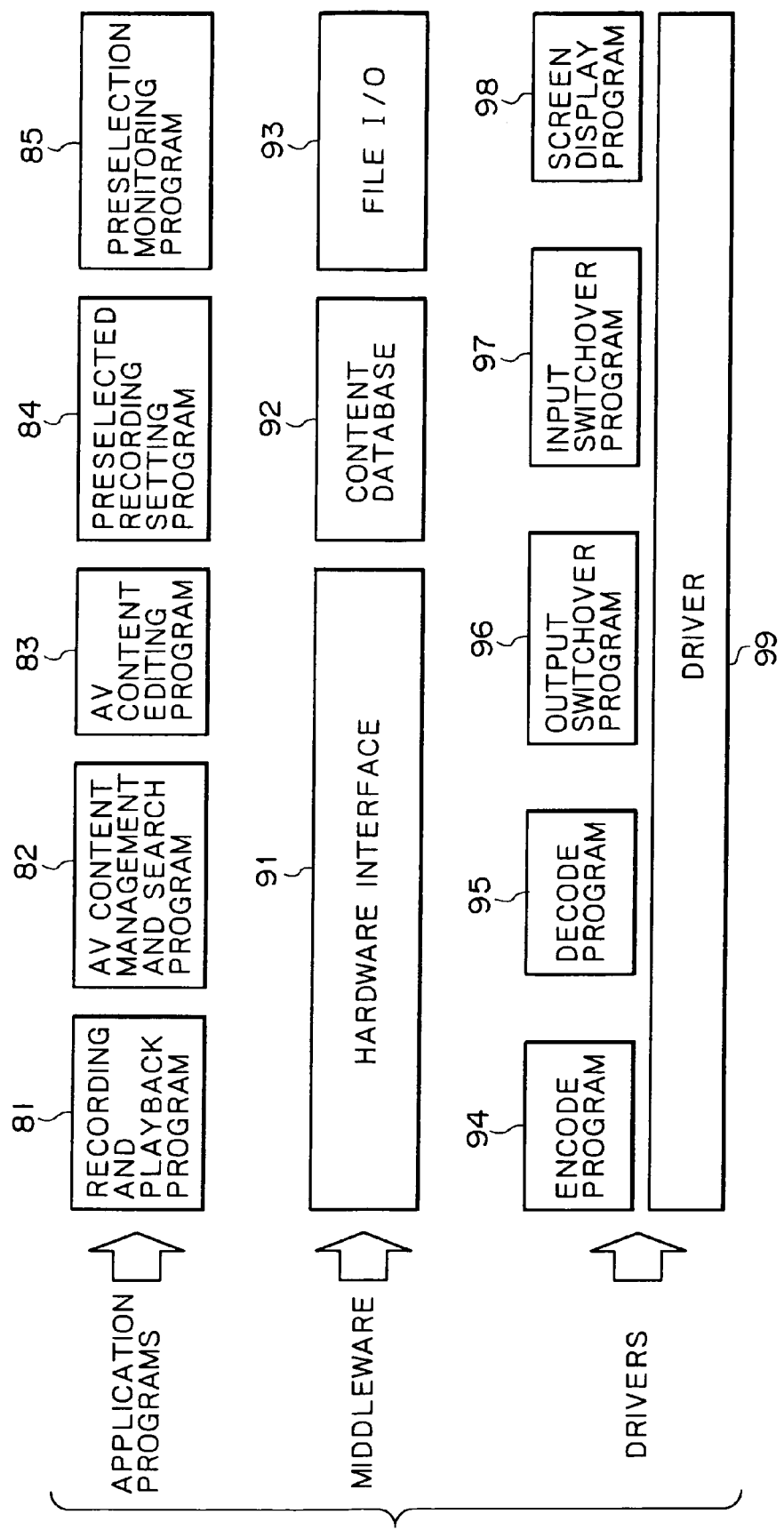
FIG. 5 is an explanatory view showing structures of application programs executed by the personal computer, and of middleware and drivers.

FIG. 5 is an explanatory view showing structures of application programs to be executed by the personal computer 1, and of middleware and drivers. The middleware activates suitable drivers in response to requests from application programs. The drivers physically operate necessary hardware resources such as the MPEG encoder 58 in the image processing board 34.

A hardware interface 91 arbitrates requests for using hardware resources from the recording and playback program 81, AV content management and search program 82, AV content editing program 83, preselected recording setting program 84, or preselection monitoring program 85. The arbitration is carried out in accordance with various priority settings so as to allow the application programs to utilize necessary hardware resources in an optimal fashion.

A content database 92 manages AV content attribute data, to be described later. The content database 92 furnishes the recording and playback program 81, AV content management and search program 82, AV content editing program 83, preselected recording setting program 84, or preselection monitoring program 85 with the AV content attribute data or with data for designating files that contain digital video or audio data representing AV contents.

A file I/O (input/output) 93 writes or reads data to or from relevant files in response to write or read requests for specific AV contents (composed of at least one file) sent through the content database 92 by the recording and playback program 81, AV content management and research program 82, AV content editing program 83, preselected recording setting program 84, or preselection monitoring program 85.

An encode program 94 causes the MPEG encoder 58 in the image processing board 34 to compress image or audio data from the digital selector 57 into digital data in MPEG format.

A decode program 95 causes the MPEG decoder 60 in the image processing board 34 to expand digital video or audio data in MPEG format from the bridge 59.

An output switchover program 96 causes the analog selector 55 and 1394 interface 51 in the image processing board 34 to select either analog signals from the image processing board 34 or digital data fed over the network 6-1 for output.

An input switchover program 97 causes the analog selector 55, 1394 interface 51, DV data interface 52, and digital selector 57 in the image processing board 34 to select either analog signals or digital data to be input to the image processing board 34.

A screen display program 98 causes the digital selector 57 and bridge 59 to control display of images on the CRT 30.

A driver 99 is a program that activates the image processing board 34 in response to requests from the encode program 94, decode program 95, output switchover program 96, input switchover program 97, and screen display program 98.

In the description that follows, all references to voice-related processing will be omitted.

Figure 6:
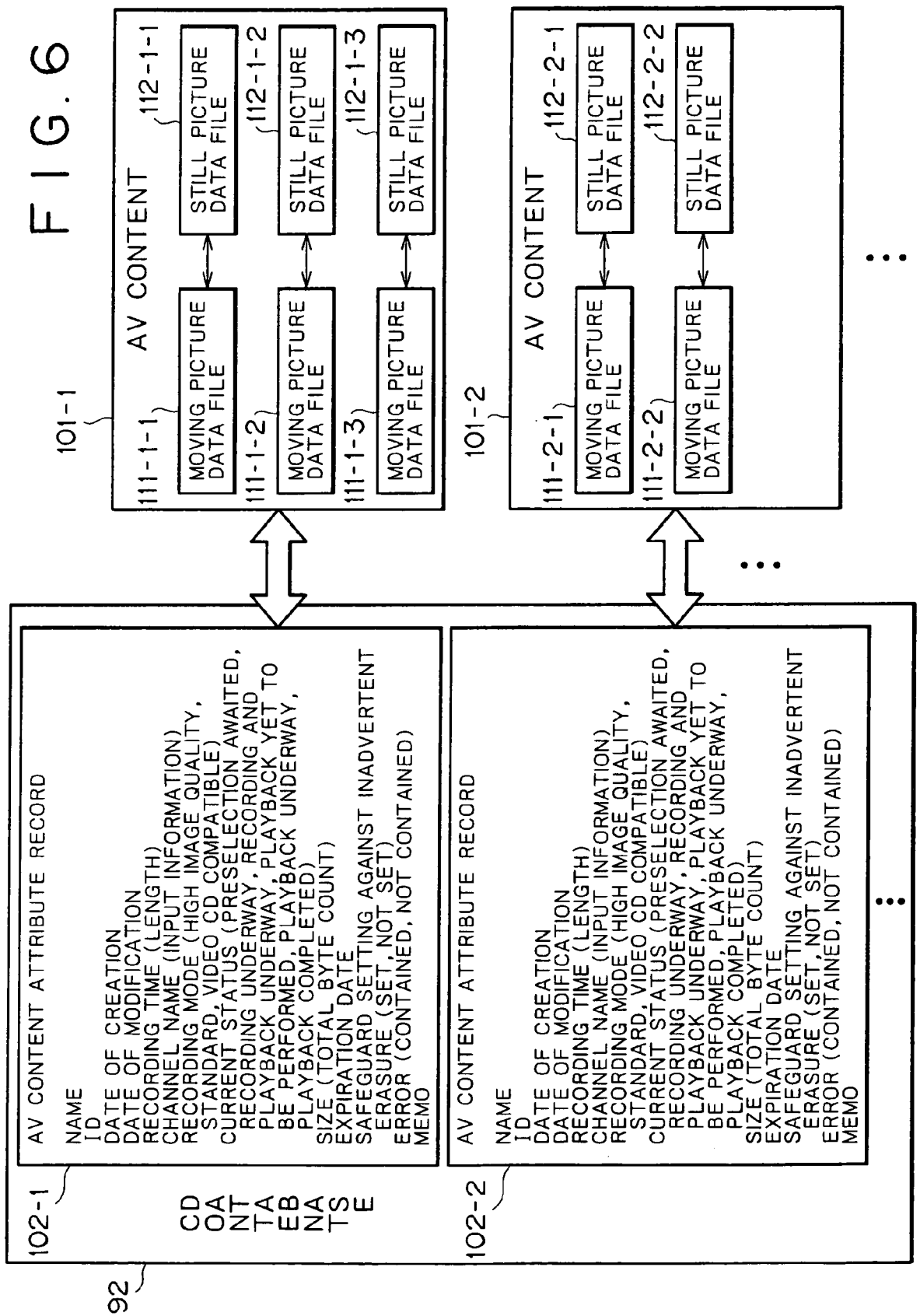
FIG. 6 is an explanatory view outlining structures of typical AV contents.

FIG. 6 is an explanatory view outlining structures of typical AV contents. The content database 92 retained on the HDD 31-1 or 31-2 stores attributes of diverse AV contents. An AV content attribute record 102-1 recorded in the content database 92 includes attribute data on an AV content 101-1, such as a name, ID (identification data), date of creation, date of modification, recording time, channel name, recording mode, current status, expiration date (indicated by time and date of day), safeguard setting against inadvertent erasure, presence or absence of error, a two-dimensional code (e.g., Cybercode (registered trademark)), and memo. Another AV content attribute record 102-2 recorded in the content database 92 includes attribute data on an AV content 101-2, such as a name, ID, date of creation, date of modification, recording time, channel name, recording mode, current status, expiration date, safeguard setting against inadvertent erasure, presence or absence of error, and memo.

The data representing the recording mode stored in the AV content attribute record 102-1 indicate that moving picture data files 111-1-1 through 111-1-3 are set for any one of three recording modes: high image quality, standard, or video CD compatible (i.e., moving picture data complying with the MPEG1 standard). Likewise, the data denoting the current status held in the AV content attribute record 102-1 indicate that the AV content 101-1 is in any one of the following states: preselection awaited, recording underway, recording and playback underway (picture data are being recorded and reproduced at the same time), playback yet to be performed, playback underway, and playback completed.

An error stands for a faulty state of the AV content 101-1. In case of an error, it may have happened that the personal computer 1 failed during recording and left the recording incomplete, that signal reception via the antenna 2 was poor during recording and images were not reproduced adequately with the received signals, or that part of the moving picture data file 111-1-1 has been missing.

The expiration date and the safeguard setting against inadvertent erasure will not be established at the same time; either of the two settings is allowed to be established, or none is set at all.

The data denoting the recording mode held in the AV content attribute mode 102-2 indicate that moving picture data files 111-2-1 through 111-2-3 are set for any one of three recording modes: high image quality, standard, or video CD compatible. Similarly, the data representing the current status held in the AV content attribute record 102-2 indicate that the AV content 101-2 is in any one of the following states: preselection awaited, recording underway, recording and playback underway, playback yet to be performed, playback underway, and playback completed.

The AV content 101-1 is made up of the moving picture data files 111-1-1 through 111-1-3 recorded on the HDD 31-1 or 31-2, and of still picture data files 112-1-1 through 112-1-3 held on the HDD 31-1 or 31-2. The moving picture data files 111-1-1 through 111-1-3 contain video data in MPEG format. The picture represented by the data at the beginning of the moving picture data file 111-1-2 is continued to the picture denoted by the video data at the end of the moving picture data file 111-1-1. Likewise, the picture represented by the data at the beginning of the moving picture data file 111-1-3 is continued to the picture denoted by the video data at the end of the moving picture data file 111-1-2.

The still picture data file 112-1-1 contains video data representing still pictures converted from scene switchover images of the video data held in the moving picture data file 111-1-1, as well as data on scene switchover times (or offset positions in the moving picture data file 111-1-1). The still picture data file 112-1-2 contains video data representing still pictures converted from scene switchover images of the video data held in the moving picture data file 111-1-2, as well as data on scene switchover times (or offset positions in the moving picture data file 111-1-2). The still picture data file 112-1-3 contains video data representing still pictures converted from scene switchover images of the video data held in the moving picture data file 111-1-3, as well as data on scene switchover times (or offset positions in the moving picture data file 111-1-3).

The AV content 101-2 is composed of the moving picture data files 111-2-1 and 111-2-2, and of still picture data files 112-2-1 and 112-2-2. The content 101-2 is structured in the same manner as the AV content 101-1 and thus will not be described further.

In the description that follows, the AV contents 101-1 and 101-2 may each be referred to simply as the AV content 101 if there is no specific need to distinguish the two contents. In like manner, the AV content attribute records 102-1 and 102-2 may each be referred to simply as the AV content attribute record 102 if there is no specific need to distinguish the two records; the moving picture data files 111-1-1 through 111-1-3, 111-2-1 and 111-2-2 may each be referred to simply as the moving picture data file 111 if there is no specific need to distinguish the files from one another; and the still picture data files 112-1-1 through 112-1-3, 112-2-1 and 112-2-2 may each be referred to simply as the still picture data file 112 if there is no specific need to distinguish the files from one another.

Figure 7:
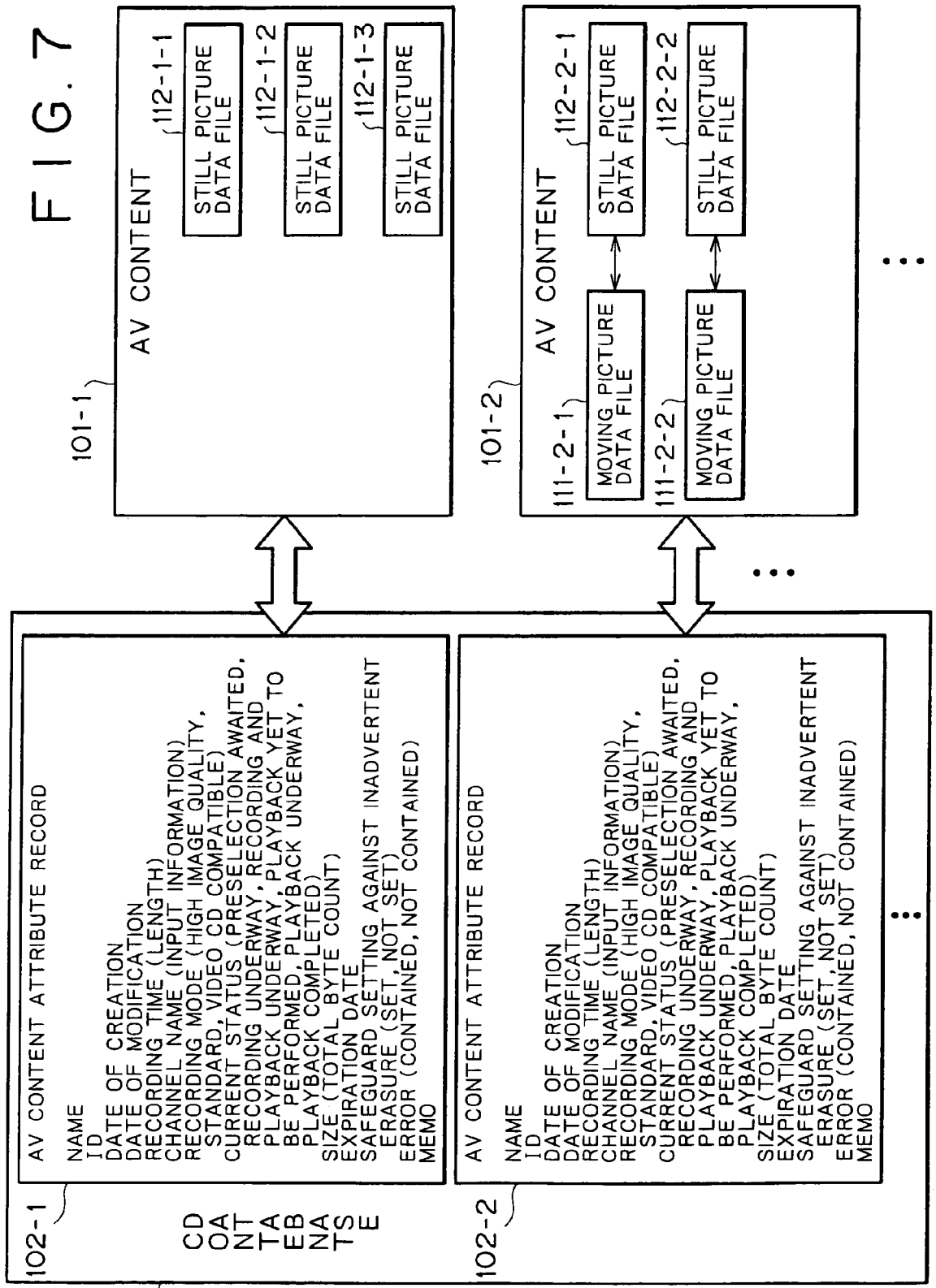
FIG. 7 is an explanatory view showing structures of other AV contents.

FIG. 7 is an explanatory view of typical AV contents 101 that have no moving picture data files. Illustratively, suppose that images and voice corresponding to the moving picture data files 111-1-1 through 111-1-3 held in the AV content 101-1 are recorded onto a video tape cassette and then the moving picture data files 111-1-1 through 111-1-3 are deleted. In that case, the AV content 101-1 is constituted by the still picture data files 112-1-1 through 112-1-3 and includes no moving picture data files 111.

Searches may be carried out through the AV contents 101 that have no moving picture data files 111 corresponding to video tape cassettes. These searches may be utilized in such a way as to know images and voices recorded on the relevant video tape cassettes.

Figure 8:
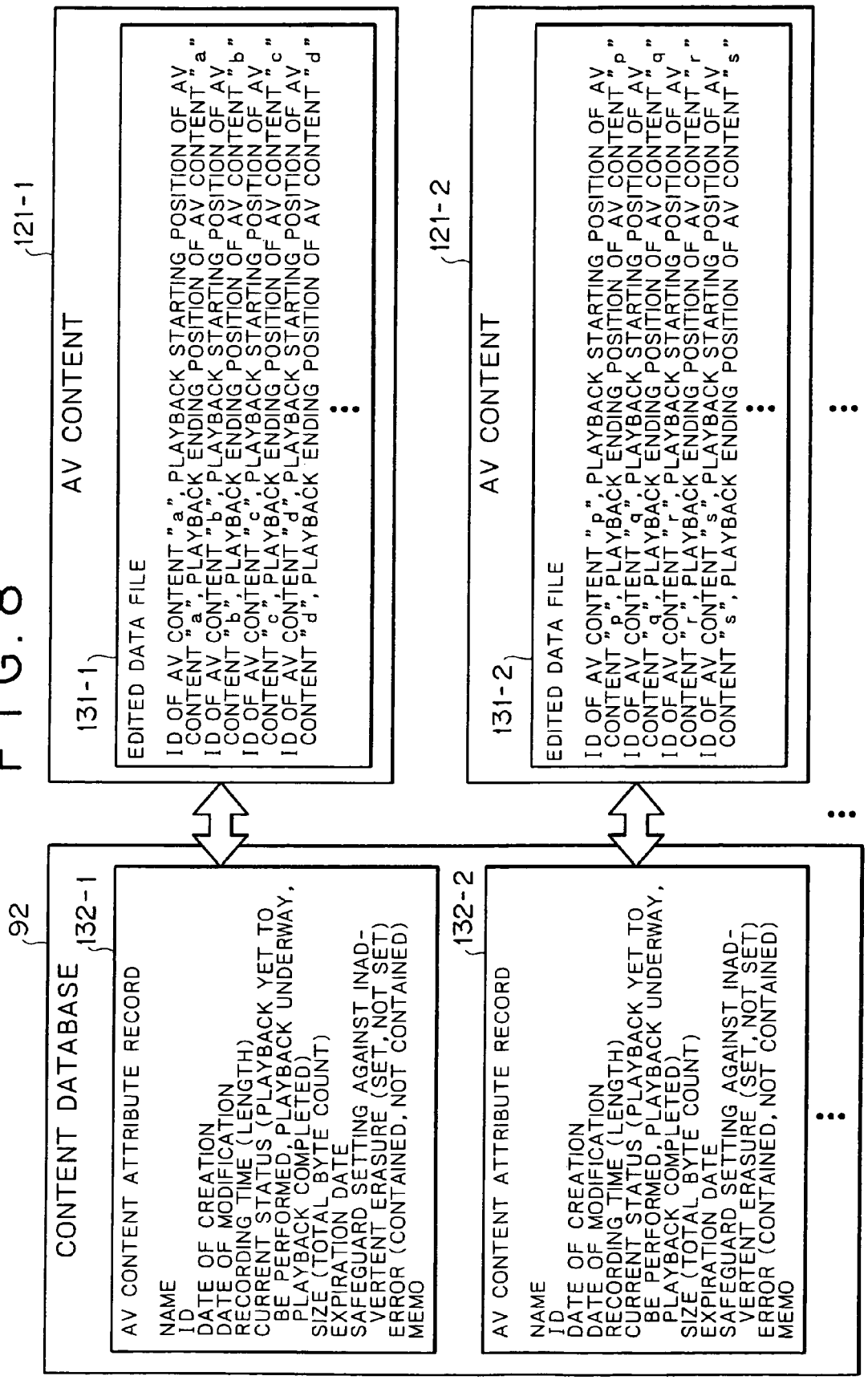
FIG. 8 is an explanatory view indicating structures of other AV contents.

FIG. 8 is an explanatory view of typical AV contents created when the AV content editing program 83 edits the AV content 101. The AV content 121-1 created by the AV content editing program 83 is illustratively made of an edited data file 131-1 containing: ID of an AV content "a" being referenced, playback starting position of the AV content "a", and playback ending position of the AV content "a"; ID of an AV content "b", playback starting position of the AV content "b", and playback ending position of the AV content "b"; ID of an AV content "c", playback starting position of the AV content "c", and playback ending position of the AV content "c"; and so on.

Likewise, the AV content 121-2 created by the AV content editing program 83 is illustratively composed of an edited data file 131-2 containing: ID of an AV content "p" being referenced, playback starting position of the AV content "p", and playback ending position of the AV content "p"; ID of an AV content "q", playback starting position of the AV content "q", and playback ending position of the AV content "q"; ID of an AV content "r", playback starting position of the AV content "r", and playback ending position of the AV content "r"; and so on.

An AV content attribute record 132-1 corresponding to the AV content 121-1 created by the AV content editing program 83 accommodates attribute data on the AV content 121-1, such as a name, ID, date of creation, date of modification, recording time, current status, expiration date, safeguard setting against inadvertent erasure, presence or absence of error, and memo. An AV content attribute record 132-2 corresponding to the AV content 121-2 holds attribute data on the AV content 121-2, such as a name, ID, date of creation, date of modification, recording time, current status, expiration date, safeguard setting against inadvertent erasure, presence or absence of error, and memo.

The data representing the current status held in the AV content attribute record 132-1 indicate that the AV content 131-1 is in one of three states: playback yet to be performed, playback underway, or playback completed. The data denoting the current status retained in the AV content attribute record 132-2 indicate that the AV content 131-2 is also in one of three states: playback yet to be performed, playback underway, or playback completed.

Utilizing the AV content 121-1 or 121-2 makes it possible to edit images and voice through the use of reduced storage regions.

In the description that follows, the AV content 121-1 or 121-2 may each be referred to simply as the AV content 121 if there is no specific need to distinguish the two contents. Similarly, the AV content attribute record 132-1 or 132-2 may each be referred to simply as the AV content attribute record 132 if there is no specific need to distinguish the two records.

Figure 9:
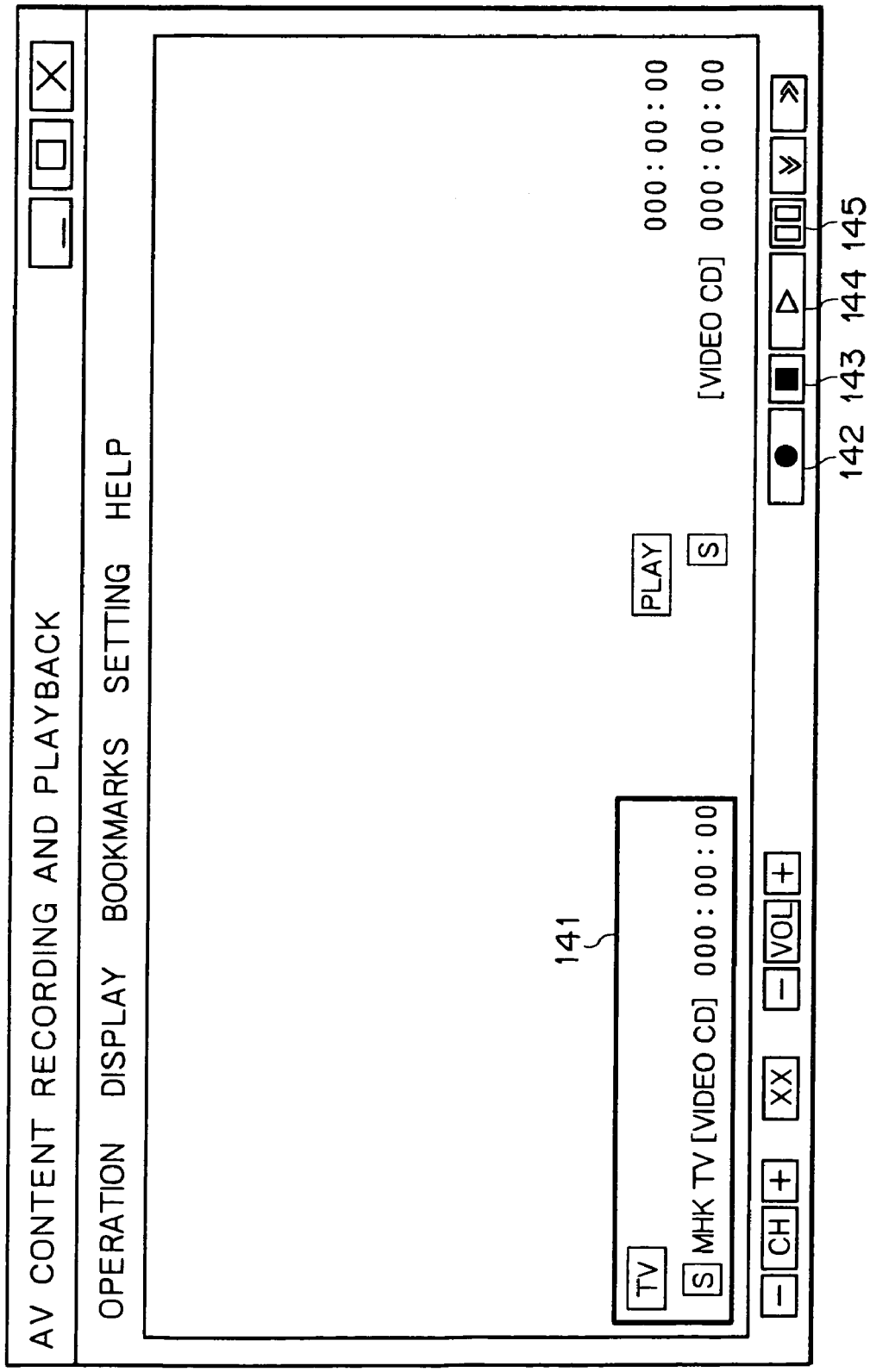
FIG. 9 is an explanatory view of a screen displayed by the recording and playback program.

Below is a description of screens displayed by the recording and playback program 81 on the CRT 30 of the personal computer 1. FIG. 9 is an explanatory view of a screen displayed by the recording and playback program 81 on the CRT 30 of the personal computer 1 when recording operations are allowed to be performed.

A channel to be recorded, a recording mode and other settings are established in a recording window 141. With recording started, the recording and playback program 81 referencing the settings in the recording window 141 enables operations of the tuner 54 or MPEG encoder 58 in the image processing board 34, creates a relevant AV content 101 and an AV content attribute record 102, and records the created content and record to the HDD 31.

When the recording window 141 is selected and made active, a recording button 142 and a stop button 143 become active and operable. That is, when the recording window 141 is selectively activated, clicking on the recording button 142 causes the recording and playback program 81 to start recording; clicking on the stop button 143 causes the program 81 to stop recording.

Meanwhile, when the recording window 141 is selected and made active, a playback button 144 and a pause button 145 become inactive. Clicking on the playback button 144 or pause button 145 does not cause the recording and playback program 81 to initiate the corresponding operation.

Figure 10:
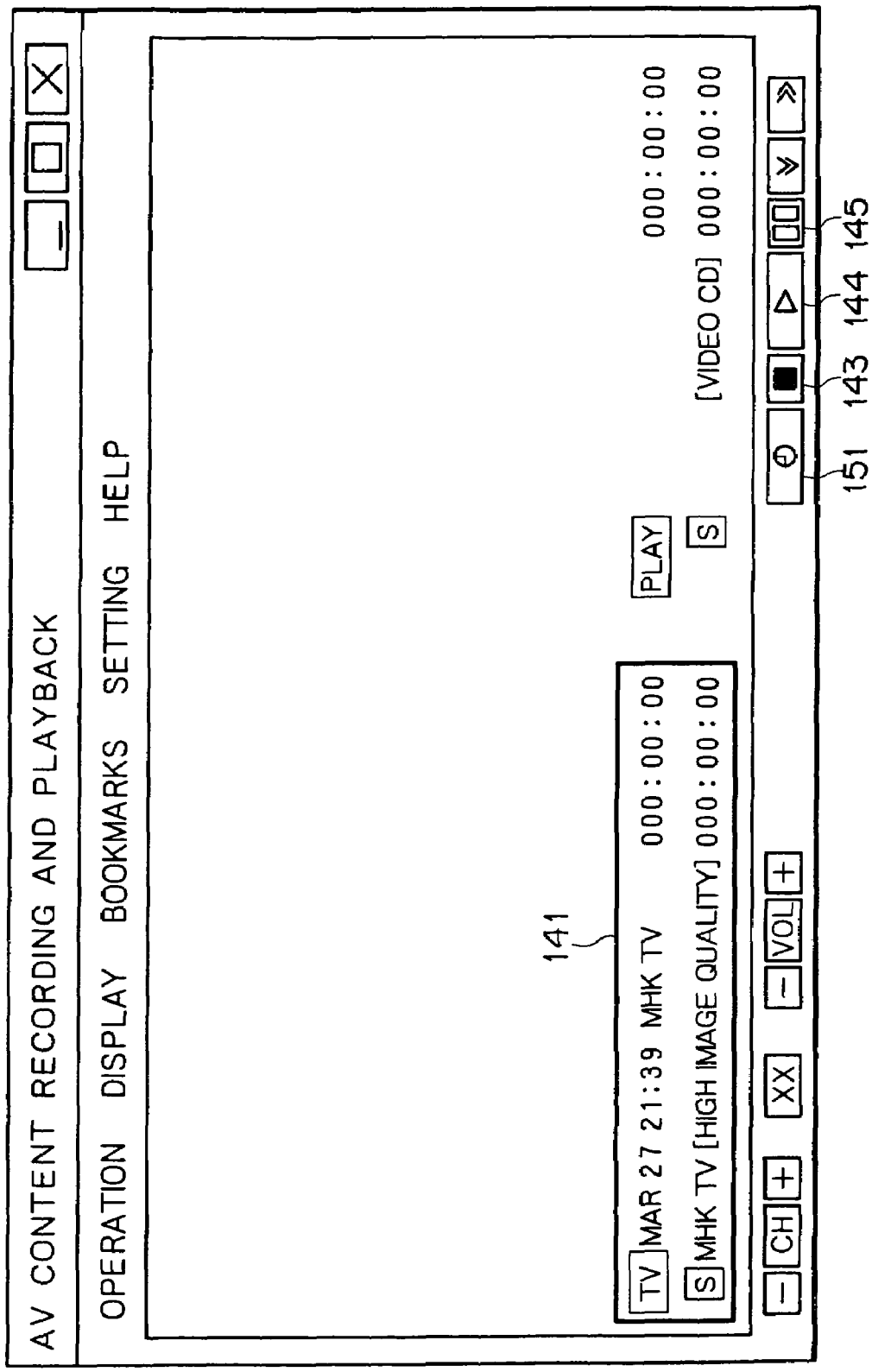
FIG. 10 is an explanatory view of another screen displayed by the recording and playback program.

FIG. 10 is an explanatory view of a screen displayed by the recording and playback program 81 on the CRT 30 of the personal computer 1 when recording is started. The recording window displays an elapsed time since the start of recording and a current time in addition to the channel being recorded and the recording mode in effect.

With recording started, the recording button 142 is replaced on display by a recording time change button 151. The recording time is changed every time the recording time change button 151 is clicked on.

FIGS. 11A, 11B and 11C are explanatory views showing how the recording time is changed by clicking on the recording time change button 151. When recording is started, the recording time is set for a maximum recordable time computed on the basis of the quantity of data that may be recorded on the HDDs 31-1 and 31-2 (i.e. available storage capacity) and of the quantity of video data per unit recording period determined by the recording mode currently in use.

For example, suppose that the quantity of data recordable on the HDD 31-1 is three gigabytes, that the quantity of data recordable on the HDD 31-2 is six gigabytes, and that the quantity of video data recorded per second in the standard recording mode is five megabits. Given these parameters, the maximum recordable time is calculated as follows:

$$(3\text{ gigabytes} + 6\text{ gigabytes}) * (8\text{ bits/byte})/(5\text{ megabits/second}) = 14{,}400\text{ seconds} = 4\text{ hours}$$

Suppose that less than 30 minutes have elapsed since the start of recording and that the recording time is set for the maximum recordable time as shown in FIG. 11A. In that state, clicking once on the recording time change button 151 changes the recording time to 30 minutes. Thereafter, the recording time is changed to one hour, to one hour and 30 minutes, to two hours, to two hours and 30 minutes, and to three hours as the recording time change button 151 is clicked on successively. The recording time reverts to the maximum recordable time when, with the recording time set for three hours, the recording time change button 151 is clicked on.

Suppose that a time period of more than 30 minutes and less than an hour has elapsed since the start of recording and that the recording time is set for the maximum recordable time as shown in FIG. 11B. In that state, clicking once on the recording time change button 151 changes the recording time to one hour. Thereafter, the recording time is changed to one hour and 30 minutes, to two hours, to two hours and 30 minutes, and to three hours as the recording time change button 151 is clicked on successively. With the recording time set for three hours, the recording time reverts to the maximum recordable time when the recording time change button 151 is clicked on.

Suppose now that a time period of more than one hour and 30 minutes and less than two hours has elapsed since the start of recording and that the recording time is set for the maximum recordable time as shown in FIG. 11C. In that state, clicking once on the recording time change button 151 changes the recording time to two hours. Thereafter, the recording time is changed to two hours and 30 minutes and to three hours as the recording time change button 151 is clicked on successively. With the recording time set for three hours, the recording time reverts to the maximum recordable time when the recording time change button 151 is clicked on.

As described above, the user can change the recording time easily and adequately by simply clicking on the recording time change button 151.

Figure 12:
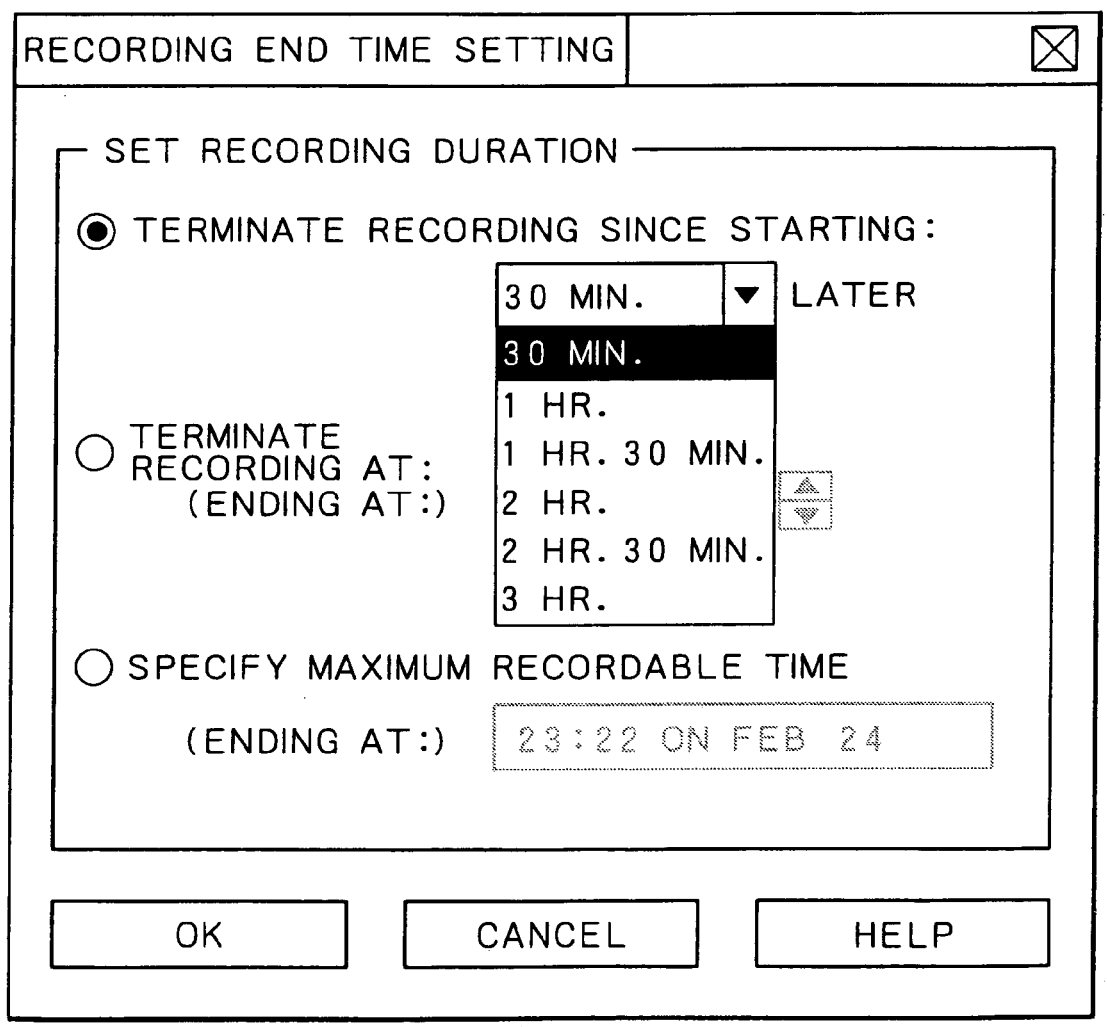
FIG. 12 is an explanatory view of a recording time setting window.

The recording time may also be set in a recording time setting window displayed by selecting a relevant menu command on the screen of the recording and playback program 81. FIGS. 12 and 13 are explanatory views of the recording time setting window. FIG. 12 shows a screen on which to select a recording time since the recording start time using a pull-down menu. FIG. 13 depicts a screen on which to select a maximum recordable time.

Using the recording time setting window allows the user to set a desired recording time quickly.

Figure 14:
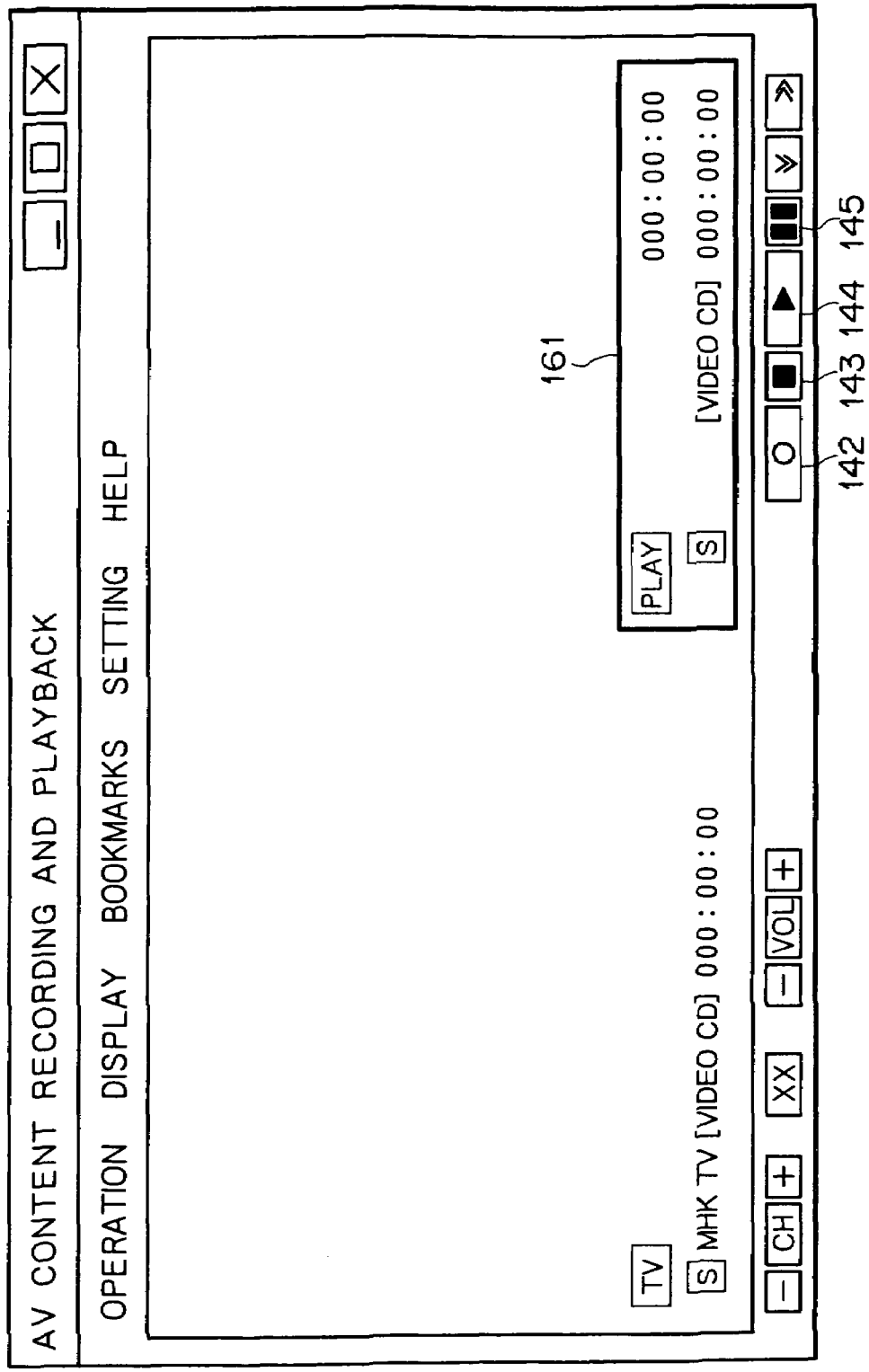
FIG. 14 is an explanatory view of a screen displayed by the recording and playback program.

Below is a description of a screen in effect when the recording and playback program 81 reproduces the AV content 101 or 121. FIG. 14 is an explanatory view of the screen displayed by the recording and playback program 81 on the CRT 30 of the personal computer 1 when playback operations are allowed to be performed.

A playback window 161 displays the recording mode of the AV content to be reproduced and other information. When the playback window 161 is selected and made active, the stop button 143, playback button 144 and pause button 145 become active and operable. That is, with the playback window 161 selectively activated, the recording and playback program 81 starts playback when the playback button 14 is clicked on, stops playback temporarily when the pause button 145 is clicked on, and terminates playback when the stop button 143 is clicked on.

Meanwhile, when the playback window 161 is selected and made active, the recording button 142 becomes inactive. Clicking on the recording button 142 does not cause the recording and playback program 81 to initiate the corresponding operation.

As described above, depending on the selection of either the recording window 141 or the playback window 161, the recording and playback program 81 correspondingly enables or disables the recording button 142, stop button 143, playback button 144, and pause button 145. This allows the user to know unfailingly what can be performed at a given point in time and thus to carry out the necessary operations quickly without making mistakes.

Figure 15:
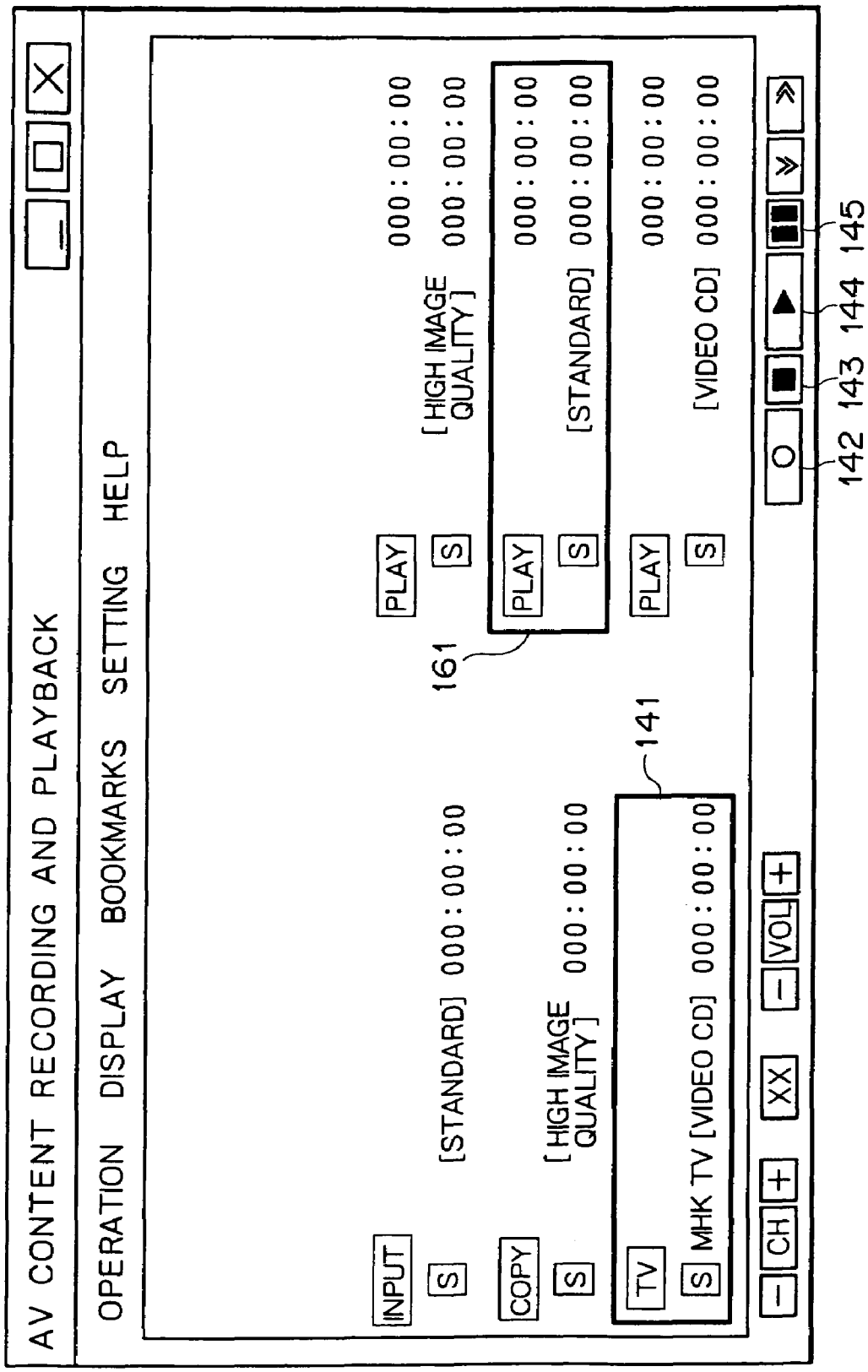
FIG. 15 is an explanatory view of another screen displayed by the recording and playback program.

FIG. 15 is an explanatory view of another screen displayed by the recording and playback program 81 on the CRT 30 of the personal computer 1 when a plurality of recordings as well as a plurality of playbacks are carried out simultaneously (e.g., where a plurality of image processing boards 34 incorporated in the personal computer 1, where the image processing board 34 has a plurality of MPEG encoders 58 or MPEG decoders 60, or where processes of the MPEG encoder 58 or MPEG decoder 60 are executed by the CPU 21). When a recording window 141 in which to designate a recording is selected, the recording button 142 and stop button 143 are activated and the playback button 144 and pause button 145 are deactivated. When a playback window 161 in which to designate a playback is selected, the playback button 144, pause button 145 and stop button 143 are activated and the recording button 142 is deactivated.

As described, where a plurality of recordings are performed simultaneously, the recording and playback program 81 activates or deactivates each of the recording button 142, stop button 143, playback button 144, and pause button 145 in keeping with the recording window 141 or playback window 161 being selected. The selected states of the buttons let users know which operations are currently allowed to be performed, making it possible for them to carry out the appropriate operations quickly without making mistakes.

Figure 16:
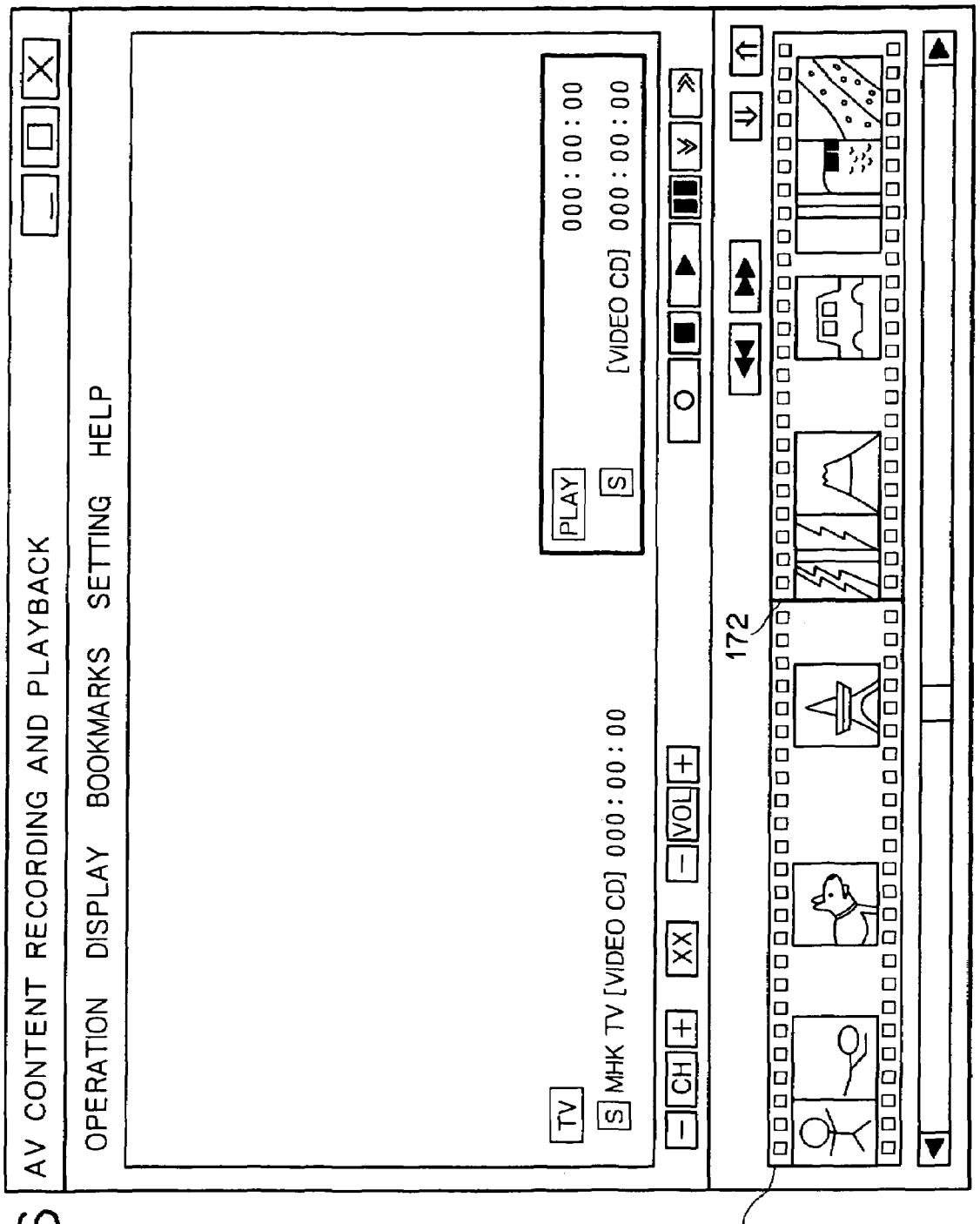
FIG. 16 is an explanatory view of another screen displayed by the recording and playback program.

FIG. 16 is an explanatory view of another screen displayed by the recording and playback program 81 on the CRT 30 of the personal computer 1 when the AV content 101-1 is reproduced so as to display still pictures retrieved from the still picture data files 112-1-1 through 112-1-3. A still picture display window 171 displays still pictures read from the still picture data files 112-1-1 through 112-1-3 (i.e., scene switchover still pictures) in a predetermined thumbnail size each. The image positions in the horizontal direction of the still picture display window 171 represent the chronological sequence of the pictures reproduced or yet to be reproduced.

The position indicated by a current position indicator gauge 172 corresponds to the present time, i.e., the time of the picture currently reproduced. Pictures on the left-hand side of the current position indicator gauge 172 in the window correspond to the past times proportional to the distances from the current position indicated by the gauge 172 (i.e., the left-hand side pictures have been reproduced); pictures on the right-hand side of the gauge 172 correspond to the future times proportional to the distances from the current position indicated by the gauge 172 (i.e., the right-hand side pictures are yet to be reproduced).

The thumbnail images displayed in the still picture display window 171 are positioned so as to correspond to scene switchover points. If scene switchovers occur at short intervals, the corresponding thumbnail images appear overlapping on display. As the display of the reproduced picture progresses (i.e., as time elapses), the display location of thumbnail images moves from right to left in the window.

It is possible to scroll, illustratively by means of drag operations, only thumbnail images in the still picture display window 171 apart from the currently reproduced picture. It is also possible to scroll the thumbnail images by manipulating the scroll bar. In any case, the distances between the thumbnail images always reflect the elapsed times between the scene switchover points and thus remain constant.

The still picture display window 171 gives a display of sprocket perforations much like those of a movie film. As picture playback progresses over time, the positions of perforations shift from right to left in keeping with the thumbnail image location. The user can grasp intuitively the passage of playback time when looking at the movement of the movie film perforations in the still picture display window 171.

As described, the user can quickly recognize scene switchovers within a given range thanks to the thumbnail images in the still picture display window 171. This makes it possible to reach the desired scene in the shortest possible time.

Figure 17:
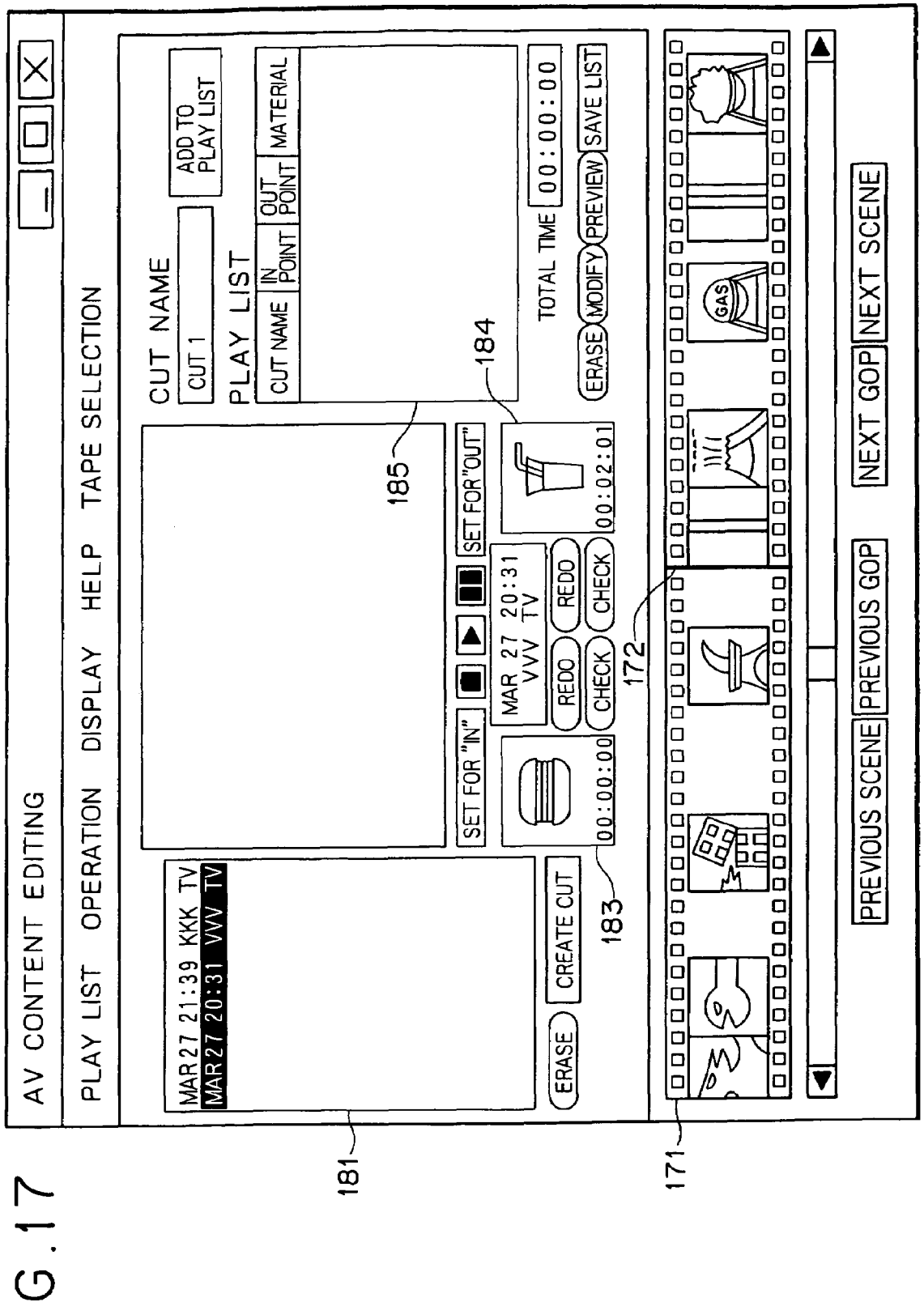
FIG. 17 is an explanatory view of a screen displayed by the AV content editing program.

As shown in FIG. 17, the still picture display window 171 may also be allowed to appear in a screen displayed by the AV content editing program 83 on the CRT 30 of the personal computer 1. The AV content editing program 83 selects at least one AV content 101 and chooses one or a plurality of pictures over a certain time period (i.e., picture or pictures designated by a starting and an ending position), thereby creating the AV content 121 discussed in conjunction with FIG. 8.

A content selection window 181 displays the name of the AV content 101 to be edited, a date of content creation and other information. A picture playback window 182 displays the reproduced picture in synchronism with the display in the still picture display window 171.

An edit start picture display window 183 displays an edit start position of a picture which is targeted for editing and included in the AV content 101 in question. An edit end picture display window 184 displays an edit end position of the edit target picture included in the AV content 101.

An edit picture list display window 185 displays the name of the initial AV content 101, a picture start position, a picture end position and other information regarding a specific picture contained in the AV content 121 edited and created by the AV content editing program 83.

The still picture display window 171 of the AV content editing program 83 displays thumbnail images of still pictures contained in the still picture data file 112 in a specific AV content 101 selected for editing (i.e., the AV content 101 displayed actively in the content selection window 181). The positions of thumbnail images in the still picture display window 171 are the same as those in effect when the recording and playback program 81 is in operation.

As described above, the user can quickly recognize scene switchovers within a given range thanks to the thumbnail images in the still picture display window 171. This makes it possible to edit speedily the AV content 121 containing desired scenes.

Figure 18:
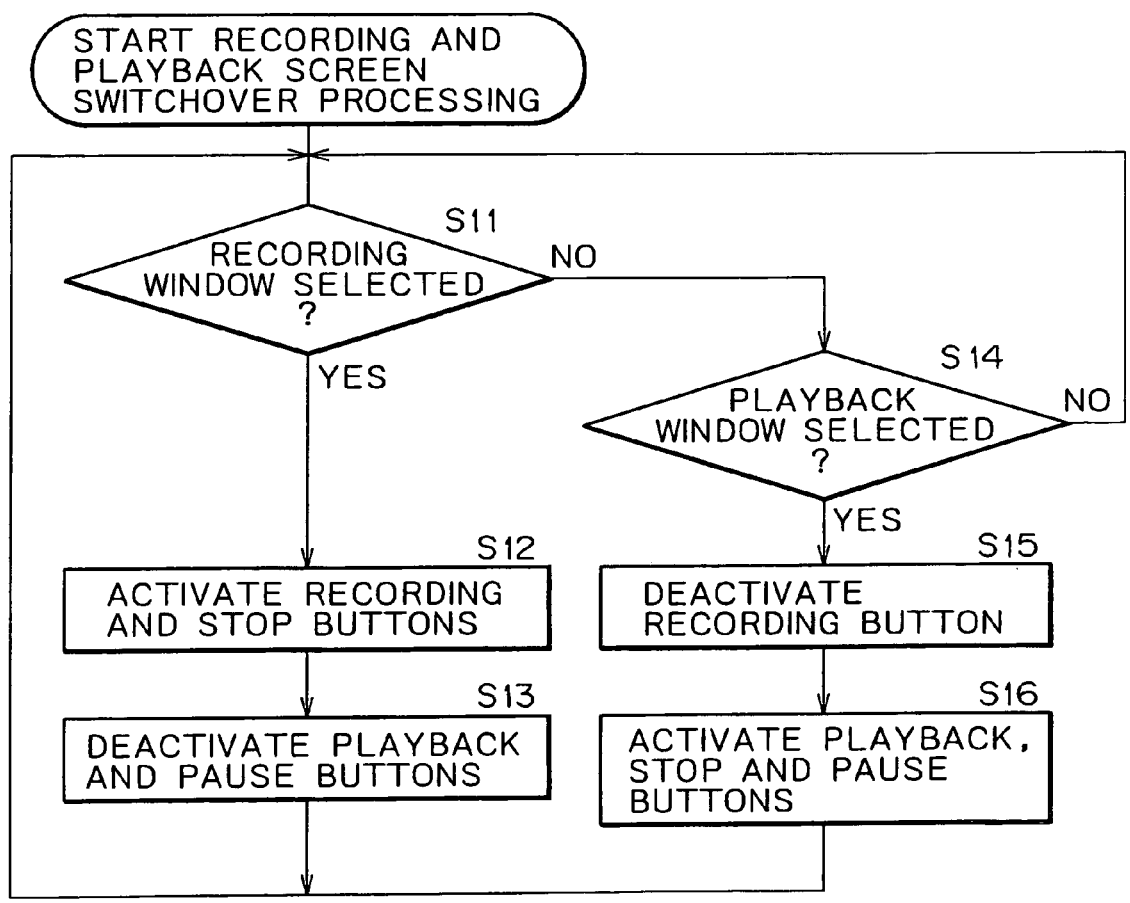
FIG. 18 is a flowchart of steps for switching recording and playback screens.

Described below with reference to a flowchart of FIG. 18 is how recording and playback screens are switched when the recording and playback program 81 is loaded into the RAM 23 and executed by the CPU 21. In step S11, the recording and playback program 81 checks to see if the recording window 141 is selected on the basis of the input from the keyboard 28 or from the mouse 29. If the recording window 141 is judged to be selected, step S12 is reached in which the recording button 142 and stop button 143 are activated.

In step S13, the recording and playback program 81 deactivates the playback button 144 and pause button 145. Control is then returned to step S11 and the processing is repeated.

If in step S11 the recording window 141 is not judged to be selected, then step S14 is reached. In step S14, the recording and playback program 81 checks to see if the playback window 161 is selected on the basis of the input from the keyboard 28 or from the mouse 29. If the playback window 161 is judged to be selected, then step S15 is reached in which the recording and playback program 81 deactivates the recording button 142. In step S16, the recording and playback program 81 activates the stop button 143, playback button 144 and pause button 145. Control is then returned to step S11 and the processing is repeated.

If in step S14 the playback window 161 is not judged to be selected, that means neither the recording window 141 nor the playback window 161 has been selected. In that case, step S11 is reached again and the processing is continued.

The recording/playback screen switchover processing comes to an end when the recording and playback program 81 is terminated.

As described, depending on the recording window 141 or the playback window 161 being selected, the recording and playback program 81 correspondingly changes each of the recording button 142, playback button 144 and pause button 145 in operational state.

Figure 19:
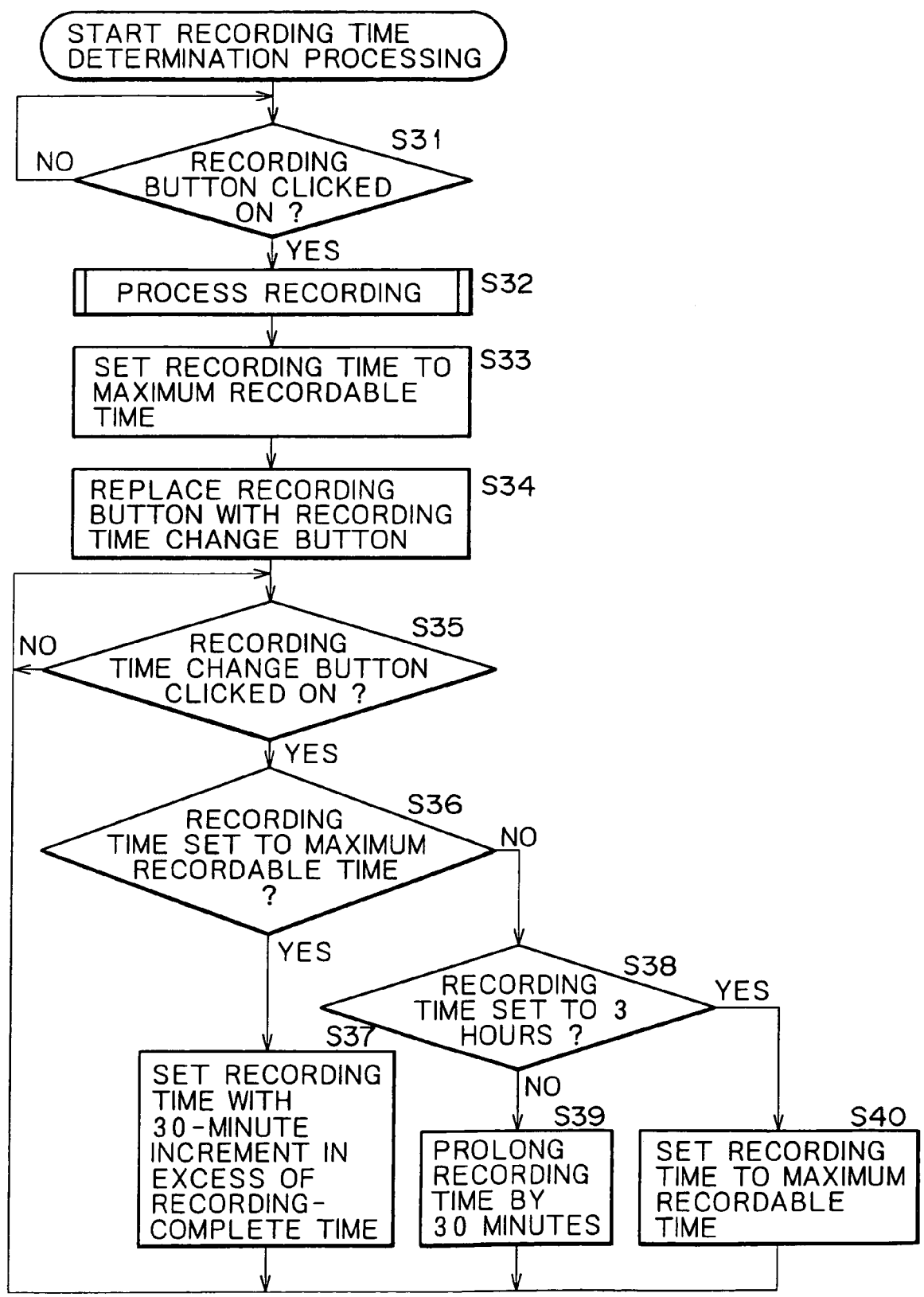
FIG. 19 is a flowchart of steps for determining recording time.

Described below with reference to a flowchart of FIG. 19 is how recording time is determined when the recording and playback program 81 is loaded into the RAM 23 and executed by the CPU 21. In step S31, the recording and playback program 81 checks to see if the recording button 142 is clicked on in accordance with the input from the mouse 29. If the recording button 142 is not judged to be clicked on, then step 31 is repeated until the recording button 142 is clicked on.

If in step S31 the recording button 142 is judged to be clicked on, step S32 is reached in which the recording and playback program 81 carries out a recording process. Details of the recording process in step S32 will be described later with reference to a flowchart of FIG. 20.

In step S33, the recording and playback program 81 sets the recording time for a maximum recordable time based on the quantity of data recordable per unit time in the currently selected recording mode and as per the available capacities on the HDDs 31-1 and 31-2. In step S34, the recording and playback program 81 replaces the recording button 142 with the recording time change button 151 on display.

In step S35, the recording and playback program 81 checks to see if the recording time change button 151 is clicked on in accordance with the input from the mouse 29. If the recording time change button 151 is not judged to be clicked on, step S35 is repeated until the recording time change button 151 is clicked on.

If the recording time change button 151 is judged to be clicked on, then step S36 is reached. In step S36, a check is made to see if the current recording time is set for the maximum recordable time. If in step S36 the current recording time is judged to be set for the maximum recordable time, then step S37 is reached. In step S37, the recording and playback program 81 sets recording time with a 30-minute time increment in excess of the recording-complete time. Then step S35 is reached again and the processing is repeated.

If in step S36 the current recording time is not judged to be set for the maximum recordable time, then step S38 is reached. In step S38, a check is made to see if the recording time is set for three hours. If the recording time is not judged to be set for three hours, step S39 is reached in which the recording time is prolonged by 30 minutes. Step S39 is followed by step S35 and the processing is repeated.

If in step S38 the recording time is judged to be set for three hours, step S40 is reached in which the recording and playback program 81 sets the recording time for the maximum recordable time. Step S40 is followed by step S35 and the processing is repeated.

The recording time determination processing comes to an end when the recording and playback program 81 is terminated or when the recording has ended.

As described, simply clicking on the recording time change button 151 sets a recording time in excess of the recording-complete time.

Figure 20:
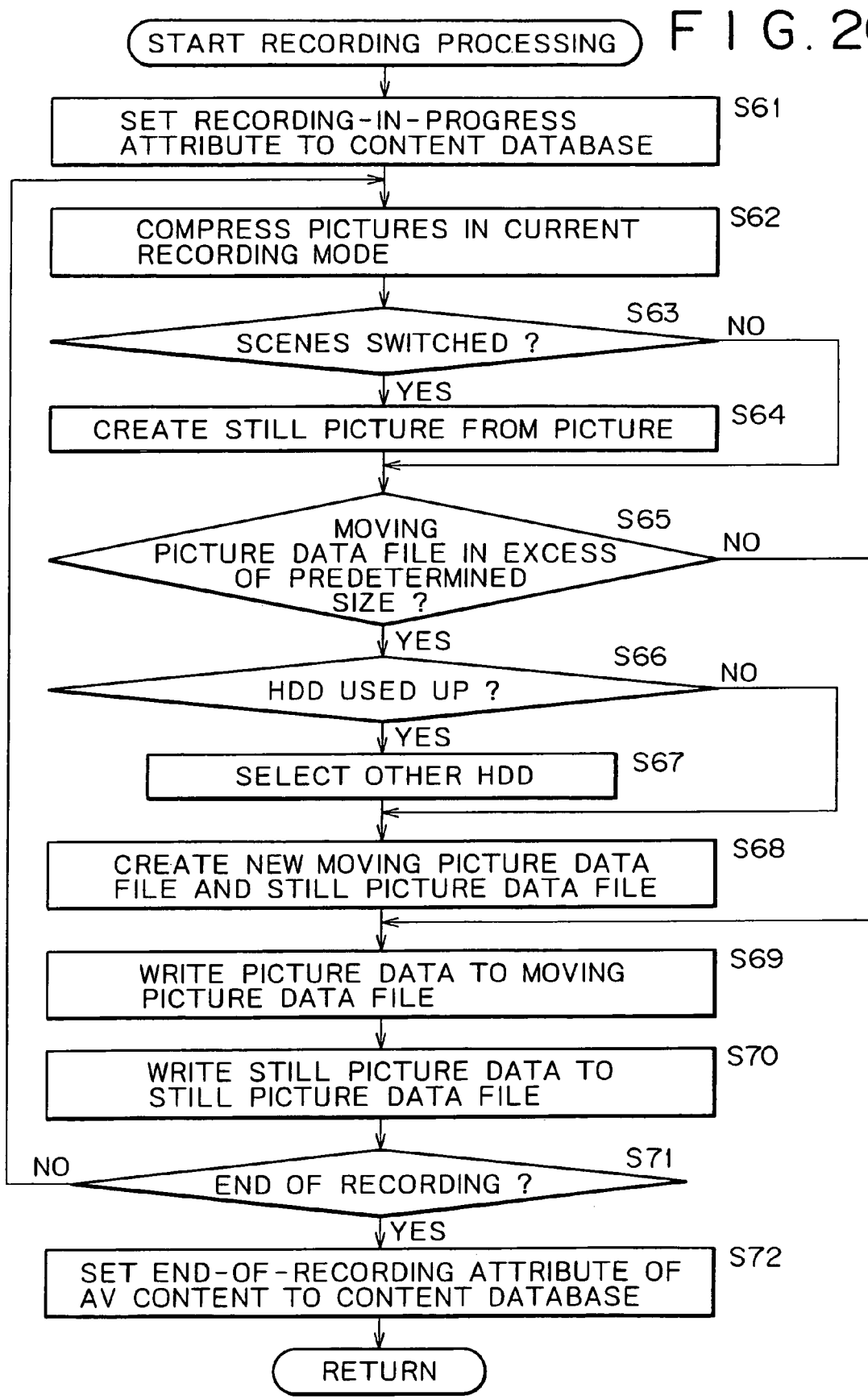
FIG. 20 is a flowchart of steps constituting a detailed recording process.

The recording process of step S32 in FIG. 19 will now be described in more detail with reference to FIG. 20. In step S61 in FIG. 20, the recording and playback program 81 writes to the content database 92 an attribute indicating that a specific AV content is being recorded. In step S62, the hardware interface 91 under orders of the recording and playback program 81 causes the MPEG encoder 58 to compress target pictures in the currently selected recording mode such as high image quality or standard. In step S63, under control of the recording and playback program 81, the hardware interface 91 checks to see if scenes have been switched in the picture being recorded on the basis of the output from the MPEG encoder 58. If scenes in the currently recorded picture are judged to be switched, then step S64 is reached. In step S64, the MPEG encoder 58 is ordered to create a still picture corresponding to the recorded picture (i.e., moving picture).

If in step S63 scenes in the currently recorded picture are not judged to be switched, that means there is no need to create any still picture. In that case, step S64 is skipped and step S65 is reached.

In step S65, the file I/O 93 under orders of the recording and playback program 81 checks to see if the moving picture data file 111 currently storing the compressed picture has exceeded a predetermined size. If the moving picture data file 11 is judged to have exceeded the predetermined size, then step S66 is reached. In step S66, a check is made to see if the capacity of the HDD 31 now recording the moving picture data file 111 has been used up.

If in step S66 the capacity of the HDD 31 currently recording the moving picture data file 111 is judged to have been used up, then step S67 is reached. In step S67, the recording and playback program 81 selects the other HDD 31.

If in step S66 the HDD 31 now storing the moving picture data file 111 is judged to have an available capacity, that means the HDD 31 may continue recording a new moving picture data file 111. In that case, step S67 is skipped and step S68 is reached.

In step S68, the file I/O 93 under control of the recording and playback program 81 creates a new moving picture data file 111 and a new still picture data file 112 on the appropriate HDD 31, writes compressed picture data to the new moving picture data file 111, and writes created still pictures to the new still picture data file 112. Step S68 is followed by step S69.

If in step S65 the moving picture data file 111 is not judged to have exceeded the predetermined size, that means compressed picture data may continuously be recorded to the current moving picture data file 111. In that case, step S69 is reached.

In step S69, the file I/O 93 under orders of the recording and playback program 81 writes picture data compressed by the MPEG encoder 58 to the moving picture data file 111 on the relevant HDD 31. In step S70, the recording and playback program 81 writes still pictures created by the MPEG encoder 58 along with relevant data such as scene playback times to the still picture data file 112 on the appropriate HDD 31.

In step S71, the recording and playback program 81 determines whether or not to end the recording based on the recording time setting or on the input from the mouse 29. If it is determined that the recording may continue, then step S62 is reached again for continuous recording.

If in step S71 it is determined that the recording should be terminated, then step S72 is reached. In step S72, the recording and playback program 81 writes to the content database 92 an attribute indicating the end of recording of the AV content 101, and the processing comes to an end.

In the manner described above, the recording and playback program 81, hardware interface 91 and file I/O 93 function to record necessary pictures. The process in step S64 for creating still pictures corresponding to the currently recorded picture (i.e., moving picture) may be carried out alternatively by the CPU 21.

Figure 21:
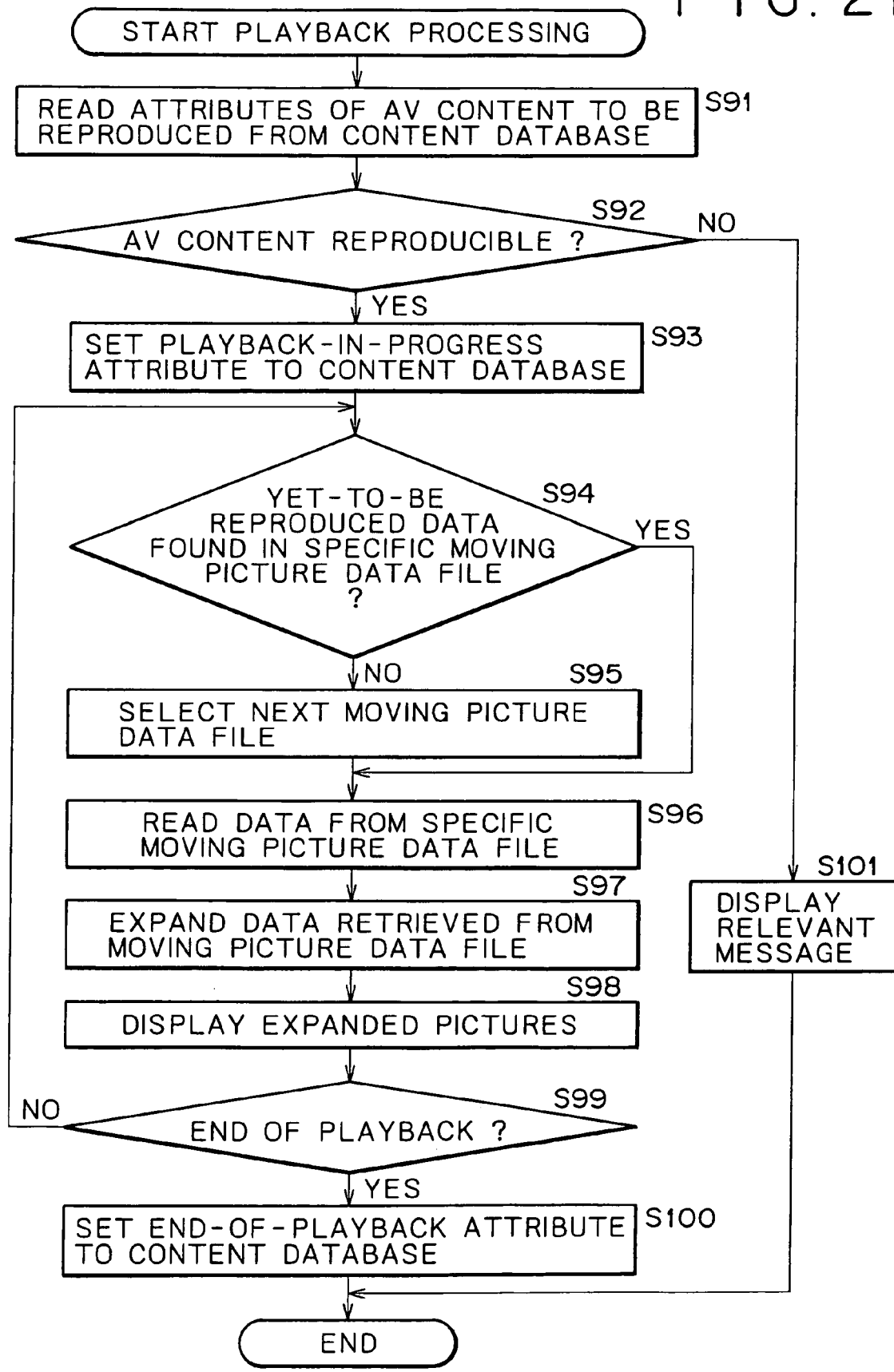
FIG. 21 is a flowchart of steps for playback processing.

Described below with reference to a flowchart of FIG. 21 is how a specific AV content 101 is reproduced when the recording and playback program 81, hardware interface 91 and file I/O 93 are loaded into the RAM 23 and executed by the CPU 21. In step S91, the recording and playback program 81 reads from the content database 92 data representing a specific attribute held in the AV content attribute record 102 corresponding to the AV content 101 in question. In step S92, the recording and playback program 81 checks to see if the AV content 101 in question is reproducible on the basis of the content attribute retrieved in step S91. If the AV content 101 is judged to be reproducible, then step S93 is reached. In step S93, the content database 92 is set with an attribute indicating that the AV content 101 in question is being reproduced.

In step S94, the file I/O 93 under control of the recording and playback program 81 checks to see if the moving picture data file 111 in the AV content 101 still has data yet to be reproduced. If the moving picture data file 111 in the AV content 101 is judged to have no further data to be reproduced, step S95 is reached in which the next moving picture data file 111 is selected. Step S95 is followed by step S96.

If in step S94 the moving picture data file 111 in the AV content 101 is judged to have data yet to be reproduced, step S95 is skipped and step S96 is reached for playback of the yet-to-be reproduced data.

In step S96, the file I/O 93 under orders of the recording and playback program 81 reads data from the moving picture data file 111 in the AV content 101. In step S97, the hardware interface 91 under control of the recording and playback program 81 causes the MPEG decoder 60 to expand the retrieved data from the moving picture data file 111. In step S98, the hardware interface 91 under orders of the recording and playback program 81 causes the CRT 30 to display relevant images based on the data expanded in step S97.

In step S99, the recording and playback program 81 determines whether or not to end the playback based on the input from the mouse 29 or from other device. If it is determined that the playback may continue, step S94 is reached again and the playback processing is repeated.

If it is determined in step S99 that the playback should be terminated, then step S100 is reached. In step S100, the recording and playback program 81 writes to the content database 92 an attribute indicating the end of playback of the AV content 101, and the processing is brought to an end.

If in step S92 the AV content 101 is not judged to be reproducible, then step S101 is reached. In step S101, the recording and playback program 81 causes the CRT 30 to display a message indicating that the AV content 101 in question cannot be reproduced. The processing is then brought to an end.

In the manner described above, the recording and playback program 81, hardware interface 91 and file I/O 93 function to reproduce the AV content 101.

Figure 22:
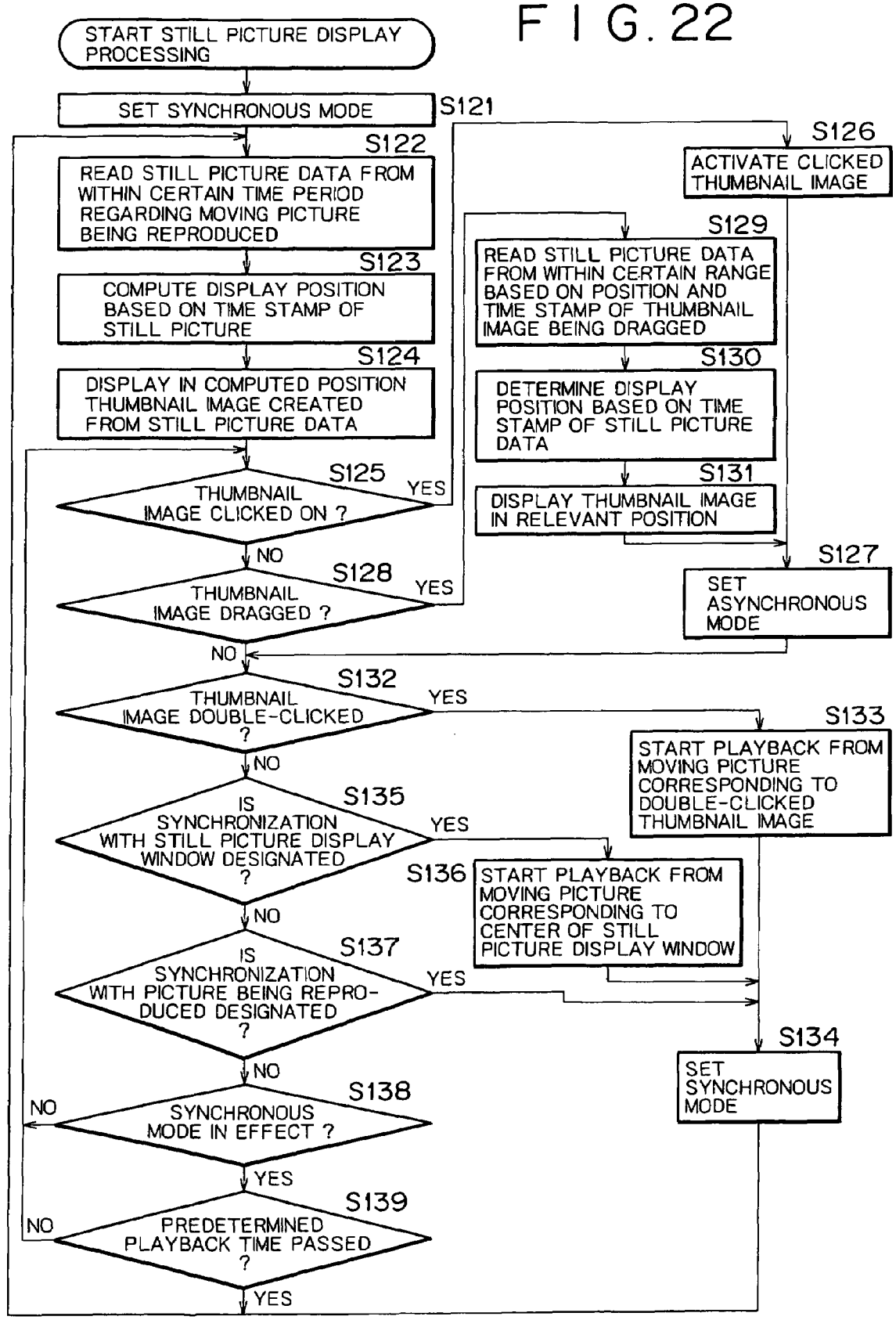
FIG. 22 is a flowchart of steps for displaying still pictures.

Described below with reference to a flowchart of FIG. 22 is how still pictures are displayed when the recording and playback program 81, hardware interface 91 and file I/O 93 are loaded into the RAM 23 and executed by the CPU 21. In step S121, the recording and playback program 81 establishes a synchronous mode in which the currently reproduced picture corresponds to the position of a thumbnail image in the still picture display window 171. In step S122, the file I/O 93 under control of the recording and playback program 81 reads from the still picture data file 112 still picture data in effect within a certain time period in reference to the time of the currently reproduced picture.

In step S123, the recording and playback program 81, in accordance with the time corresponding to the still picture data retrieved in step S122, computes the position of a thumbnail image display derived from the still picture data in question. In step S124, the recording and playback program 81 causes the hardware interface 91 to display the thumbnail image created from the still picture data in that position of the still picture display window 171 which was computed in step S123.

In step S125, the recording and playback program 81 checks to see if the thumbnail image in the still picture display window 171 is clicked on in accordance with the input from the mouse 29. If the thumbnail image in the still picture display window 171 is judged to be clicked on, step S126 is reached in which the clicked thumbnail image is made active. In step S127, the recording and playback program 81 establishes an asynchronous mode in which the currently reproduced picture does not correspond to any thumbnail image in the still picture display window 171. Control is then passed on to step S132.

If in step S125 the thumbnail image in the still picture display window 171 is not judged to be clicked on, then step S128 is reached. In step S128, the recording and playback program 81 checks to see if the thumbnail image in the still picture display window 171 is dragged. If the thumbnail image in the still picture display window 171 is judged to be dragged, then step S129 is reached. In step S129, the file I/O 93 under orders of the recording and playback program 81 reads from the still picture data file 112 still picture data within a specific time range in reference to the position of the dragged thumbnail image as well as to the time corresponding to that image.

In step S130, the recording and playback program 81, in accordance with the time corresponding to the still picture data retrieved in step S129, computes the position of a thumbnail image display derived from the still picture data in question. In step S131, the recording and playback program 81 causes the hardware interface 91 to display the thumbnail image created from the still picture data in that position of the still picture display window 171 which was computed in step S130. Step S131 is followed by step S127 in which the asynchronous mode is established and the processing is continued.

If in step S128 the thumbnail image in the still picture display window 171 is not judged to be dragged, then step S132 is reached. In step S132, the recording and playback program 81 checks to see if the thumbnail image in the still picture display window 171 is double-clicked on the basis of the input from the mouse 29. If the thumbnail image in the still picture display window 171 is judged to be double-clicked, then step S133 is reached. In step S133, picture playback is started from the time corresponding to the double-clicked thumbnail image. In step S134, the recording and playback program 81 establishes the synchronous mode. Step S134 is followed by step S122 and the still picture display processing is repeated.

If in step S132 the thumbnail image in the still picture display window 171 is not judged to be double-clicked, then step S135 is reached. In step S135, the recording and playback program 81 checks to see if synchronization with the still picture display window 171 is designated on the basis of the input from the keyboard 28 or from the mouse 29. If synchronization with the still picture display window 171 is judged to be designated, then step S136 is reached. In step S136, picture playback is started from the time corresponding to the center position of the still picture display window 171. Step S136 is followed by step S134 in which the synchronous mode is established and the processing is continued.

If in step S135 synchronization with the still picture display window 171 is not judged to be designated, then step S137 is reached. In step S137, the recording and playback program 81 checks to see if synchronization with the currently reproduced picture is designated on the basis of the input from the keyboard 28 or from the mouse 29. If synchronization with the currently displayed picture is judged to be designated, step S134 is reached in which the synchronous mode is established and the processing is continued.

If in step S137 synchronization with the currently reproduced picture is not judged to be designated, then step S138 is reached. In step S138, the recording and playback program 81 checks to see if the synchronous mode is in effect. If the synchronous mode is judged to be in effect, then step S139 is reached. In step S139, a check is made to see if a predetermined playback time has elapsed. If the predetermined playback time is judged to have elapsed in step S139, step S122 is reached and the still picture display processing is continued.

If in step S138 the synchronous mode is not judged to be in effect (i.e., the asynchronous mode is found to be in effect) and if in step S139 the predetermined playback time is not judged to have elapsed, then there is no need to update the still picture display. In that case, step S125 is reached and the processing is continued.

In the manner described above, the recording and playback program 81, hardware interface 91 and file I/O 93 update the still picture display based on the operations of the mouse 29 or other device as well as on the display time. This allows the user speedily to reproduce specific scene switchover pictures.

The still picture display processing by the AV content editing program 83 is the same as that discussed above in reference to the flowchart of FIG. 22.

Figure 23:
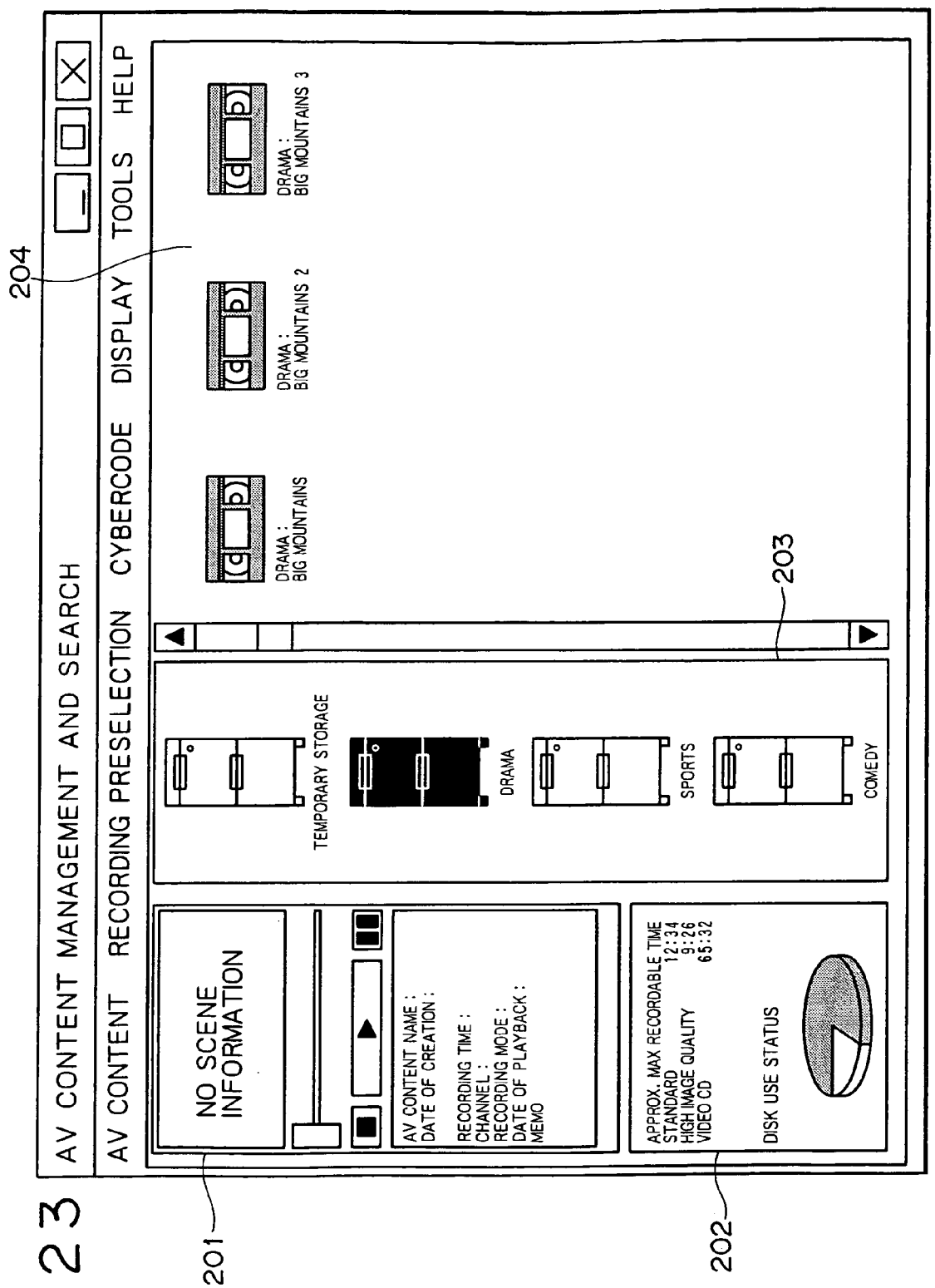
FIG. 23 is an explanatory view of a screen displayed by the AV content management and search program.

The AV content management and search program 82 will now be described. FIGS. 23 and 24 are explanatory views of screens displayed by the AV content management and search program 82 on the CRT 30 of the personal computer 1.

FIG. 23 is an explanatory view of a screen displayed by the AV content management and search program 82 on the CRT 30 of the personal computer 1 when icons of specific AV contents 101 and 121 are not active. An AV content information display window 201 displays attribute data such as a name and a date of creation recorded in the AV content attribute record 102 or 132 corresponding to an active AV content 101 or 121, as well as still pictures recorded in the still picture data file 112 corresponding to the active AV content 101. Because none of the AV contents 101 is currently active, the AV content information display window 201 in FIG. 23 displays no data.

A recording time display window 202 displays status of data recordings on the HDDs 31-1 and 31-2 (i.e., quantity of already recorded data and a recordable quantity of data), and indications of approximate recordable times in various recording modes (recordable quantity of data on the HDDs 31-1 and 31-2, and a recordable time period computed from the quantity of picture data that are recordable per unit time in each of the different recording modes).

An AV content classification display window 203 displays icons representing classifications of the AV contents 101 and 121. When classified, the AV contents 101 and 121 are provided with their respective classification settings. An icon denoting the classification of a specific AV content 101 or 121 may be activated by operation of the mouse 29. In the example of FIG. 23, an icon representing a drama is made active.

An AV content icon display window 204 displays icons representing the AV content 101 or 121 whose classification icon is shown active in the AV content classification display window 203. Because the drama icon is shown active in the AV content classification display window 203 in the example of FIG. 23, the AV content icon display window 204 displays icons denoting "Drama: Big Mountains," "Drama: Big Mountains 2" and "Drama: Big Mountains 3" classified as dramas in the AV content 101.

FIG. 24 is an explanatory view of a screen displayed by the AV content management and search program 82 on the CRT 30 of the personal computer 1 when an icon of a specific AV content 101 or 121 is active. In the example of FIG. 24, the icon denoting "Drama: Big Mountains 2" in the AV content 101 is shown active in the AV content icon display window 204. In this case, the AV content information display window 201 displays attribute data such as a name and a date of creation recorded in the AV content attribute record 102 corresponding to the active "Drama: Big Mountains 2" in the AV content 101, as well as still pictures recorded in the still picture data file 112 corresponding to the active AV content 101.

In the description that follows, indications displayed on the screen by the AV content management and search program 82 as shown in FIGS. 23 and 24 are called the icon display.

Below is a description of icons displayed in the AV content icon display window 204. FIGS. 25A through 25M and 26A through 26M are explanatory views of icons that appear in the AV content icon display window 204. The icon in FIG. 25A represents an AV content 101 that has a specific moving picture data file 111, has no expiration date set thereto, has no safeguard setting against inadvertent erasure, contains no error, has been reproduced before, and is being neither reproduced nor recorded at present. The icon in FIG. 25B denotes an AV content 101 that has a specific moving picture data file 111, has an expiration date set thereto, contains no error, has been reproduced before, and is being neither reproduced nor recorded at present. The icon in FIG. 25C indicates an AV content 101 that has a specific moving picture data file 111, has safeguard setting against inadvertent erasure, contains no error, has been reproduced before, and is being neither reproduced nor recorded at present. The icon in FIG. 25D represents an AV content 101 that has a specific moving picture data file 111 and contains error.

The icon in FIG. 25E denotes an AV content 101 that has a specific moving picture data file 111, has no expiration date set thereto, has no safeguard setting against inadvertent erasure, contains no error, has never been reproduced, and is being neither reproduced nor recorded at present. The icon in FIG. 25F indicates an AV content 101 that has a specific moving picture data file 111, has an expiration date set thereto, contains no error, has never been reproduced, and is being neither reproduced nor recorded at present. The icon in FIG. 25G represents an AV content 101 that has a specific moving picture data file 111, has safeguard setting against inadvertent erasure, contains no error, has never been reproduced, and is being neither reproduced nor recorded at present.

The icon in FIG. 25H denotes an AV content 101 that has a specific moving picture data file 111, has no expiration date set thereto, has no safeguard setting against inadvertent erasure, contains no error, is being reproduced and is not recorded at present. The icon in FIG. 25I indicates an AV content 101 that has a specific moving picture data file 111, has an expiration date set thereto, contains no error, is being reproduced and is not recorded at present. The icon in FIG. 25J represents an AV content 101 that has a specific moving picture data file 111, has safeguard setting against inadvertent erasure, contains no error, and is being reproduced and is not recorded at present.

The icon in FIG. 25K denotes an AV content 101 that has a specific moving picture data file 111, has no expiration date set thereto, has no safeguard setting against inadvertent erasure, contains no error, is not reproduced and is being recorded at present. The icon in FIG. 25L indicates an AV content 101 that has a specific moving picture data file 111, has an expiration date set thereto, contains no error, is not reproduced and is being recorded at present. The icon in FIG. 25M represents an AV content 101 that has a specific moving picture data file 111, has safeguard setting against inadvertent erasure, contains no error, is not reproduced and is being recorded at present.

The icon in FIG. 26A denotes an AV content 101 that has a specific moving picture data file 111, has no expiration date set thereto, has no safeguard setting against inadvertent erasure, contains no error, and is being reproduced and recorded simultaneously. The icon in FIG. 26B indicates an AV content 101 that has a specific moving picture data file 111, has an expiration date set thereto, contains no error, and is being reproduced and recorded simultaneously. The icon in FIG. 26C represents an AV content 101 that has a specific moving picture data file 111, has safeguard setting against inadvertent erasure, contains no error, and is being reproduced and recorded simultaneously.

The icon in FIG. 26D denotes an AV content 101 that has a moving picture data file 111 yet to be recorded, has no expiration date set thereto, contains no error, and is preselected for recording. The icon in FIG. 26E indicates an AV content 101 that has a moving picture data file 111 yet to be recorded, has an expiration date set thereto, contains no error, and is preselected for recording. The icon in FIG. 26F represents an AV content 101 that contains error and is preselected for recording.

The icon in FIG. 26G denotes an AV content 101 that has no moving picture data file 111, has no expiration date set thereto, and contains no error. The icon in FIG. 26H indicates an AV content 101 that has no moving picture data file 111, has an expiration date set thereto, and contains no error. The icon in FIG. 26I represents an AV content 101 that has no moving picture data file 111 and contains error.

The icon in FIG. 26J denotes an AV content 121 that has an edited data file 131, has been reproduced before, contains no error, and is not being reproduced at present. The icon in FIG. 26K indicates an AV content 121 that has an edited data file 131, has never been reproduced, contains no error, and is not being reproduced at present. The icon in FIG. 26L represents an AV content 121 that has an edited data file 131, contains no error, and is being reproduced at present. The icon in FIG. 26M denotes an AV content 121 that has an edited data file 131 and contains error.

In the manner described above, the AV content management and search program 82 changes icons in the AV content icon display window 204 depending on the files or attributes making up the AV content 101 or 121. This allows the user to know at a glance the attributes of the AV content 101 or 121 or what is contained therein.

Figure 27:
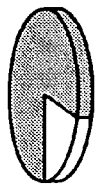
FIG. 27 is an explanatory view of another screen displayed by the AV content management and search program.

FIG. 27 is an explanatory view of another screen displayed by the AV content management and search program 82 on the CRT 30 of the personal computer 1. As with the screens in FIGS. 23 and 24, the screen of FIG. 27 displays the AV content information display window 201 and recording time display window 202. The screen displayed by the AV content management and search program 82 as shown in FIG. 27 comprises an AV content list display window 251 and does not include the AV content classification display window 203 or AV content icon display window 204.

The AV content list display window 251 displays in characters such attributes as names and dates of creation of all AV contents 101 and 121 recorded on the HDDs 31-1 and 31-2. As in the case of FIG. 24, clicking with the mouse 29 on any of such attributes in characters as the name or date of creation of a desired AV content 101 or 121 renders active the AV content 101 or 121 in question. This causes the attributes of the AV content 101 or 121 to appear in the AV content information display window 201.

As described above, the AV content list display window 251 can display numerous AV contents 101 or 121 of diverse classifications all at once.

In the description that follows, the screen display in FIG. 27 given by the AV content management and search program 82 is called the list display.

Figure 28:
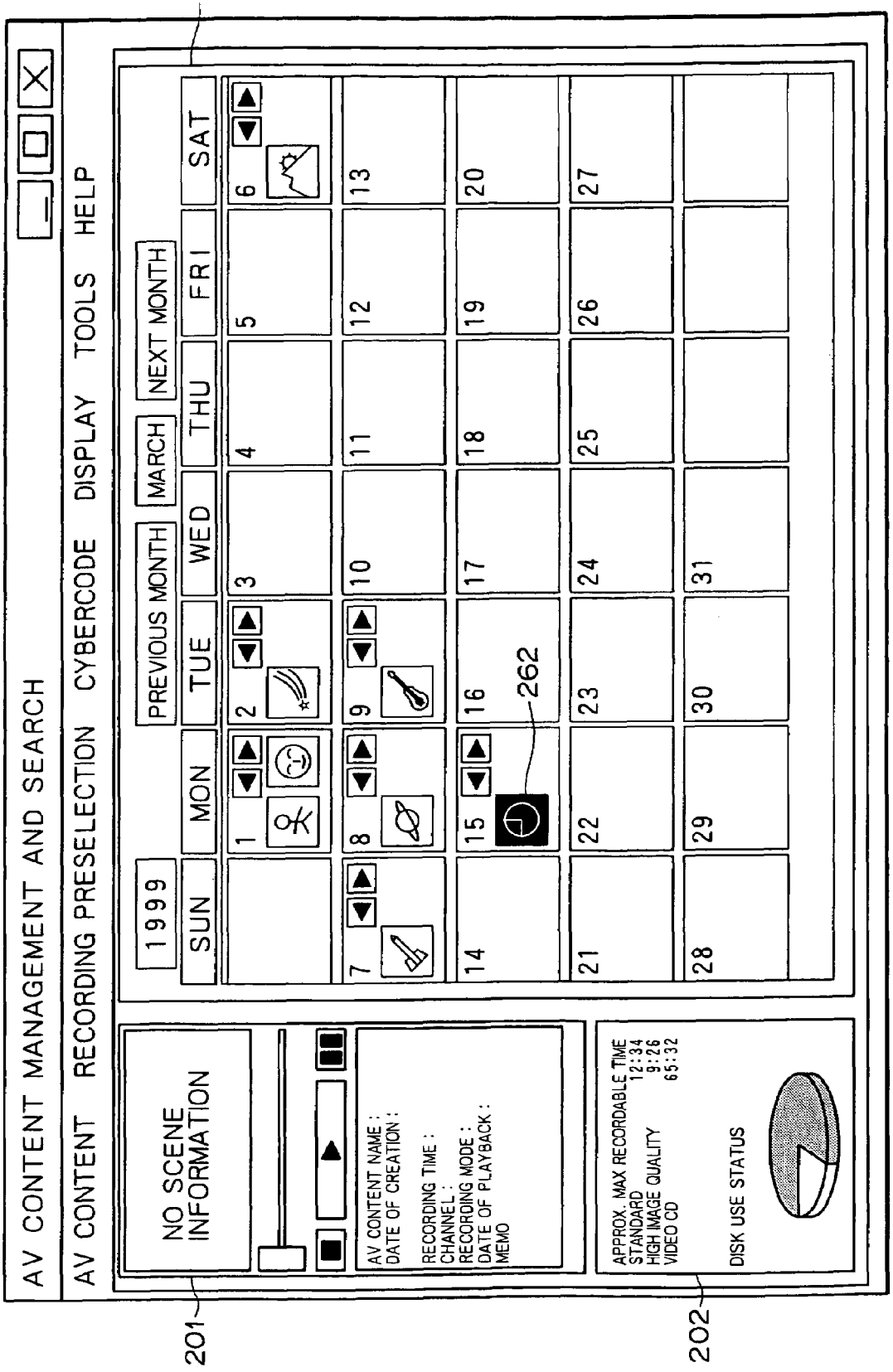
FIG. 28 is an explanatory view of another screen displayed by the AV content management and search program.

FIG. 28 is an explanatory view of another screen displayed by the AV content management and search program 82 on the CRT 30 of the personal computer 1. As with the screens in FIGS. 23 and 24, the screen in FIG. 28 displays the AV content information display window 201 and recording time display window 202. The screen displayed by the AV content management and search program 82 as shown in FIG. 28 comprises an AV content calendar display window 261 and does not include the AV content classification display window 203 or AV content icon display window 204.

The AV content calendar display window 261 has a display area for each of the days making up each month. With the AV content calendar display window 261 displayed, the AV content management and search program 82 displays in each day's display area a thumbnail image or images of specific still pictures contained in the still picture data file 112 of the AV content 101 whose date of creation falls on that day. If the AV content 101 is preselected for recording, the AV content management and search program 82 displays a predetermined icon 262 in the display area assigned to the day of the scheduled recording.

When the AV content management and search program 82 displays the AV content calendar display window 261 as described above, the user is able to know at a glance the dates of creation of a plurality of AV contents 101 as if looking at a TV program schedule.

In the description that follows, the screen display given by as the AV content management and search program 82 as shown in FIG. 28 is called the calendar display.

Figure 29:
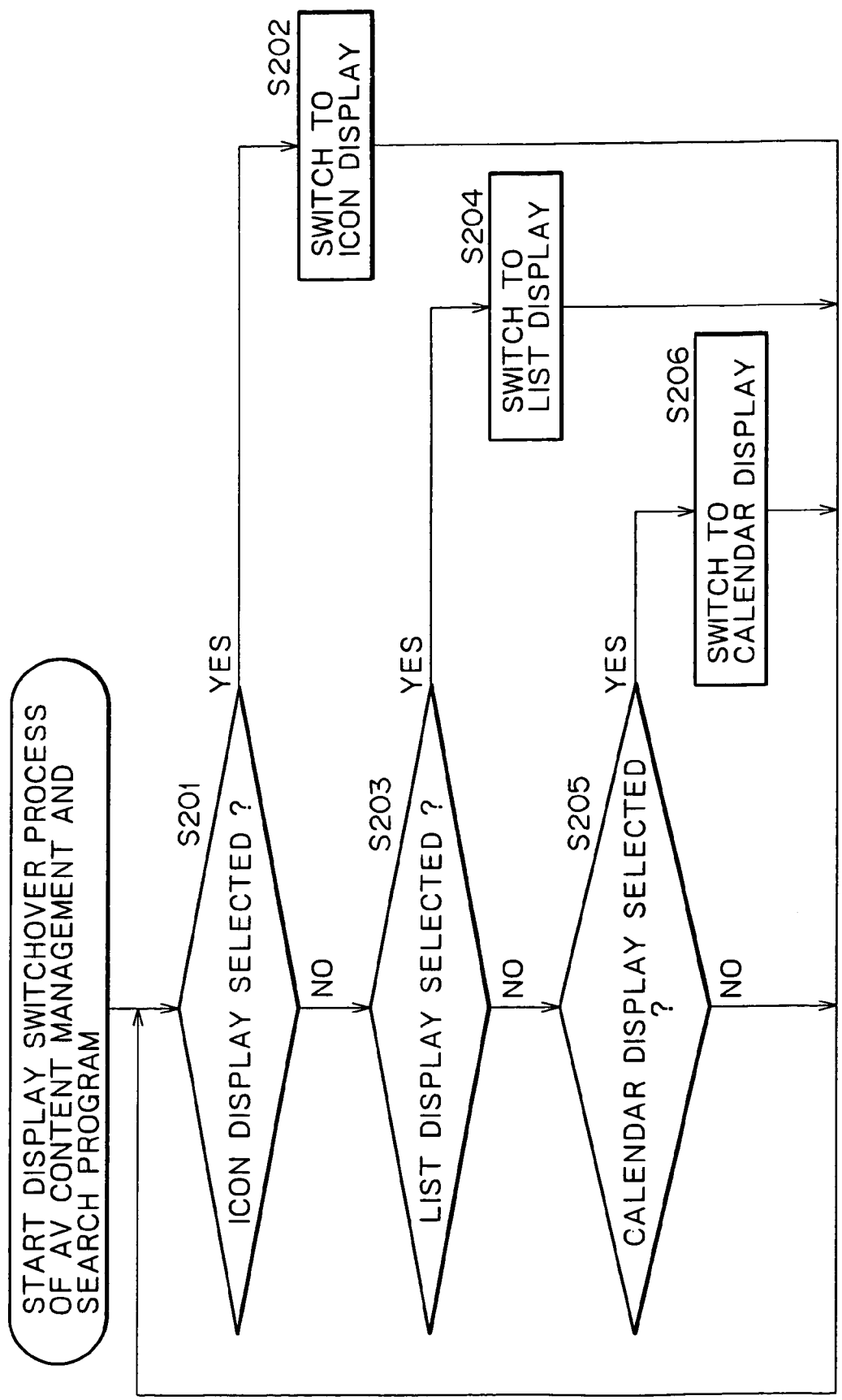
FIG. 29 is a flowchart of steps in which the AV content management and search program switches displays.

Described below with reference to a flowchart of FIG. 29 is how displays are switched when the AV content management and search program 82 is loaded into the RAM 22 and executed by the CPU 21 in the personal computer 1. In step S201, the AV content management and search program 82 checks to see if the icon display is selected on the basis of the input from the keyboard 28 or from the mouse 29. If the icon display is judged to be selected, step S202 is reached in which the screen on the CRT 30 is switched to the icon display. Step S202 is followed by step S201 and the processing is repeated.

If in step S201 the icon display of the AV content 101 is not judged to be selected, then step S203 is reached. In step S203, the AV content management and search program 82 checks to see if the list display is selected on the basis of the input from the keyboard 28 or from the mouse 29. If the list display is judged to be selected, step S204 is reached in which the screen on the CRT 30 is switched to the list display. Step S204 is followed by step S201 and the processing is repeated.

If in step S203 the list display is not judged to be selected, then step S205 is reached. In step S205, the AV content management and search program 82 checks to see if the calendar display is selected on the basis of the input from the keyboard 28 or from the mouse 29. If the calendar display is judged to be selected, step S206 is reached in which the screen on the CRT 30 is switched to the calendar display. Step S206 is followed by step S201 and the processing is repeated.

If in step S205 the calendar display is not judged to be selected, that means no display change has been designated. In that case, step S201 is reached again and the processing is repeated.

As described, the AV content management and search program 82 may display information about the AV content 101 or 121 in any one of three display formats: icon display, list display, or calendar display.

Figure 30:
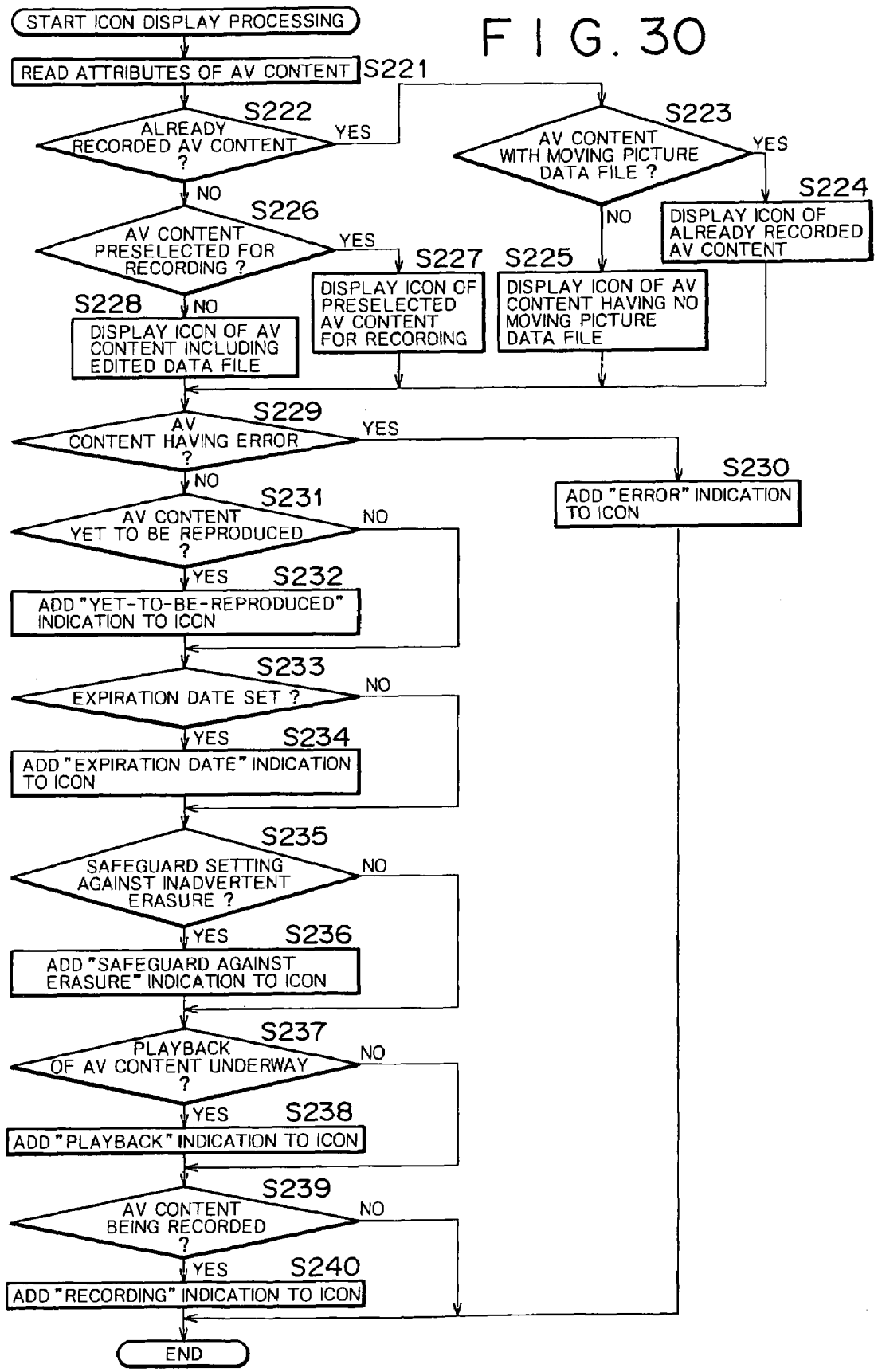
FIG. 30 is a flowchart of steps for icon display processing.

Described below with reference to a flowchart of FIG. 30 is how icon display processing is carried out when the AV content management and search program 82 is loaded into the RAM 22 and executed by the CPU 21 in the personal computer 1. In step S221, the AV content management and search program 82 reads from the content database 92 data included in the AV content attribute record 102 or 132 corresponding to the AV content 101 or 121 whose icon is to be displayed.

In step S222, the AV content management and search program 82 checks to see, based on the data retrieved in step S221, if the AV content 101 or 121 is an already recorded AV content 101. If the AV content 101 or 121 is judged to be an already recorded AV content 101, then step S223 is reached. In step S223, a check is made to see if the AV content 101 is one which does not have a moving picture data file 111.

If in step S223 the AV content 101 is not judged to be one which does not have a moving picture data file 111 (i.e., found to be an AV content 101 that has a moving picture data file 111), then step S224 is reached. In step S224, the AV content management and search program 82 displays the icon of the previously recorded AV content 101. Step S224 is followed by step S229.

If in step S223 the AV content 101 is judged to be one which does not have a moving picture data file 111 (i.e., found to be an AV content 101 that contains the still picture data file 112 alone), then step S225 is reached. In step S225, the AV content management and search program 82 displays the icon of the AV content 101 that has no moving picture data file 111. Step S225 is followed by step S229.

If in step S222 the AV content 101 in question is not judged to be an already recorded AV content 101 (i.e., found to be an AV content 101 or 121 preselected for recording), then step S226 is reached. In step S226, the AV content management and search program 82 checks to see, based on the data retrieved in step S221, if the AV content 101 or 121 is an AV content 101 preselected for recording. If the AV content 101 or 121 is judged to be an AV content 101 preselected for recording, step S227 is reached in which the icon of the preselected AV content 101 for recording is displayed. Step S227 is followed by step S229.

If in step S226 the AV content 101 in question is not judged to be an AV content 101 preselected for recording (i.e., found to be the AV content 121), then step S228 is reached. In step S228, the AV content management and search program 82 displays the icon representative of the AV content 121 comprising the edited data file 131. Step S228 is followed by step S229.

In step S229, the AV content management and search program 82 checks to see, based on the data retrieved in step S221, if the AV content 101 or 121 has error. If the AV content 101 or 121 is judged to have error, then step S230 is reached. In step S230, an "error" indication is added to the icon, and the processing is terminated.

If in step S229 the AV content 101 or 121 is not judged to have error, then step S231 is reached. In step S231, the AV content management and search program 82 checks to see, based on the data retrieved in step S221, if the AV content 101 or 121 has yet to be reproduced. If the AV content 101 or 121 is judged yet to be reproduced, a "yet-to-be-reproduced" indication is added to the icon, and step S233 is reached. If in step S231 the AV content 101 or 121 is judged to have been reproduced before, step S232 is skipped and step S233 is reached.

In step S233, the AV content management and search program 82 checks to see if the AV content 101 or 121 has an expiration date set thereto. If the AV content 101 or 122 is judged to have expiration date setting, step S234 is reached in which an "expiration date" indication is added to the icon. If in step S233 the AV content 101 or 121 is judged to have no expiration date setting, step S234 is skipped and step S235 is reached.

In step S235, the AV content management and search program 82 checks to see if the AV content 101 or 121 has safeguard setting against inadvertent erasure. If the AV content 101 or 121 is judged to have safeguard setting against inadvertent erasure, step S236 is reached in which a "safeguard against erasure" indication is added to the icon. If in step S235 the AV content 101 or 121 is not judged to have safeguard setting against inadvertent erasure, step S236 is skipped and step S237 is reached.

In step S237, the AV content management and search program 82 checks to see if the AV content 101 or 121 is being reproduced. If the AV content 101 or 121 is judged to be currently reproduced, step S238 is reached in which a "playback" indication is added to the icon of the applicable content 101 or 121. If in step S237 the AV content 101 or 121 is not judged to be reproduced, step S238 is skipped and step S239 is reached.

In step S239, the AV content management and search program 82 checks to see if the AV content 101 is being recorded. If the AV content 101 is judged to be currently recorded, step S240 is reached in which a "recording" indication is added to the icon of the AV content in question, and the processing is terminated. If in step S239 the AV content 101 is not judged to be currently recorded, step S240 is skipped and the processing is terminated. The processes of steps S239 and 240 are skipped if the target content is the AV content 121.

As described above, the AV content management and search program 82 can display icons reflecting the attributes of the AV content 101 or 121.

Figure 31:
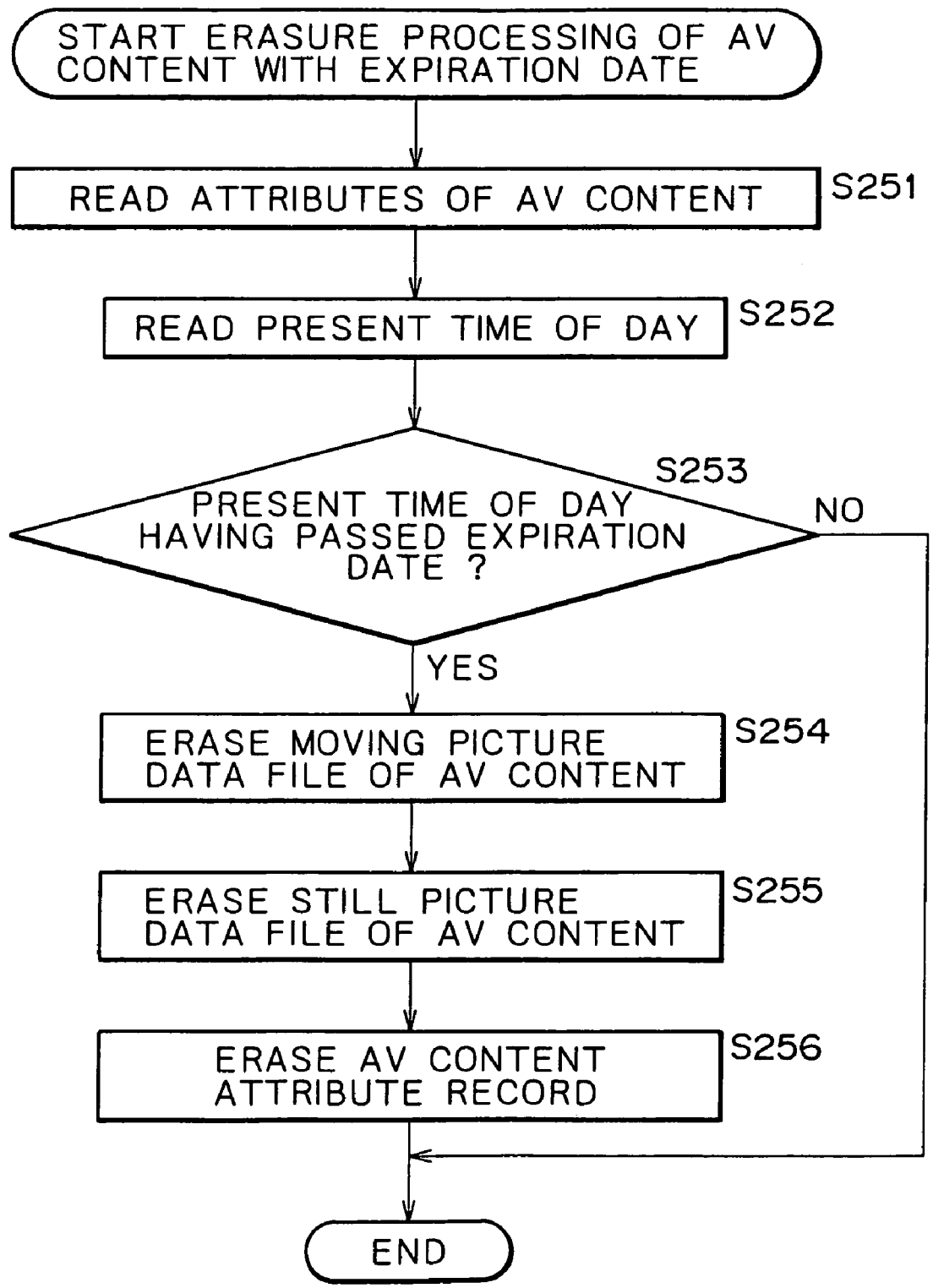
FIG. 31 is a flowchart of steps for erasing an AV content with an expiration date set thereto.

Described below with reference to a flowchart of FIG. 31 is how an AV content with an expiration date set thereto is erased when the preselection monitoring program 85, hardware interface 91 and file I/O 93 are loaded into the RAM 22 and executed by the CPU 21 in the personal computer 1. In step S251, the preselection monitoring program 85 reads from the content database 92 data included in the AV content attribute record 102 corresponding to a specific AV content 101. In step S252, the preselection monitoring program 85 reads the present time and date of day from the RTC, not shown, via the hardware interface 91.

In step S253, the preselection monitoring program 85 checks to see if the retrieved present time and date of day have passed the expiration date of the AV content 101. If the present time of day is judged to have passed the expiration date of the AV content 101, then step S254 is reached. In step S254, the preselection monitoring program 85 causes the file I/O 93 to erase at least one moving picture data file 111 of the AV content 101. In step S255, the preselection monitoring program 85 causes the file I/O 93 to erase at least one still picture data file 112 of the AV content 101. In step S256, the preselection monitoring program 85 causes the content database 92 to erase the AV content attribute record 102 corresponding to the AV content 101. This brings the processing to an end.

If in step S253 the present time and date of day are not judged to have passed the expiration date of the AV content 101, that means there is no need to erase the AV content 101 at present. In that case, the processing is terminated.

As described above, the AV content 101 whose valid period has expired is erased by the preselection monitoring program 85. The same processing may also be carried out on the AV content 121.

Described below with reference to a flowchart of FIG. 32 is how an AV content 101 is erased when the AV content management and search program 82, hardware interface 91 and file I/O 93 are loaded into the RAM 22 and executed by the CPU 21 in the personal computer 1. In step S271, the AV content management and search program 82 reads from the content database 92 data included in the AV content attribute data 102 corresponding to the AV content 101 in question.

In step S272, the AV content management and search program 82 checks to see, based on the data retrieved in step S271, if the AV content 101 has safeguard setting against inadvertent erasure as an attribute. If the AV content 101 is not judged to have safeguard setting against inadvertent erasure, step S273 is reached in which the AV content management and search program 82 causes the file I/O 93 to erase the moving picture data file 111 of the AV content 101.

In step S274, the AV content management and search program 82 judges whether the still picture data file 112 is to be left intact. If the still picture data file 112 is not judged suitable for being left intact, then step S275 is reached. In step S275, the AV content management and search program 82 causes the file I/O 93 to erase the still picture data file 112 of the AV content 101. In step S276, the AV content management and search program 82 causes the content database 92 to erase the AV content attribute record 102 corresponding to the AV content 101. This brings the processing to an end.

If in step S274 the still picture data file 112 is judged to be suitable for being left intact, the processing is terminated.

If in step S272 the AV content 101 is judged to have safeguard setting against inadvertent erasure as an attribute, then step S277 is reached. In step S277, the AV content management and search program 82 causes the hardware interface 91 to display on the CRT 30 a message indicating that the AV content 101 cannot be erased. The processing is then terminated.

As described, the AV content 101 having safeguard setting against inadvertent erasure will not be erased even if erasure of that content is designated. The AV content management and search program 82 may erase only the moving picture data file 111 of the AV content 101 in question. The same processing may also be carried out on the AV content 121.

What follows is a description of how to search for a video tape cassette 301 that contains pictures corresponding to the moving picture data file 111 of a specific AV content 101, as well as for an AV content 101 that corresponds to the pictures recorded on the video tape cassette 301.

Figure 33:
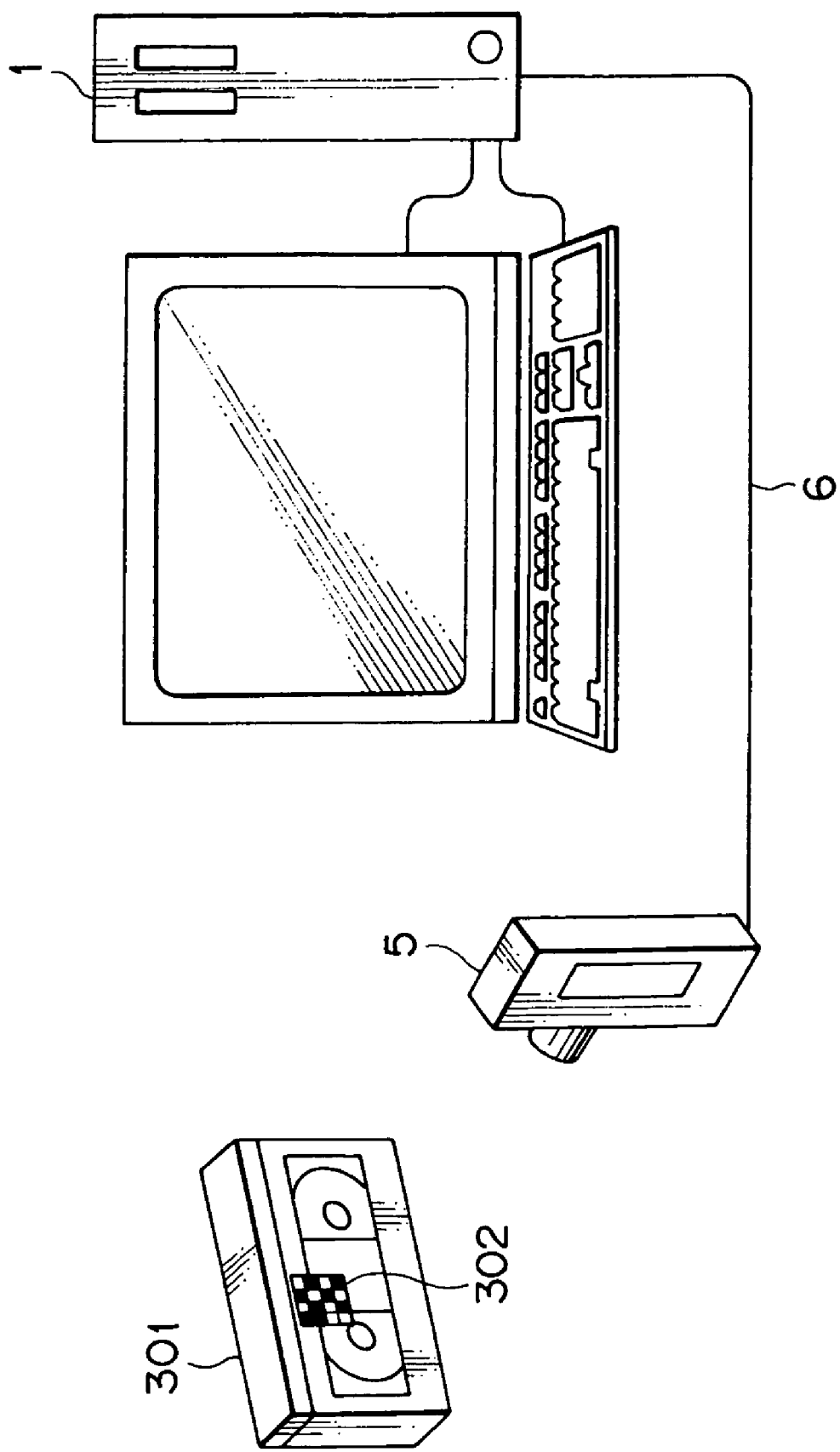
FIG. 33 is an explanatory view for explaining operations to search for a video tape cassette or for an AV content.

FIG. 33 is an explanatory view for explaining operations to search for the video tape cassette 301 that contains the pictures corresponding to the moving picture data file 111 of the AV content 101, as well as for the AV content 101 that corresponds to the pictures recorded on the video tape cassette 301.

On the video tape cassette 301 is pasted a label 302 bearing a printed two-dimensional code. The DVCR 5 with the image pickup function picks up an image of the label 302 which bears the printed two-dimensional code and which is pasted on the video tape cassette 301. The picked-up image is supplied to the personal computer 1 over the network 6. Given the image from the DVCR 5 over the network 6, the personal computer 1 checks to see if the video tape cassette 301 contains the relevant pictures.

Alternatively, based on the image sent by the DVCR 5 over the network 6, the personal computer 1 searches for the AV content 101 corresponding to the pictures recorded on the video tape cassette 301.

The image of the label 302 bearing the two-dimensional code may alternatively be input in the form of an analog signal (e.g., as per the NTSC system) through the analog selector 55 of the image processing board 34.

Figure 34:
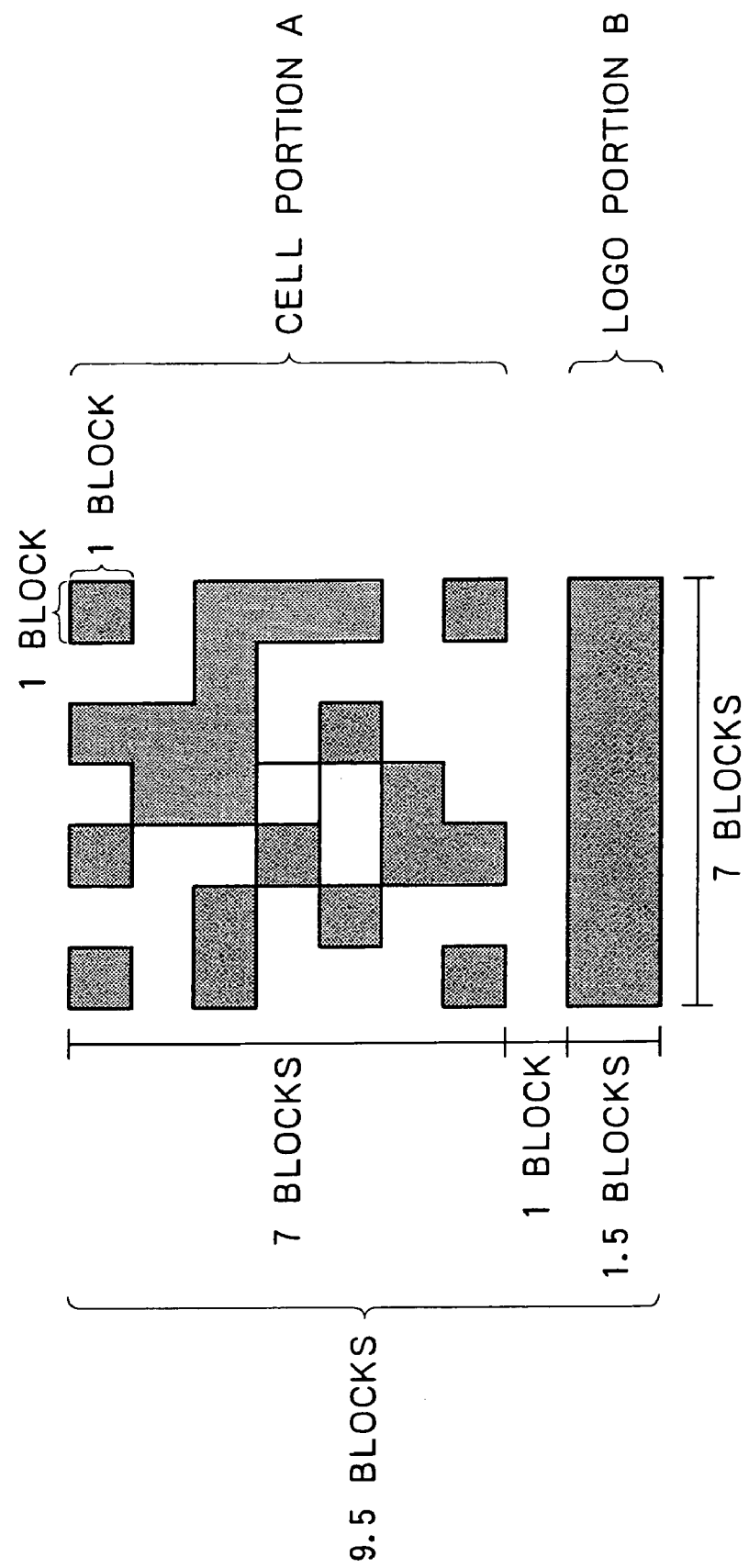
FIG. 34 is an explanatory view of a two-dimensional code.

As shown in FIG. 34, the two-dimensional code is composed of units called blocks. The code is a rectangle 9.5 blocks by 7 blocks constituting a cell portion A and a logo portion B which are arranged one block apart. The cell portion A is made of two-dimensionally patterned rectangular and square cells forming a square 7 blocks long per side. The cell portion A carries coded identification information about the two-dimensional code associated illustratively with a specific AV content 101. The logo portion B is made of a rectangular cell 1.5 blocks by 7 blocks carrying illustratively the user's name, for example.

Figure 35:
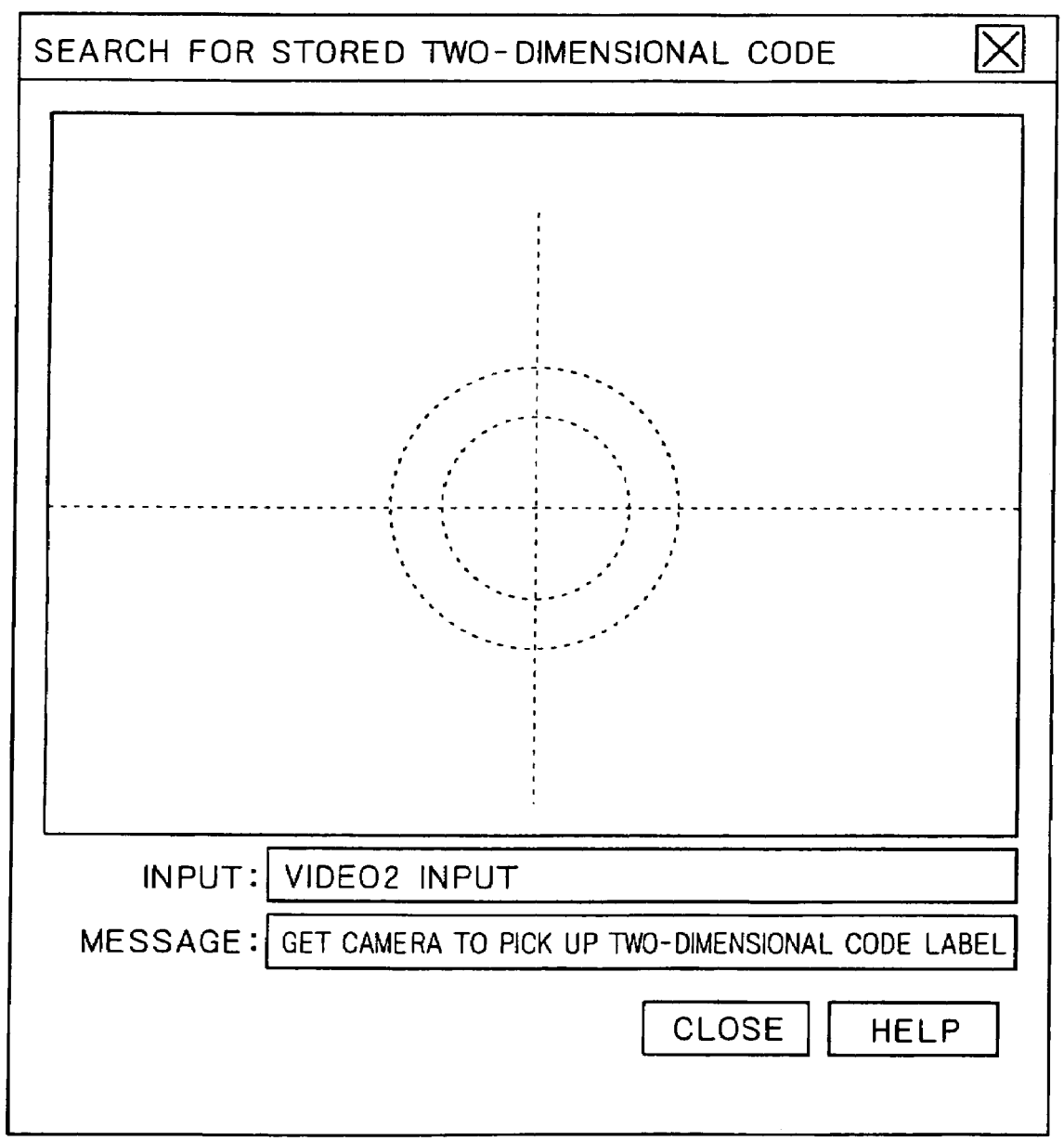
FIG. 35 is an explanatory view of a window with a function for judging the presence of a two-dimensional code stored by the AV content management and search program.
Figure 36:
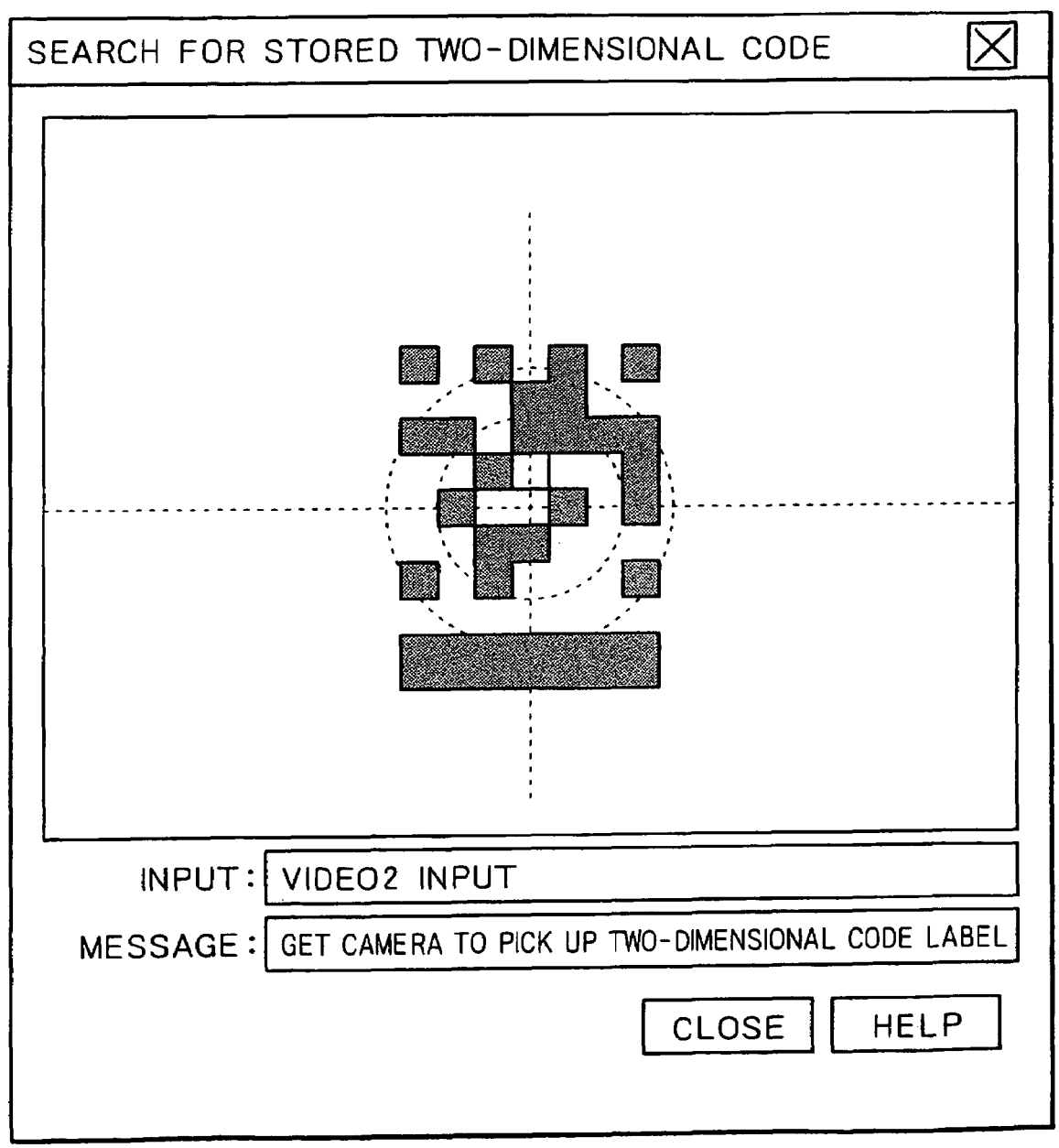
FIG. 36 is another explanatory view of the window with the function for judging the presence of a two-dimensional code stored by the AV content management and search program.
Figure 37:
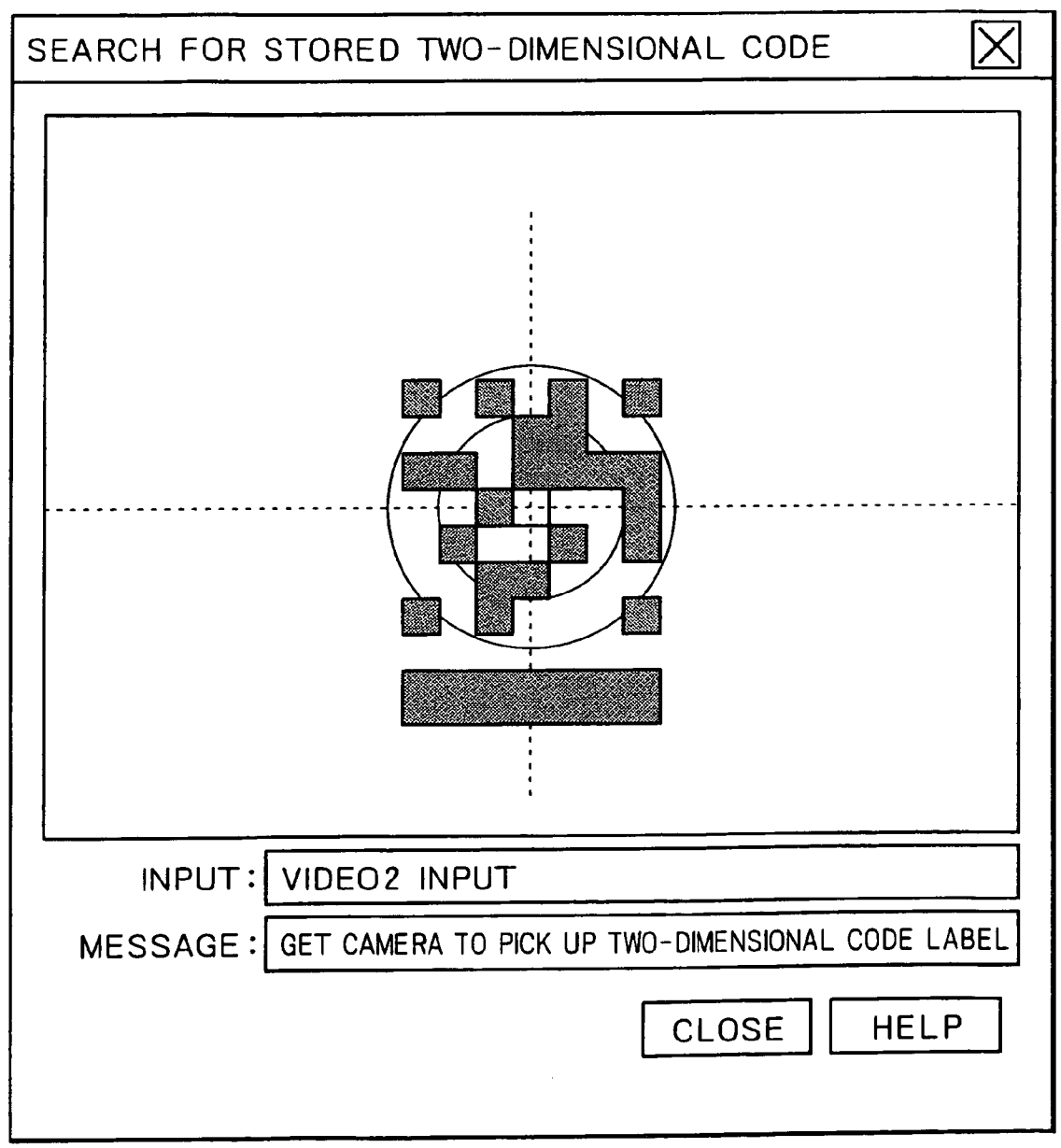
FIG. 37 is another explanatory view of the window with the function for judging the presence of a two-dimensional code stored by the AV content management and search program.

FIGS. 35, 36 and 37 are explanatory views of windows displayed on the CRT 30 when a function is activated to check whether a picked-up image corresponds to a two-dimensional code stored by the AV content management and search program 82. When the function for recognizing a two-dimensional code stored by the AV content management and search program 82 is started, the program 82 displays a window of FIG. 35 in which an image supplied by the DVCR 5 having the image pickup function is shown together with a relevant message.

When the user gets the image pickup function-equipped DVCR 5 to pick up the two-dimensional code from the label 302 on the video tape cassette 301, the window of the AV content management and search program 82 displays an image of the two-dimensional code as shown in FIG. 36. The AV content management and search program 82 judges whether the displayed two-dimensional code in the window is associated with a specific AV content 101 (the association is established in a manner to be described later), and gives a display in accordance with the judgment.

If the two-dimensional code displayed in the window is judged to correspond to the AV content 101 in question, the AV content management and search program 82 illustratively replaces broken-line circles with solid-line circles in the window, as shown in FIG. 37.

If the two-dimensional code in the window is judged to correspond to the AV content 101, the AV content management and search program 82 may alternatively display in the window a message in characters saying that the video tape cassette 301 whose code has been picked up corresponds to the AV content 101.

If the two-dimensional code in the window is not judged to correspond to the AV content 101, the AV content management and search program 82 leaves the display unchanged in the window. Alternatively, the AV content management and search program 82 may display in the window a message in characters saying that the video tape cassette 301 whose code has been picked up does not correspond to the AV content 101.

Figure 38:
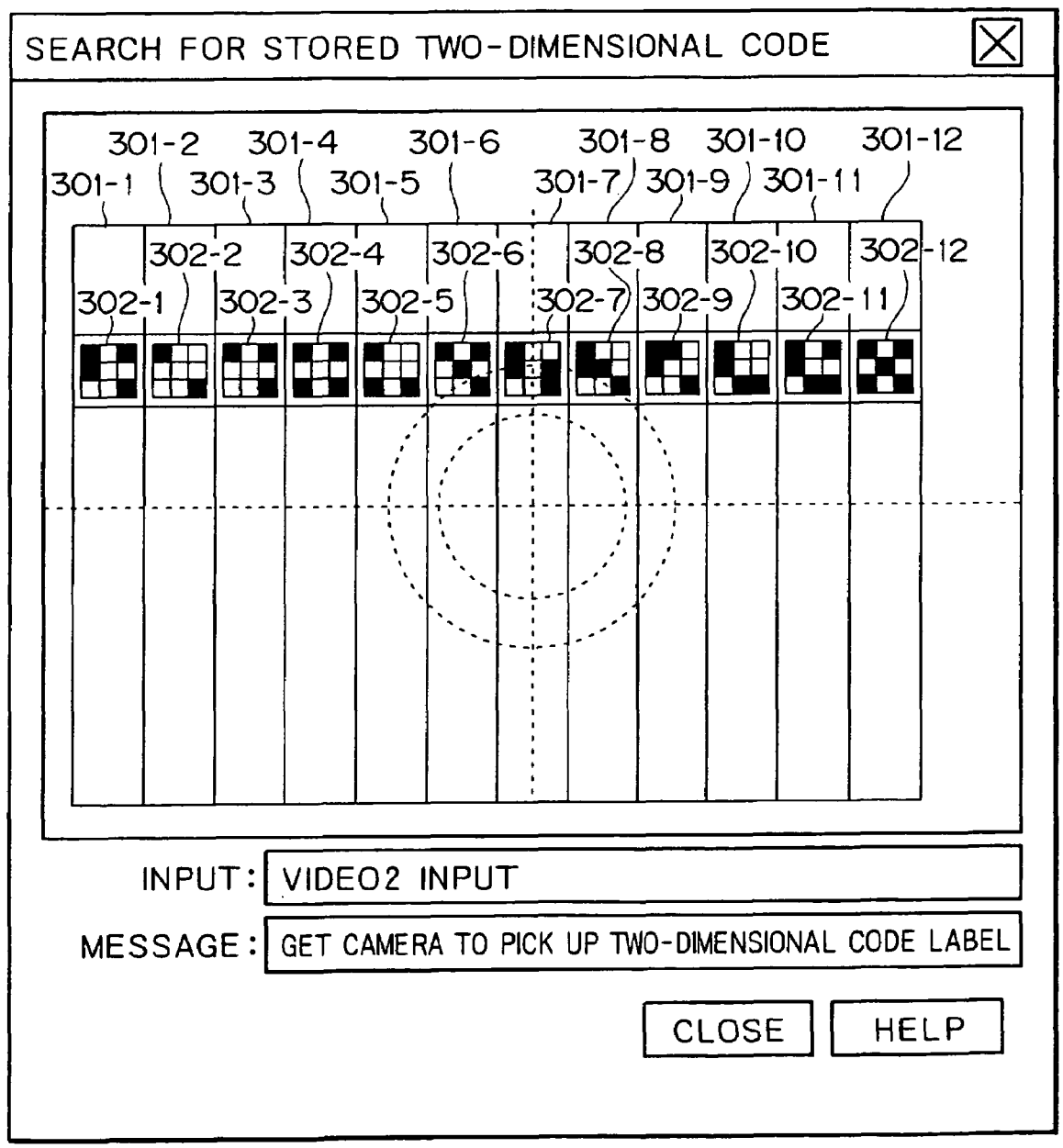
FIG. 38 is an explanatory view of a window with a function for seeking a two-dimensional code stored by the AV content management and search program.
Figure 39:
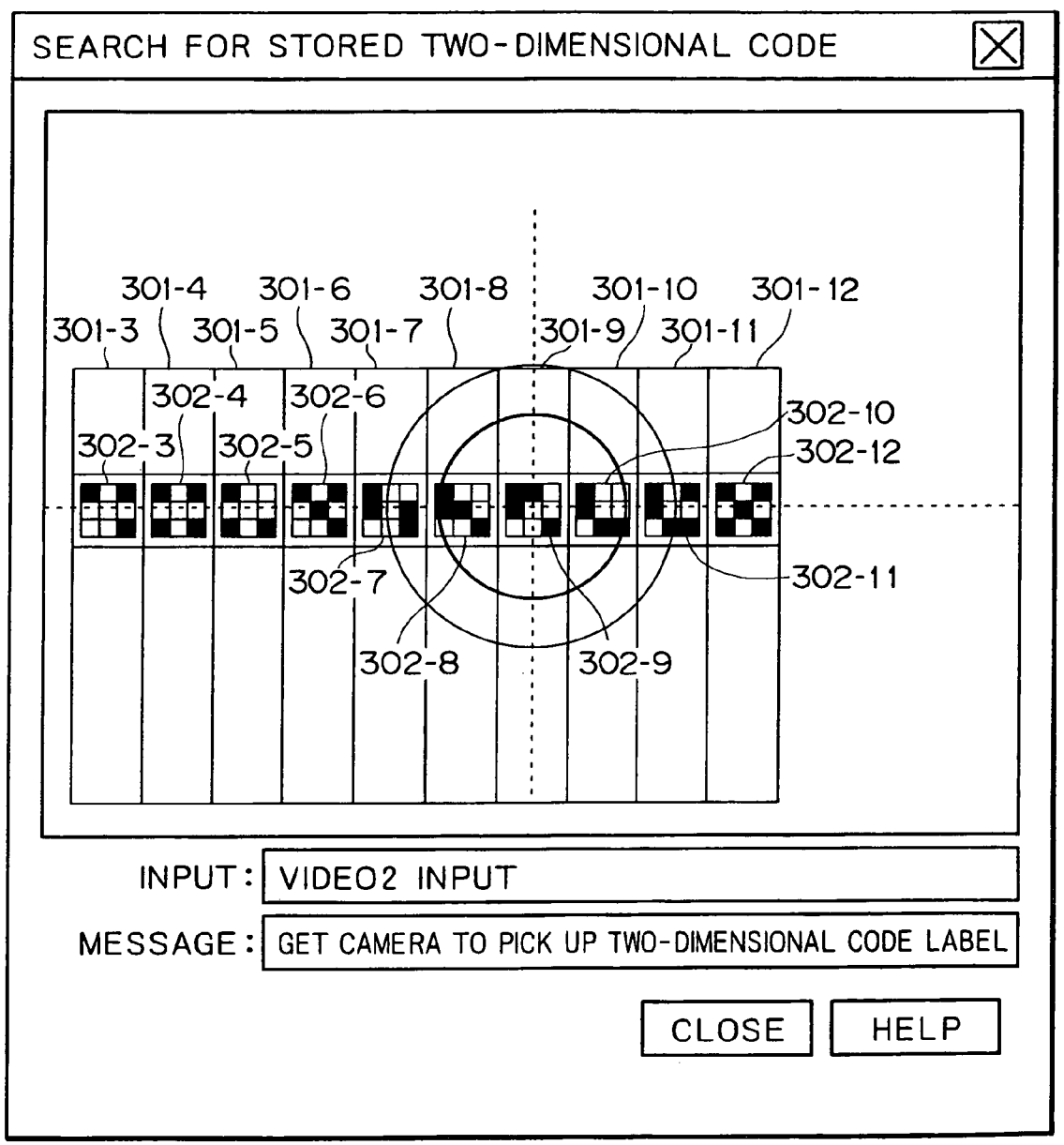
FIG. 39 is another explanatory view of the window with the function for seeking a two-dimensional code stored by the AV content management and search program.

FIGS. 38 and 39 are explanatory views of windows displayed on the CRT 30 when another function is activated to search two-dimensional codes stored by the AV content management and search program 82 for a specific code. The user gets the image pickup function-equipped DVCR 5 to pick up different two-dimensional codes from labels 302 on a plurality of video tape cassettes 301.

Typically, a plurality of video tape cassettes are arranged on a shelf in such a manner that their labels bearing printed two-dimensional codes can be seen by users. Suppose that the DVCR 5 having the image pickup function picks up images of a video tape cassette 301-1 with a label 302-1 bearing a printed two-dimensional code, a video tape cassette 301-2 with a label 302-2, a video tape cassette 301-3 with a label 302-3, a video tape cassette 301-4 with a label 302-4, a video tape cassette 301-5 with a label 302-5, a video tape cassette 301-6 with a label 302-6, a video tape cassette 301-7 with a label 302-7, a video tape cassette 301-8 with a label 302-8, a video tape cassette 301-9 with a label 302-9, a video tape cassette 301-10 with a label 302-10, a video tape cassette 301-11 with a label 302-11, and a video tape cassette 301-12 with a label 302-12. In that case, as shown in FIG. 38, images of the video tape cassettes 301-1 through 301-12 are displayed in the window of the AV content management and search program 82.

After the image pickup function-equipped DVCR 5 has picked up the images of the video tape cassettes 301-1 through 301-12 and sent them to the personal computer 1 over the network 6, the AV content management and search program 82 searches the received images for a two-dimensional code corresponding to a specific AV content 101. Illustratively, as shown in FIG. 39, the AV content management and search program 82 replaces broken-line circles with solid-line circles in the window while positioning the image of the detected two-dimensional code in the middle of the window.

In the example of FIG. 39, the printed two-dimensional code on the label 302-9 is positioned in the middle of the window. This indicates that the video tape cassette 301-9 corresponds to the AV content 101 in question.

Based on the images fed by the DVCR 5 over the network 6, the personal computer 1 can also search for an AV content 101 corresponding to specific pictures recorded on a video tape cassette 301.

Figure 40:
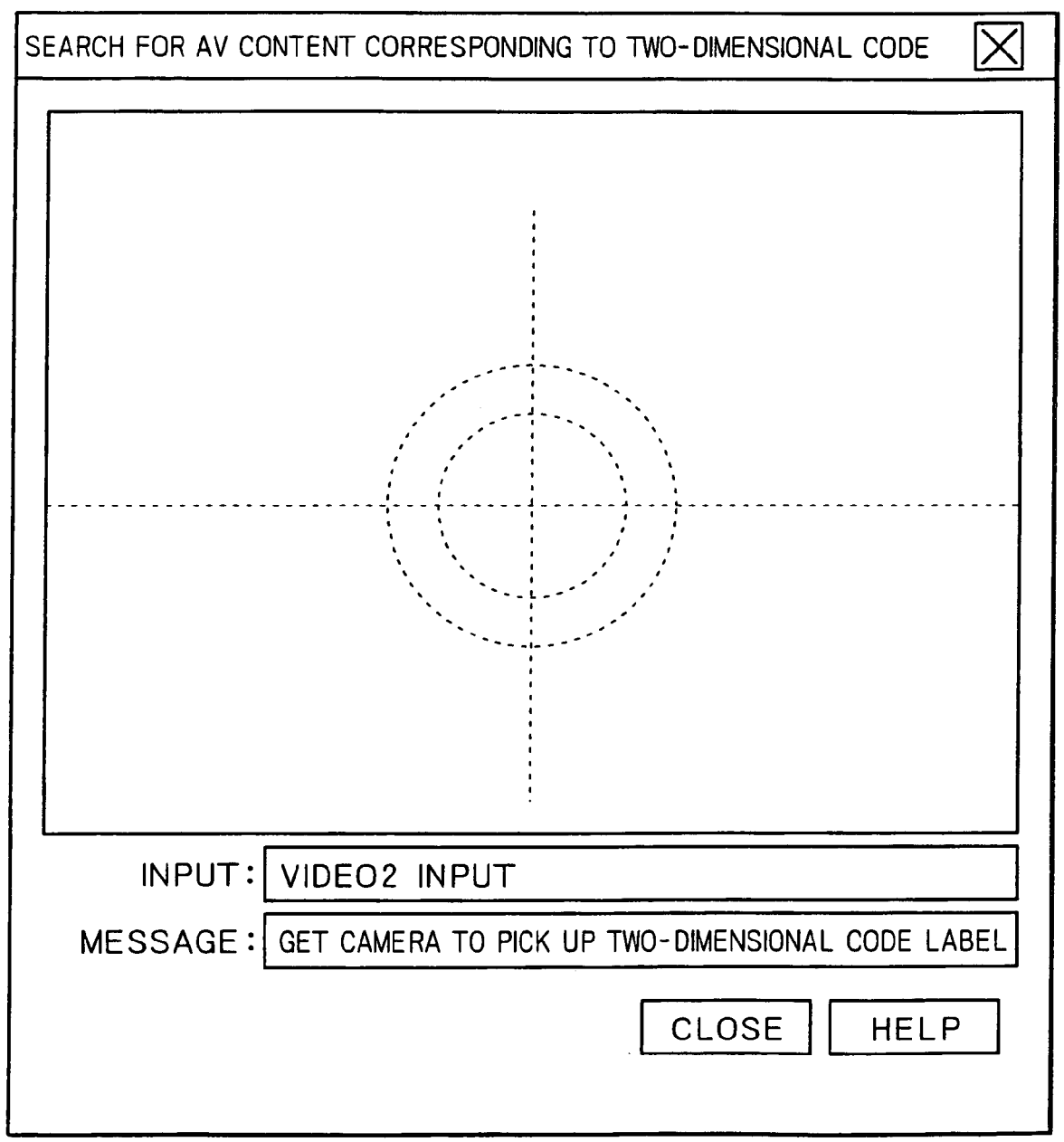
FIG. 40 is an explanatory view of a window with a function for seeking an AV content corresponding to a two-dimensional code stored by the AV content management and search program.

When a function is activated to search for an AV content 101 corresponding to a two-dimensional code picked up by the AV content management and search program 82, the CRT 30 displays a window shown in FIG. 40. After the image pickup function-equipped DVCR 5 has picked up an image of a video tape cassette 301 with a label 302 bearing a printed two-dimensional code, the AV content management and search program 82 renders active an icon or other indication of the AV content 101 corresponding to the two-dimensional code read from the label 302.

When the AV content management and search program 82 displays attributes or still pictures of the AV content 101 corresponding to the activated icon, the user is able to know speedily what is recorded on the video tape cassette 301.

In the manner described above, the user can recognize quickly the pictures recorded on the video tape cassette 301.

Figure 41:
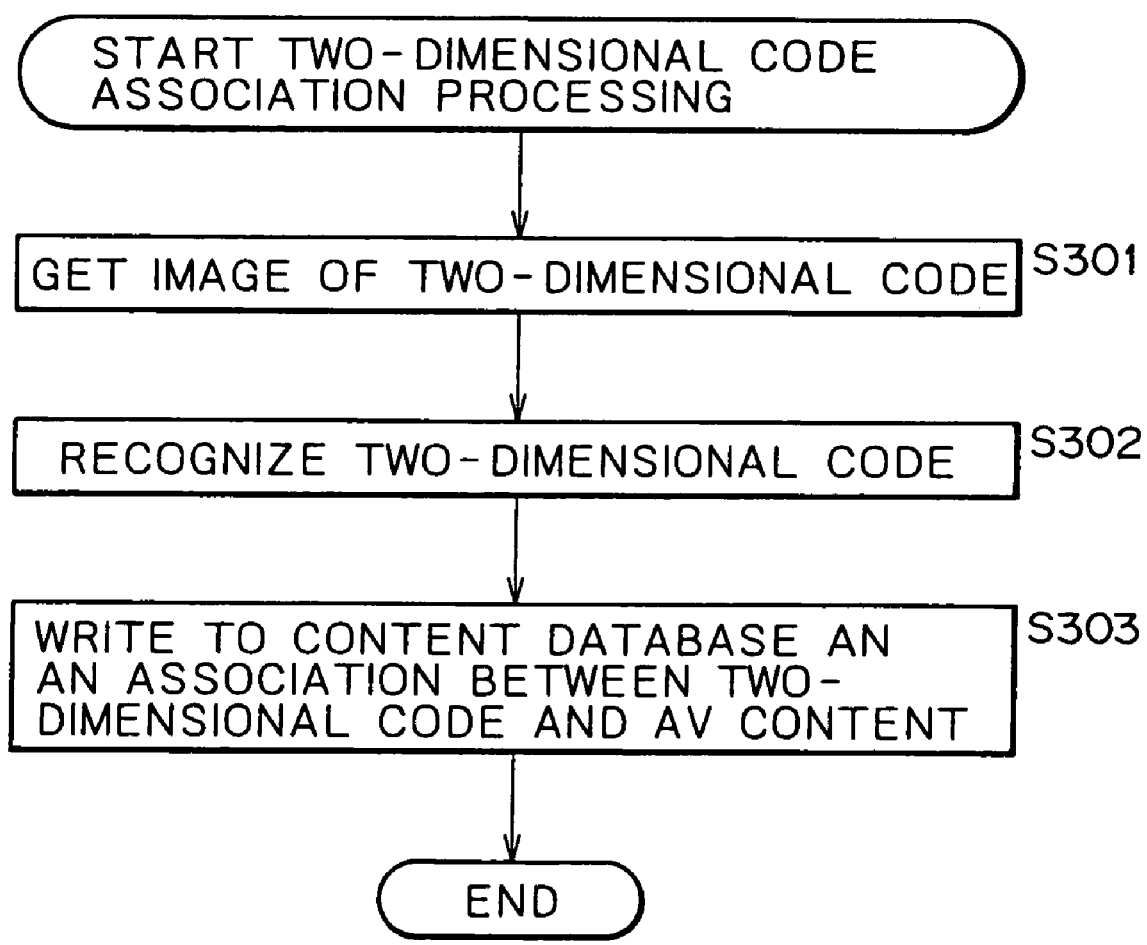
FIG. 41 is a flowchart of steps for associating an AV content with a two-dimensional code.

Described below with reference to a flowchart of FIG. 41 is how a two-dimensional code is associated with one of predetermined AV contents 101 or 121 when the AV content management and search program 82 is loaded into the RAM 22 and executed by the CPU 21 in the personal computer 1. In step S301, the AV content management and search program 82 receives over the network 6 an image of a two-dimensional code picked up by the DVCR 5 having the image pickup function. In step S302, the AV content management and search program 82 recognizes the two-dimensional code included in the image received in step S301.

In step S303, the AV content management and search program 82 writes to the content database 92 an association between the recognized two-dimensional code and one of the predetermined AV contents 101 (or one of the predetermined AV contents 121). This brings the processing to an end.

In the manner described above, the AV content management and search program 82 can set to the content database 92 an association established between a given AV content 101 (or 121) and a two-dimensional code.

Figure 42:
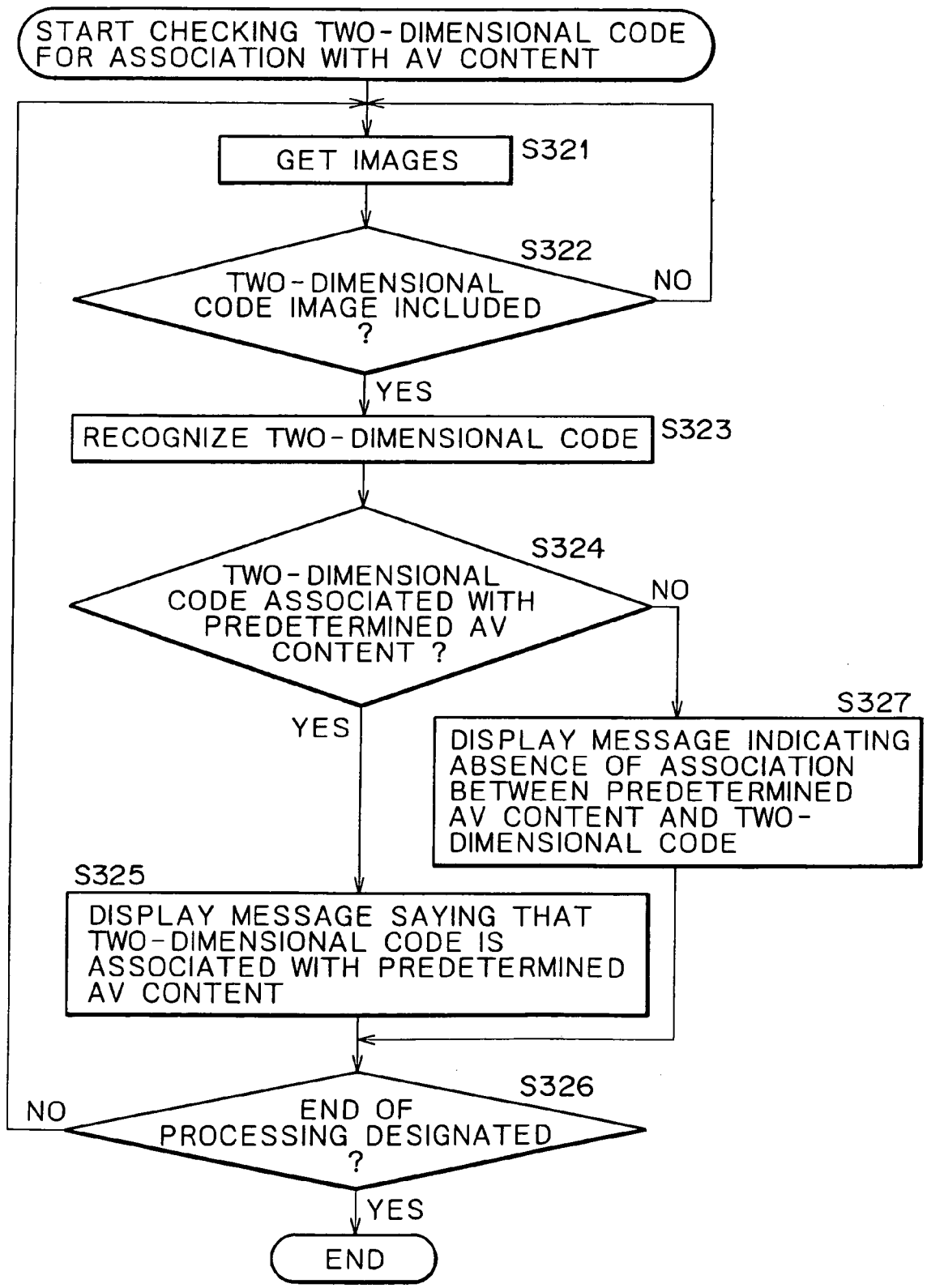
FIG. 42 is a flowchart of steps for judging the presence of a two-dimensional code associated with an AV content.

Described below with reference to a flowchart of FIG. 42 is how a two-dimensional code is judged to be associated with one of predetermined AV contents 101 when the AV content management and search program 82 is loaded into the RAM 22 and executed by the CPU 21 in the personal computer 1. In step S321, the AV content management and search program 82 receives over the network 6 images picked up by the DVCR 5 having the image pickup function. In step S322, the AV content management and search program 82 checks to see if the received images contain an image of a two-dimensional code. If the received images are not judged to contain any image of a two-dimensional code, step S321 is reached again. The process of step S321 is then repeated until an image including a two-dimensional code image is received.

If in step S322 the received images are judged to contain any image of a two-dimensional code, step S323 is reached in which the AV content management and search program 82 recognizes the image of the two-dimensional code. In step S324, the AV content management and search program 82 checks to see if the recognized two-dimensional code is associated with any one of the predetermined AV contents 101. If the recognized two-dimensional code is judged to be associated with one of the predetermined AV contents 101, then step S325 is reached. In step S325, a message is displayed on the CRT 30 saying that one of the predetermined AV contents 101 is found associated with the recognized two-dimensional code. Step S325 is followed by step S326.

If in step S324 the recognized two-dimensional code is not judged to be associated with any of the predetermined AV contents 101, the AV content management and search program 82 displays on the CRT 30 a message indicating the absence of association between any of the predetermined AV contents 101 and the recognized two-dimensional code. Step S326 is then reached.

In step S326, the AV content management and search program 82 checks to see if termination of the processing is designated on the basis of the input from the mouse 29 or other device. If termination of the processing is not judged to be designated, step S321 is reached and the processing is repeated.

If in step S326 termination of the processing is judged to be designated, the processing is brought to an end.

As described, the AV content management and search program 82 can speedily verify whether a video tape cassette 301 whose image has been picked up is associated with any AV content 101. A procedure similar to that of the flowchart in FIG. 42 may be carried out to judge whether the picked-up two-dimensional code is associated with any one of predetermined AV contents 121.

Figure 43:
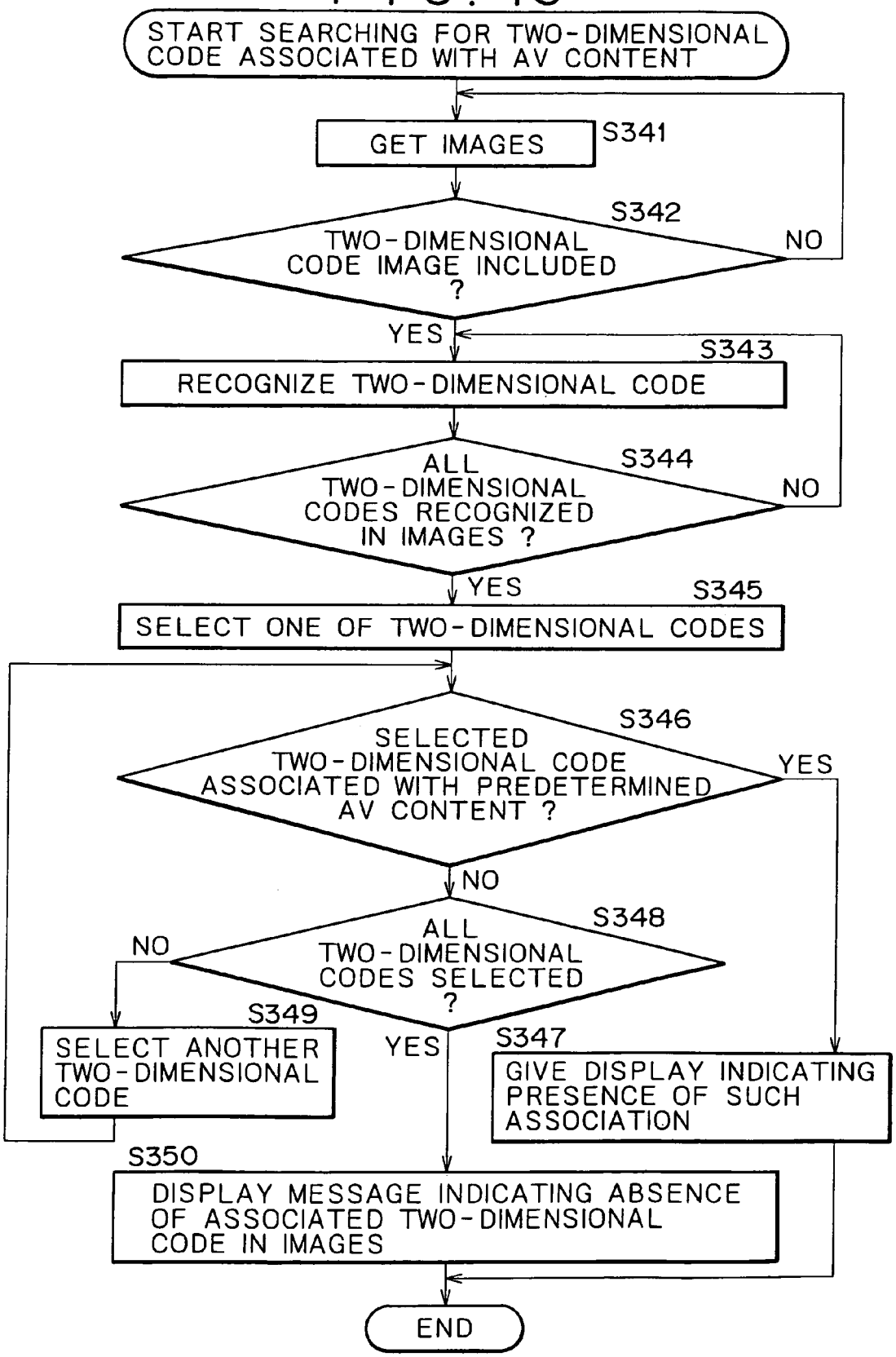
FIG. 43 is a flowchart of steps for seeking a two-dimensional code associated with an AV content.

Described below with reference to a flowchart of FIG. 43 is how to search for a two-dimensional code associated with any one of predetermined AV contents 101 when the AV content management and search program 82 is, loaded into the RAM 22 and executed by the CPU 21 in the personal computer 1. Steps S341 through S343 constitute the same processes as steps S321 through 5323 in FIG. 42 and thus will not be described further.

In step S344, the AV content management and search program 82 checks to see if all two-dimensional codes have been recognized which are included in the images fed from the DVCR 5 having the image pickup function. If not all two-dimensional codes in the received image are judged to have been recognized, step S343 is reached again and the two-dimensional code recognition process is repeated.

If in step S344 all two-dimensional codes in the received images are judged to have been recognized, step S345 is reached in which the AV content management and search program 82 selects one of the two-dimensional codes recognized in step S343. In step S346, the AV content management and search program 82 checks to see if the selected two-dimensional code is associated with one of predetermined AV contents 101. If any predetermined AV content 101 is judged to be associated with the selected two-dimensional code, then step S347 is reached. In step S347, a display is given indicating the presence of association between the selected two-dimensional code and one of the predetermined AV contents 101. The processing is then terminated.

If in step S346 the selected two-dimensional code is not judged to be associated with any predetermined AV content 101, step S348 is reached in which the AV content management and search program 82 checks to see if all two-dimensional codes have been selected. If not all two-dimensional codes are judged to have been selected, step S349 is reached in which another two-dimensional code is selected. Step S349 is followed by step S346.

If in step S348 all two-dimensional codes are judged to have been selected, then step S350 is reached. In step S350, the AV content management and search program 82 displays on the CRT 30 a message saying that the images received from the image pickup function-equipped DVCR 5 contain no two-dimensional code associated with any of the predetermined AV contents 101. The processing is then brought to an end.

As described, the AV content management and search program 82 searches picked-up images containing a plurality of two-dimensional codes for a two-dimensional code associated with a specific AV content 101. This allows the user speedily to find the video tape cassette 301 storing specific pictures. A procedure similar to that of the flowchart in FIG. 43 may be carried out to search for a two-dimensional code associated with one of predetermined AV contents 121.

Figure 44:
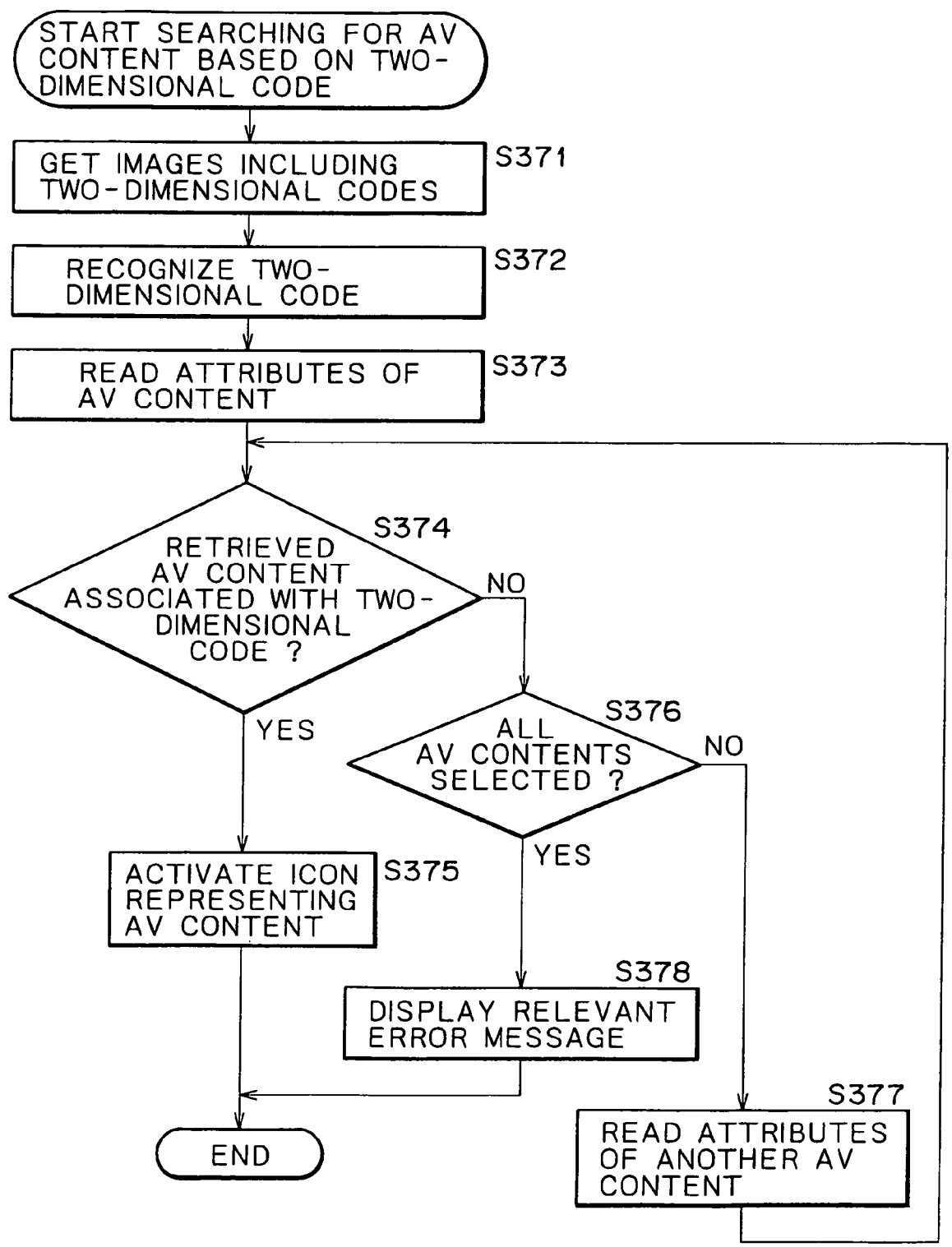
FIG. 44 is another flowchart of steps for seeking an AV content associated with a two-dimensional code.

Described below with reference to FIG. 44 is how to search for an AV content 101 associated with a two-dimensional code when the AV content management and search program 82 is loaded into the RAM 22 and executed by the CPU 21 in the personal computer 1. In step S371, the AV content management and search program 82 receives images containing two-dimensional codes sent from the DVCR 5 with the image pickup function over the network 6. In step S372, the AV content management and search program 82 recognizes an image of a two-dimensional code.

In step S373, the AV content management and search program 82 reads from the content database 92 attribute data about a specific AV content 101. In step S374, the AV content management and search program 82 judges, based on the attribute data about the AV content 101 retrieved in step S373, whether the AV content 101 is associated with the two-dimensional code recognized in step S372. If the AV content 101 is judged to be associated with the two-dimensional code, step S375 is reached in which an icon representing the AV content 101 in question is rendered active.

If in step S376 the AV content 101 is not judged to be associated with the two-dimensional code, then step S376 is reached. In step S376, the AV content management and search program 82 checks to see if all AV contents 101 have been selected. If not all AV contents 101 are judged to have been selected, step S377 is reached in which attribute data about another AV content 101 are read from the content database 92. Step S377 is followed by step S374 again and the processing is repeated.

If in step S376 all AV contents 101 are judged to have been selected, then step S378 is reached. In step S378, the AV content management and search program 82 displays on the CRT 30 a message indicating the absence of any AV content 101 associated with the two-dimensional code. The processing is then brought to an end.

As described, the AV content management and search program 82 searches quickly for the AV content 101 associated with the two-dimensional code whose image has been picked up. This allows the user to know speedily what is recorded on any video tape cassette 301 that carries a label 302 bearing a printed two-dimensional code. A search for an AV content 121 associated with a picked-up two-dimensional code may also be carried out in the same manner as described above.

Described below with reference to FIGS. 45A, 45B and 45C are storage media that are used to install into the personal computer 1 a program for carrying out the above-described processes and to render the program executable by the personal computer 1.

As shown in FIG. 45A, the program may be offered to users as preinstalled on a hard disk 502 (such as one in the HDD 31-1 or 31-2 in FIG. 2) or in a semiconductor memory 503 furnished as an internal storage medium of the personal computer 1.

Alternatively, as depicted in FIG. 45B, the program may be offered as package software stored temporarily or permanently on such storage media as a floppy disk 511, a CD-ROM (compact disk-read only disk) 512, MO (magneto-optical) disk 513, a DVD (digital versatile disk) 514, a magnetic disk 515, and a semiconductor memory 516.

Furthermore, as indicated in FIG. 45C, the program may be transferred in a wireless fashion from a download site 521 to the personal computer 1 via a satellite 522 for digital satellite broadcasting; the program may also be transferred in a wired manner over a network 531 such as a local area network or the Internet to the personal computer 1. The transferred program may be stored on an internal hard disk or in other suitable device in the personal computer 1.

The media as understood in this specification refer to diverse kinds of media in their broadest sense including the storage media outlined above.

Also in this specification, the described steps constituting the program offered on a suitable medium include processes that may be carried out in diverse manners: on a time series basis, on a parallel basis, and/or on an individual basis.

In this specification, the system refers to an overall configuration of a plurality of interconnected relevant devices.

While preferred embodiments of the present invention have been described using specific terms, such description is for illustrative purpose only, and it is to be understood that changes and variations may be made without departing from the spirit or scope of the following claims.

What is claimed is:

1. An information processing apparatus, comprising:
   recording unit configured to record a first supplied picture;
   reproducing unit configured to reproduce a second recorded picture; and
   display controlling unit configured to provide display control in such a manner as to display a first user interface when said recording unit records said first picture supplied and to display a second user interface when said reproducing unit reproduces said second picture recorded,
   wherein said first user interface displays a recording button through which to input orders for operating said recording unit and a playback button through which to input orders for operating said reproducing unit and said second user interface displays a recording button through which to input orders for operating said recording unit and a playback button through which to input orders for operating said reproducing unit, and
   wherein said first user interface displays said recording button in a first status in which a button accepts user input and said playback button in a second status in which a button does not accept user input and said second user interface displays said recording button in the second status and said playback button in the first status.

2. An information processing apparatus according to claim 1, wherein said recording means records simultaneously at least one picture making up said first picture.

3. An information processing apparatus according to claim 1, wherein said reproducing means reproduces simultaneously at least one picture making up said second picture.

4. An information processing apparatus according to claim 1, wherein said display controlling means provides display control in such a manner that said first and said second user interface appear in substantially the same position.

5. An information processing apparatus according to claim 1, wherein said display controlling means displays said first user interface in such a manner as to place a first and a second display thereof into a first and a second state respectively, said first display in said first state accepting an input of orders via a recording button for operating said recording means, said second display in said second state accepting an input of orders via a playback button for operating said reproducing means,
   said display controlling means further displaying said second user interface in such a manner as to place said first and said second display thereof into said second and said first state respectively, said first display in said second state accepting an input of orders via a recording button for operating said recording means, said second display in said first state accepting an input of orders via a playback button for operating said reproducing means.

6. An information processing apparatus according to claim 1, wherein:
   the recording unit is configured to store still pictures corresponding to scene switchovers of said second recorded picture, and time stamps of scene switchovers of said second recorded picture, and
   the display controlling unit is configured control the second user interface to display, given a reference position on a screen, said still pictures in positions at distances from said reference position, said distances reflecting differences between a time stamp corresponding to said reference position on the one hand and said time stamps of said scene switchovers on the other hand.

7. An information processing apparatus according to claim 6, wherein said display controlling unit is configured to provide display control in such a manner that the time stamp of the second recorded picture being reproduced by the reproducing unit corresponds to said reference position.

8. An information processing apparatus according to claim 6, wherein said display controlling unit is configured to provide display control in such a manner as to shift continuously the positions of said still pictures in accordance with the time stamp of the second recorded picture being reproduced by reproducing unit.

9. An information processing method performed by an information processing apparatus, comprising:
   recording, by a recording unit of the information processing apparatus, a first supplied picture;
   reproducing, by a reproducing unit of the information processing apparatus, a second recorded picture; and
   providing, by a display controlling unit at the information processing apparatus, display control in such a manner as to display a first user interface during said recording step and a second user interface during said reproducing step,
   wherein said first user interface displays a recording button through which to input orders for operating said recording unit and a playback button through which to input orders for operating said reproducing unit and said second user interface displays a recording button through which to input orders for operating said recording unit and a playback button through which to input orders for operating said reproducing unit, and
   wherein said first user interface displays said recording button in a first status in which a button accepts user input and said playback button in a second status in which a button does not accept user input and said second user interface displays said recording button in the second status and said playback button in the first status.

10. An information processing method according to claim 9, further comprising:
    storing still pictures corresponding to scene switchovers of said second recorded picture, and time stamps of scene switchovers of said second recorded picture, and
    displaying, given a reference position on a screen, said still pictures in positions at distances from said reference position, said distances reflecting differences between a time stamp corresponding to said reference position on the one hand and said time stamps of said scene switchovers on the other hand.

11. An information processing method according to claim 10, wherein the display control is provided in such a manner that the time stamp of the second recorded picture being reproduced by the reproducing unit corresponds to said reference position.

12. An information processing method according to claim 10, wherein the display control is provided in such a manner as to shift continuously the positions of said still pictures in accordance with the time stamp of the second recorded picture being reproduced by reproducing unit.

13. A memory including a computer program, which when executed by a processor of an information processing apparatus, causes the information processing apparatus to perform an information processing method comprising:
 recording a first supplied picture;
 reproducing a second recorded picture; and
 providing display control in such a manner as to display a first user interface during said recording step and a second user interface during said reproducing step,
 wherein said first user interface displays a recording button through which to input orders for operating said recording unit and a playback button through which to input orders for operating said reproducing unit and said second user interface displays a recording button through which to input orders for operating said recording unit and a playback button through which to input orders for operating said reproducing unit, and
 wherein said first user interface displays said recording button in a first status in which a button accepts user input and said playback button in a second status in which a button does not accept user input and said second user interface displays said recording button in the second status and said playback button in the first status.

14. A memory according to claim 13, further comprising:
 storing still pictures corresponding to scene switchovers of said second recorded picture, and time stamps of scene switchovers of said second recorded picture, and
 displaying, given a reference position on a screen, said still pictures in positions at distances from said reference position, said distances reflecting differences between a time stamp corresponding to said reference position on the one hand and said time stamps of said scene switchovers on the other hand.

15. A memory according to claim 14, wherein the display control is provided in such a manner that the time stamp of the second recorded picture being reproduced corresponds to said reference position.

16. A memory according to claim 14, wherein the display control is provided in such a manner as to shift continuously the positions of said still pictures in accordance with the time stamp of the second recorded picture being reproduced.

17. An information processing apparatus, comprising:
 means for recording a first supplied picture;
 means for reproducing a second recorded picture; and
 means for providing display control in such a manner as to display a first user interface when said recording unit records said first picture supplied and to display a second user interface when said reproducing unit reproduces said second picture recorded,
 wherein said first user interface displays a recording button through which to input orders for operating said recording unit and a playback button through which to input orders for operating said reproducing unit and said second user interface displays a recording button through which to input orders for operating said recording unit and a playback button through which to input orders for operating said reproducing unit, and
 wherein said first user interface displays said recording button in a first status in which a button accepts user input and said playback button in a second status in which a button does not accept user input and said second user interface displays said recording button in the second status and said playback button in the first status.

18. An information processing apparatus according to claim 17, further comprising:
 means for storing still pictures corresponding to scene switchovers of said second recorded picture, and time stamps of scene switchovers of said second recorded picture; and
 means for displaying, given a reference position on a screen, said still pictures in positions at distances from said reference position, said distances reflecting differences between a time stamp corresponding to said reference position on the one hand and said time stamps of said scene switchovers on the other hand.

19. An information processing apparatus according to claim 18, wherein the means for providing display control provides display control in such a manner that the time stamp of the second recorded picture being reproduced by the reproducing unit corresponds to said reference position.

20. An information processing apparatus according to claim 18, wherein the means for providing display control provides display control in such a manner as to shift continuously the positions of said still pictures in accordance with the time stamp of the second recorded picture being reproduced by reproducing unit.

* * * * *